(12) United States Patent
Kaji et al.

(10) Patent No.: US 10,746,526 B2
(45) Date of Patent: *Aug. 18, 2020

(54) STRAIN SENSING ELEMENT AND PRESSURE SENSOR

(71) Applicant: KABUSHIKI KAISHA TOSHIBA, Minato-ku (JP)

(72) Inventors: Shiori Kaji, Kawasaki (JP); Hideaki Fukuzawa, Kawasaki (JP); Tomohiko Nagata, Yokohama (JP); Akio Hori, Kawasaki (JP); Yoshihiko Fuji, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 212 days.

This patent is subject to a terminal disclaimer.

(21) Appl. No.: 15/920,492

(22) Filed: Mar. 14, 2018

(65) Prior Publication Data

US 2018/0202793 A1    Jul. 19, 2018

Related U.S. Application Data

(62) Division of application No. 14/887,749, filed on Oct. 20, 2015, now Pat. No. 9,952,030.

(30) Foreign Application Priority Data

Mar. 24, 2015  (JP) ................................. 2015-061453

(51) Int. Cl.
   *G01B 7/24*   (2006.01)
   *G01B 7/16*   (2006.01)
   (Continued)

(52) U.S. Cl.
   CPC ................. *G01B 7/24* (2013.01); *G01B 7/18* (2013.01); *G01L 9/0042* (2013.01); *G01L 9/16* (2013.01)

(58) Field of Classification Search
   CPC ......... G01L 1/125; G01L 9/16; G01L 9/0001; G01L 9/0042; G01B 7/24; G01B 7/18
   See application file for complete search history.

(56) References Cited

U.S. PATENT DOCUMENTS 6,111,722 A    8/2000  Fukuzawa et al.
6,118,624 A    9/2000  Fukuzawa et al.
(Continued)

FOREIGN PATENT DOCUMENTS

JP    09-117235    5/1997
JP    09-117236    5/1997
(Continued)

OTHER PUBLICATIONS

M. Lohndorf, et al., "Highly sensitive strain sensors based on magnetic tunneling junctions", Applied Physics Letters, vol. 81, (2), 2002, 3 pgs.

(Continued)

*Primary Examiner* — Freddie Kirkland, III
(74) *Attorney, Agent, or Firm* — Oblon, McClelland, Maier & Neustadt, L.L.P.

(57) ABSTRACT

According to one embodiment, a strain sensing element includes a film unit being deformable, a first and a second magnetic unit, and a strain sensor. The first magnetic unit is provided on the film unit and is arranged with the film unit in a first direction. The first magnetic unit includes a first magnetic body layer and a first intermediate magnetic layer. The second magnetic unit is provided on the film unit and is arranged with the first magnetic unit in a second direction crossing the first direction. The second magnetic unit includes a second magnetic body layer and a second intermediate magnetic layer. The strain sensor is provided on the film unit between the first magnetic unit and the second (Continued)

magnetic unit. An electrical characteristic of the strain sensor changes according to a deformation of the film unit.

4 Claims, 31 Drawing Sheets

(51) Int. Cl.
    *G01L 9/00*            (2006.01)
    *G01L 9/16*            (2006.01)

(56) References Cited

U.S. PATENT DOCUMENTS

| | | | |
|---|---|---|---|
| 6,146,776 A | 11/2000 | Fukuzawa et al. | |
| 8,659,292 B2 | 2/2014 | Zhou et al. | |
| 8,760,154 B2* | 6/2014 | Giddings | G01B 7/24 324/209 |
| 8,973,446 B2* | 3/2015 | Fukuzawa | G01L 1/12 73/779 |
| 9,176,014 B2* | 11/2015 | Fuji | G01L 9/0044 |
| 9,342,179 B2* | 5/2016 | Fuji | G01L 9/16 |
| 9,435,868 B2* | 9/2016 | Giddings | G01R 33/091 |
| 9,596,995 B2* | 3/2017 | Fuji | A61B 5/02141 |
| 9,651,432 B2* | 5/2017 | Fuji | G01L 9/007 |
| 9,759,618 B2* | 9/2017 | Fukuzawa | G01L 1/12 |
| 9,791,341 B2* | 10/2017 | Fuji | G01L 9/16 |
| 9,952,030 B2* | 4/2018 | Kaji | G01B 7/24 |
| 2002/0073785 A1* | 6/2002 | Prakash | G06K 9/0002 73/862.041 |
| 2005/0088789 A1* | 4/2005 | Hou | G11B 5/3932 360/324.12 |
| 2006/0246271 A1* | 11/2006 | Quandt | G01L 9/16 428/212 |
| 2011/0295128 A1 | 12/2011 | Yuasa et al. | |
| 2012/0079887 A1* | 4/2012 | Giddings | G01B 7/24 73/779 |
| 2013/0255393 A1* | 10/2013 | Fukuzawa | G01L 1/12 73/779 |
| 2014/0090486 A1* | 4/2014 | Fuji | G01L 9/0044 73/862.69 |
| 2014/0137668 A1* | 5/2014 | Fukuzawa | B81B 3/0086 73/862.69 |
| 2014/0369530 A1* | 12/2014 | Fuji | A61B 5/02141 381/122 |
| 2015/0082899 A1 | 3/2015 | Kaji et al. | |
| 2015/0082901 A1 | 3/2015 | Fuji et al. | |
| 2015/0082918 A1* | 3/2015 | Fuji | G01L 1/125 73/862.69 |
| 2015/0088008 A1* | 3/2015 | Fuji | G01L 9/16 600/485 |
| 2015/0268105 A1* | 9/2015 | Fuji | G01L 9/16 73/779 |
| 2016/0258824 A1* | 9/2016 | Fuji | G01L 1/12 |
| 2016/0282101 A1* | 9/2016 | Kaji | G01B 7/24 |
| 2018/0202793 A1* | 7/2018 | Kaji | G01B 7/24 |

FOREIGN PATENT DOCUMENTS

| | | |
|---|---|---|
| JP | 10-312512 | 11/1998 |
| JP | 10-312514 | 11/1998 |
| JP | 10-312515 | 11/1998 |
| JP | 2005-235387 A | 9/2005 |
| JP | 2011-244938 | 12/2011 |
| JP | 2012-078186 | 4/2012 |
| JP | 2012-176294 | 9/2012 |
| JP | 2013-205403 | 10/2013 |
| JP | 2014-074606 | 4/2014 |
| JP | 2014-102171 A | 6/2014 |
| JP | 2014-240824 A | 12/2014 |
| JP | 2015-061056 | 3/2015 |
| JP | 2015-061059 | 3/2015 |
| JP | 2015-061070 | 3/2015 |

OTHER PUBLICATIONS

D. Meyners, et al., "Pressure sensor based on magnetic tunnel junctions", Journal of Applied Physics 105, 07C914, 2009, 3 pgs.

* cited by examiner

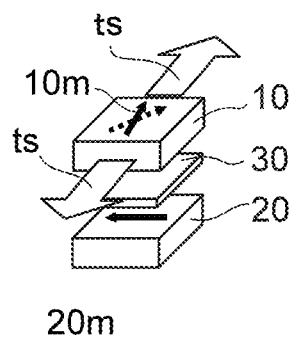 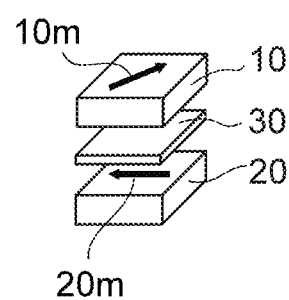 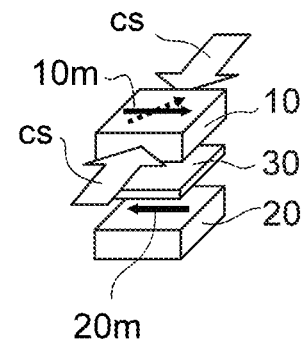
FIG. 2A  FIG. 2B  FIG. 2C
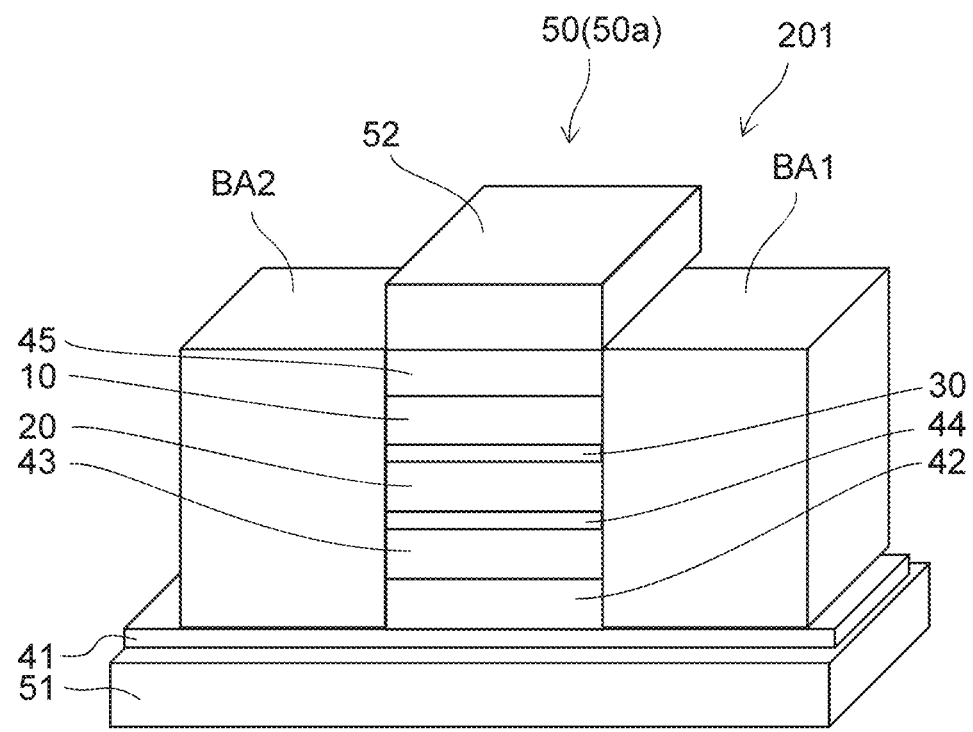
FIG. 3

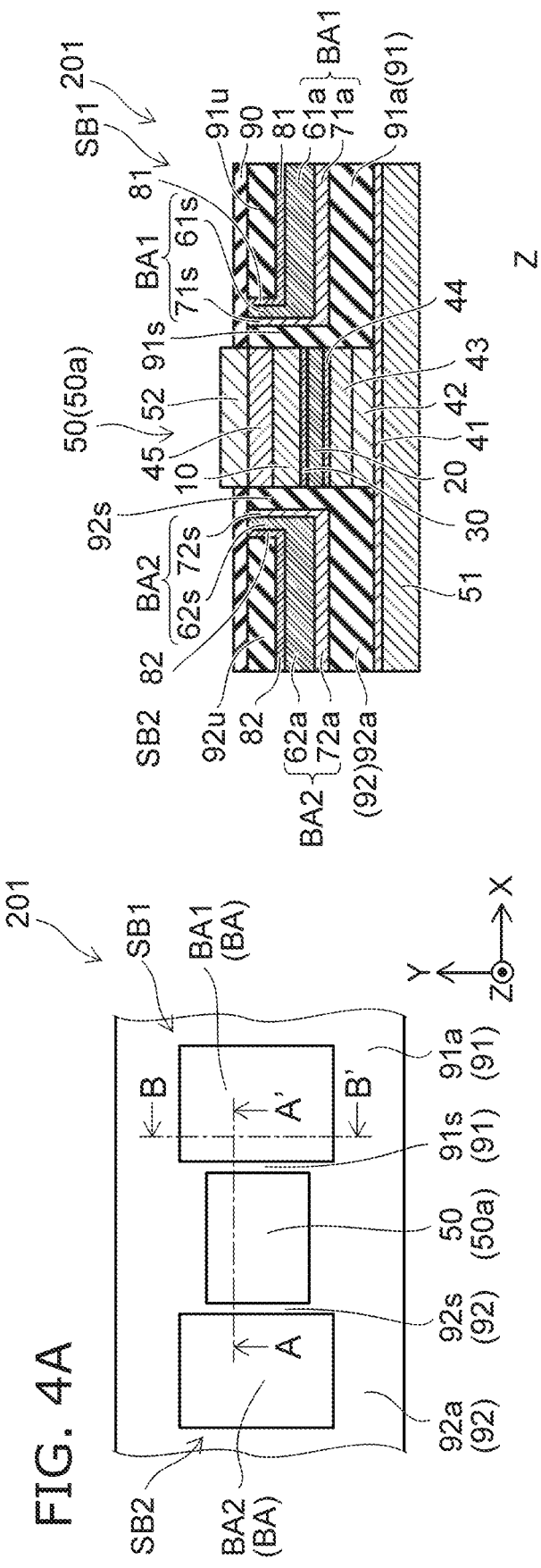
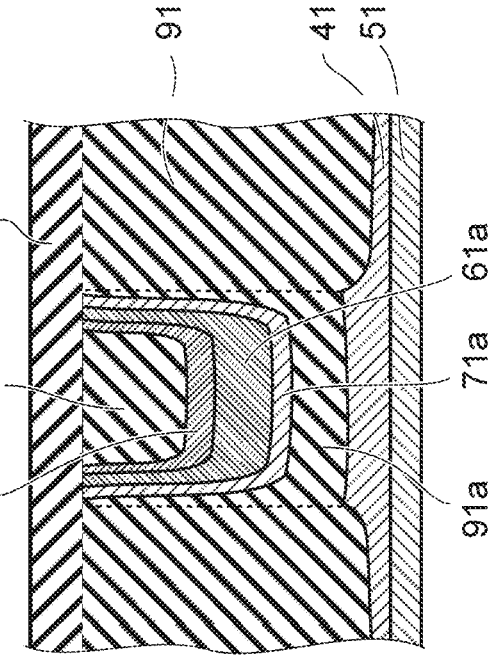
FIG. 4A
FIG. 4B
FIG. 4C

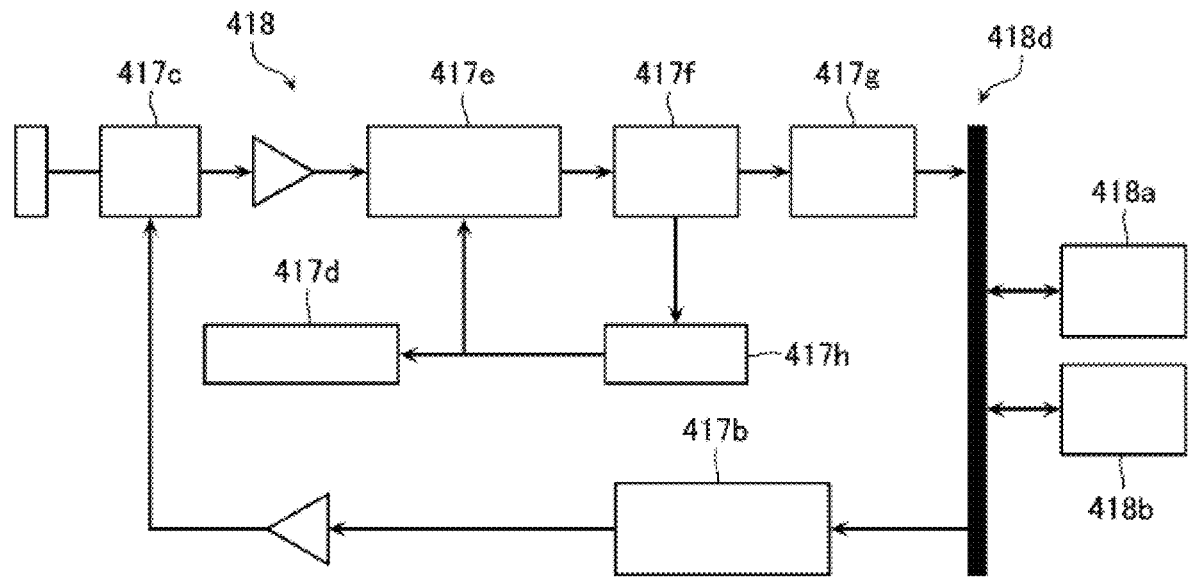
FIG. 24
FIG. 25A
FIG. 25B
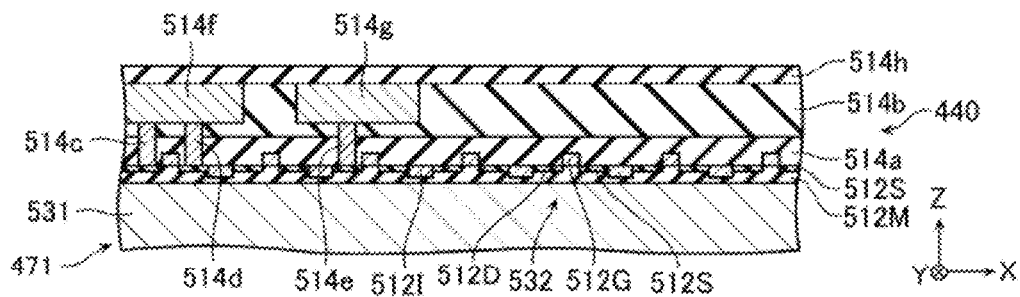

STRAIN SENSING ELEMENT AND PRESSURE SENSOR

CROSS-REFERENCE TO RELATED APPLICATIONS

This application is a divisional of and is based upon and claims the benefit of priority Under 35 U.S.C. § 120 for U.S. Ser. No. 14/887,749, filed Oct. 20, 2015, and claims the benefit of priority from Japanese Patent Application No. 2015-061453, filed on Mar. 24, 2015. The entire contents of which are incorporated herein by reference.

FIELD

Embodiments described herein relate generally to a strain sensing element and a pressure sensor.

BACKGROUND

Pressure sensors that use MEMS (Micro Electro Mechanical Systems) technology include, for example, a piezo resistance-change type and an electrostatic-capacitance type. On the other hand, a pressure sensor and a strain sensing element using spin technology have been proposed. High sensitivity is desirable in the pressure sensor and the strain sensing element using spin technology.

BRIEF DESCRIPTION OF THE DRAWINGS

FIG. 2A to FIG. 2C are schematic views showing operations of the strain sensor used in the embodiment;

FIG. 3 is a schematic perspective view showing the strain sensor included in the embodiment;

FIG. 4A to FIG. 4C are schematic views showing a portion of the strain sensing element according to the first embodiment;

FIG. 24 is a block diagram showing the pressure sensor according to the fifth embodiment;

FIG. 25A and FIG. 25B are schematic views showing the method for manufacturing the pressure sensor according to the fifth embodiment;

DETAILED DESCRIPTION

Figure 1A:
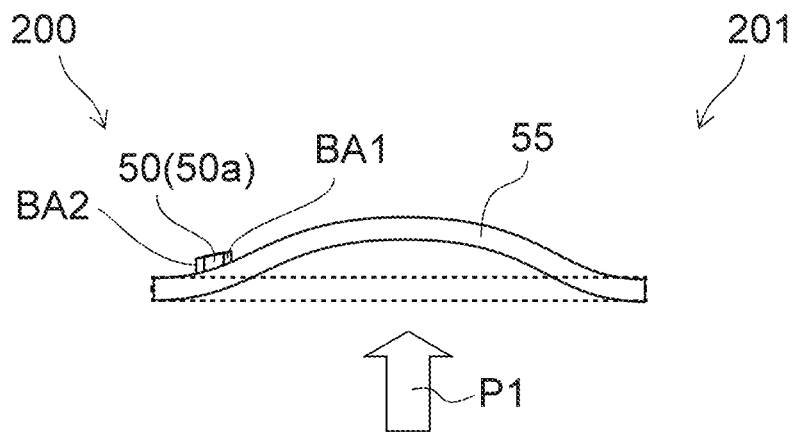
FIG. 1A and FIG. 1B are schematic views showing a strain sensing element according to a first embodiment.

According to one embodiment, a strain sensing element includes a film unit, a first magnetic unit, a second magnetic unit and, a first strain sensor. The film unit is deformable. The first magnetic unit is provided on the film unit and is arranged with the film unit in a first direction. The first magnetic unit includes a first magnetic body layer and a first intermediate magnetic layer. The first intermediate magnetic layer is provided between the first magnetic body layer and the film unit. The second magnetic unit is provided on the film unit and is arranged with the first magnetic unit in a second direction. The second magnetic unit includes a second magnetic body layer and a second intermediate magnetic layer. The second intermediate magnetic layer is provided between the second magnetic body layer and the film unit. The second direction crosses the first direction. The first strain sensor is provided on the film unit between the first magnetic unit and the second magnetic unit. An electrical characteristic of the first strain sensor changes according to a deformation of the film unit.

According to one embodiment, a strain sensing element includes a film unit, a first magnetic unit, a second magnetic unit, a first strain sensor, a third magnetic unit, a fourth magnetic unit, and a second strain sensor. The film unit is deformable. The first magnetic unit is provided on the film unit and is arranged with the film unit in a first direction. The first magnetic unit includes a first magnetic body layer. The second magnetic unit is provided on the film unit and is arranged with the first magnetic unit in a second direction. The second magnetic unit includes a second magnetic body layer. The second direction crosses the first direction. The first strain sensor is provided on the film unit between the first magnetic unit and the second magnetic unit. An electrical characteristic of the first strain sensor changes according to a deformation of the film unit. The third magnetic unit is provided on the film unit. The third magnetic unit includes a third magnetic body layer. The fourth magnetic unit is provided on the film unit and is arranged with the third magnetic unit in a third direction crosses the first direction. The fourth magnetic unit includes a fourth magnetic body layer. The second strain sensor is provided on the film unit between the third magnetic unit and the fourth magnetic unit. An electrical characteristic of the second strain sensor changes according to the deformation of the film unit.

According to one embodiment, a pressure sensor includes a strain sensing element and a supporter. The strains sensing element includes a film unit, a first magnetic unit, a second magnetic unit and, a first strain sensor. The film unit is deformable. The first magnetic unit is provided on the film unit and is arranged with the film unit in a first direction. The first magnetic unit includes a first magnetic body layer and a first intermediate magnetic layer. The first intermediate magnetic layer is provided between the first magnetic body layer and the film unit. The second magnetic unit is provided on the film unit and is arranged with the first magnetic unit in a second direction. The second magnetic unit includes a second magnetic body layer and a second intermediate magnetic layer. The second intermediate magnetic layer is provided between the second magnetic body layer and the film unit. The second direction crosses the first direction. The first strain sensor is provided on the film unit between the first magnetic unit and the second magnetic unit. An electrical characteristic of the first strain sensor changes according to a deformation of the film unit. The supporter supports the film unit.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

Figure 1B:
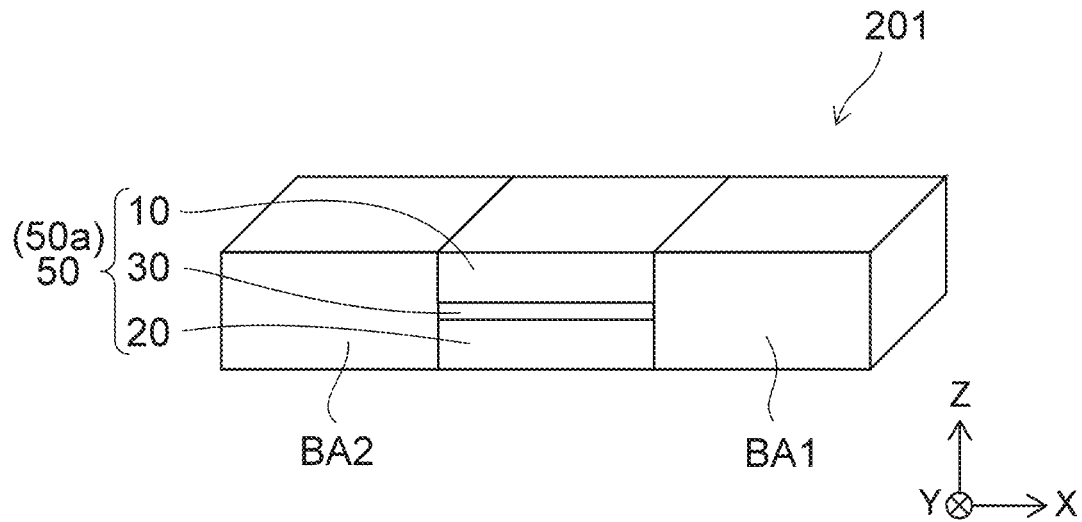

FIG. 1A and FIG. 1B are schematic views illustrating a strain sensing element according to a first embodiment.

FIG. 1A is a schematic cross-sectional view showing the strain sensing element 201 according to the embodiment.

As shown in FIG. 1A, the strain sensing element 201 includes a film unit 55, a strain sensor 50 (a first strain sensor 50a), a first bias applying unit BA1 (a first magnetic unit), and a second bias applying unit BA2 (a second magnetic unit). The film unit 55 is flexible and deformable.

FIG. 1B is a schematic perspective view showing the strain sensor 50, the first bias applying unit BA1, and the second bias applying unit BA2.

The first bias applying unit BA1 is provided on the film unit 55. For example, the first bias applying unit BA1 is provided on a portion of the film unit 55. The first bias applying unit BA1 includes a magnetic layer. For example, the first bias applying unit BA1 includes a soft magnetic layer and a hard magnetic layer that are stacked.

In the specification of the application, the state of being "provided on" includes not only the state of being provided in direct contact but also the state of being provided with another component inserted therebetween.

In the following description, a direction from the film unit 55 toward the first bias applying unit BA1 is taken as a Z-axis direction (a first direction). One direction perpendicular to the Z-axis direction is taken as an X-axis direction. A direction perpendicular to the Z-axis direction and perpendicular to the X-axis direction is taken as a Y-axis direction.

The second bias applying unit BA2 is provided on the film unit 55. For example, the second bias applying unit BA2 is provided on a portion of the film unit 55. The second bias applying unit BA2 is arranged with the first bias applying unit BA1 in a second direction (e.g., the X-axis direction) intersecting the Z-axis direction. The second bias applying unit BA2 includes a magnetic layer. The second bias applying unit BA2 includes, for example, a soft magnetic layer and a hard magnetic layer.

The strain sensor 50 is provided on the film unit 55 and is disposed between the first bias applying unit BA1 and the second bias applying unit BA2. For example, the strain sensor 50 is provided on a portion of the film unit 55. The strain sensor 50 includes a first magnetic layer 10, a second magnetic layer 20, and an intermediate layer 30. Other layers may be further included in the strain sensor 50 (referring to FIG. 3).

The first magnetic layer 10 includes a magnetic material. The first magnetic layer 10 is, for example, a free magnetic layer in which the direction of the magnetization changes according to the deformation of the film unit 55.

The second magnetic layer 20 is provided between the film unit 55 and the first magnetic layer 10. The second magnetic layer 20 includes a magnetic material. The second magnetic layer 20 is, for example, a reference layer. A fixed magnetic layer in which the direction of the magnetization is fixed is used as the reference layer. The reference layer may be a free magnetic layer.

The intermediate layer 30 is provided between the first magnetic layer 10 and the second magnetic layer 20. The intermediate layer 30 includes at least one of a metal, an insulator, or a semiconductor.

In the strain sensing element 201 according to the embodiment, high sensitivity can be obtained by providing the bias layers (the first bias applying unit BA1 and the second bias applying unit BA2) at two ends of the strain sensor 50.

First, the strain sensor 50 will be described.

For example, the direction of the magnetization of the free magnetic layer changes more easily than the direction of the magnetization of the fixed magnetic layer due to the deformation of the film unit 55. Thereby, the relative angle between the magnetization of the free magnetic layer and the magnetization of the reference layer changes when a force P1 is applied to the film unit 55 and the film unit 55 deforms.

FIG. 2A to FIG. 2C are schematic views illustrating operations of the strain sensor used in the embodiment.

In the examples shown in FIG. 2A to FIG. 2C, a free magnetic layer is used as the first magnetic layer 10; and a fixed magnetic layer is used as the second magnetic layer 20. Among the layers of the strain sensor 50, only the first magnetic layer 10, the intermediate layer 30, and the second magnetic layer 20 are shown in FIGS. 2A to 2C for ease of viewing.

In the strain sensor 50 of the embodiment, strain is produced in the strain sensor 50 when the film unit 55 deforms (deflects) due to a force from the outside. The electrical characteristics (e.g., the electrical resistance) of the strain sensor 50 change according to the deformation of the film unit 55.

The operation of the strain sensor 50 functioning as a strain sensor is based on an application of the inverse magnetostrictive effect and the magnetoresistance effect. The inverse magnetostrictive effect arises in ferromagnetic layer used as the free magnetic layer. The magnetoresistance effect arises in a stacked film made of a free magnetic layer, an intermediate layer, and a fixed magnetic layer.

The inverse magnetostrictive effect is the phenomenon of the magnetization of a ferromagnet changing due to the strain produced in the ferromagnet. In other words, the magnetization direction of the free magnetic layer of the stacked film of the strain sensor 50 changes when stress from the outside is applied and strain is produced. As a result, the relative angle between the magnetization of the free magnetic layer and the magnetization of the fixed magnetic layer changes. At this time, a change of the electrical resistance is caused by a magnetoresistance effect (an MR effect). The MR effect includes, for example, a GMR (Giant magnetoresistance) effect, a TMR (Tunneling magnetoresistance) effect, etc. By causing a current to flow in the stacked film, the change of the relative angle between the orientations of the magnetizations is read as an electrical resistance change. Thus, the MR effect arises.

For example, strain is produced in the strain sensor 50 due to stress applied to the stacked film. The orientation of the magnetization of the free magnetic layer changes due to the strain; and the relative angle between the orientation of the magnetization of the free magnetic layer and the orientation of the magnetization of the fixed magnetic layer changes. In other words, the MR effect arises due to the inverse magnetostrictive effect.

In the case where the ferromagnetic material that is included in the free magnetic layer has a positive magnetostriction constant, the directions of the magnetizations change so that the angle between the direction of the magnetization and the direction of the tensile strain becomes small and the angle between the direction of the magnetization and the direction of the compressive strain becomes large. In the case where the ferromagnetic material that is included in the free magnetic layer has a negative magnetostriction constant, the directions of the magnetizations change so that the angle between the direction of the magnetization and the direction of the tensile strain becomes large; and the angle between the direction of the magnetization and the direction of the compressive strain becomes small. The direction of the resistance change (the increase or decrease of the electrical resistance) due to the relative angle between the free magnetic layer and the fixed magnetic layer is different between combinations of the materials of the stacked film made of the free magnetic layer, the intermediate layer, and the fixed magnetic layer.

The case will now be described where the ferromagnetic material included in the free magnetic layer and the ferromagnetic material included in the fixed magnetic layer have positive magnetostriction constants. In the following example, in the stacked film made of the free magnetic layer, the intermediate layer, and the fixed magnetic layer, the electrical resistance of the strain sensor 50 decreases when the relative angle between the direction of the magnetization of the free magnetic layer and the direction of the magnetization of the fixed magnetic layer decreases.

FIG. 2A shows the state in which a tensile stress ts is applied to the strain sensor 50 and tensile strain is produced. FIG. 2B shows the state (the initial state) in which strain is not produced in the strain sensor 50. FIG. 2C shows the state in which a compressive stress cs is applied to the strain sensor 50 and compressive strain is produced.

The relative angle is set arbitrarily between a magnetization direction $10m$ of the free magnetic layer in the initial state and a magnetization direction $20m$ of the fixed magnetic layer in the initial state. For example, the magnetization direction $10m$ of the free magnetic layer in the initial state is set by the magnetic bias, the shape anisotropy of the strain sensor 50, etc.

In the case where tensile strain is produced in the direction of the arrow as shown in FIG. 2A, the magnetization direction $10m$ of the free magnetic layer changes so that the angle between the magnetization direction $10m$ and the direction of the tensile strain is smaller than that of the initial state. In the case where the tensile strain is produced as in FIG. 2A, the relative angle between the magnetization direction $10m$ of the free magnetic layer and the magnetization direction $20m$ of the fixed magnetic layer is smaller than that of the initial state of FIG. 2B. Thereby, the electrical resistance of the strain sensor 50 decreases.

On the other hand, in the case where compressive strain is produced in the direction of the arrow as shown in FIG. 2C, the magnetization direction $10m$ of the free magnetic layer changes so that the angle between the magnetization direction $10m$ and the direction of the compressive strain is larger than that of the initial state. In the case where the compressive strain is produced as in FIG. 2C, the relative angle between the magnetization direction $10m$ of the free magnetic layer and the magnetization direction $20m$ of the fixed magnetic layer is larger than that of the initial state of FIG. 2B. Thereby, the electrical resistance of the strain sensor 50 increases.

Thus, the strain sensor 50 can convert the change of the strain applied to the strain sensor 50 into a change of the electrical resistance. The magnetoresistance change amount (dR/R) per unit strain (dε) obtained by the effect recited above is called the gauge factor (GF). A highly-sensitive strain sensing element can be realized by realizing a strain sensor having a high gauge factor.

For example, a soft magnetic material for which the direction of the magnetization changes easily is included in the free magnetic layer. Thereby, a highly-sensitive strain sensing element is realized.

It is more desirable for the material of the free magnetic layer to be in an amorphous state (an amorphous material) because the magneto-crystalline anisotropy is small. Here, the amorphous state is a state in which a designated crystal orientation does not last for a long period. The amorphous state can be confirmed by observing the cross section of the strain sensor using a transmission electron microscope (TEM).

On the other hand, the magnetization of the free magnetic layer is affected easily by a demagnetizing field in such a case. For example, the demagnetizing field is generated by effects of the magnetic pole at the end portion of the free magnetic layer. In the case where the dimension of the element is small, the magnetization direction may be disturbed by such a demagnetizing field. The disturbance of the magnetization direction may reduce the change of the relative angle between the magnetization direction $10m$ of the free magnetic layer and the magnetization direction $20m$ of the fixed magnetic layer due to the strain of the strain sensor.

Conversely, in the strain sensing element shown in FIG. 1B, the bias layers (the first bias applying unit BA1 and the second bias applying unit BA2) are provided at two opposing ends of the strain sensor 50. In such a strain sensing element, the generation of the magnetic pole can be suppressed by a moderate magnetic field applied from the bias layers. Thereby, for example, it is possible to reduce the effects of the demagnetizing field without impeding the rotation of the magnetization due to the strain.

For example, in the embodiment, the diameter of the strain sensor 50 (the length of the strain sensor 50 along a direction intersecting the Z-axis direction) is not less than 0.05 micrometers (μm) and not more than 15 μm. In such a case where the dimension of the element is small, the sensitivity of the strain sensing element can be high by reducing the effects of the demagnetizing field of the free magnetic layer. Thereby, for example, a high-resolution highly-sensitive strain sensing element can be provided.

An appropriate bias magnetic field can be applied to the strain sensor 50 by adjusting the strength of the magnetic field applied from the bias layers, the position of the bias layers, etc. Thereby, for example, the appropriate bias magnetic field can be applied to the strain sensor 50. Accordingly, the demagnetizing field is suppressed; and the sensitivity of the strain sensing element can be high.

Examples of the strain sensor 50 and the bias layers included in the strain sensing element 201 according to the embodiment will now be described.

First, an example of the strain sensor 50 will be described.

In the following description, "material A/material B" refers to the state in which a layer of material B is provided on a layer of material A.

FIG. 3 is a schematic perspective view illustrating the strain sensor included in the embodiment.

As shown in FIG. 3, the strain sensor 50 included in the embodiment includes a lower electrode 51, a foundation layer 41, a pinning layer 42, a second fixed magnetic layer 43, a magnetic coupling layer 44, a first fixed magnetic layer (the second magnetic layer 20), the intermediate layer 30, a free magnetic layer (the first magnetic layer 10), a capping layer 45, and an upper electrode 52 arranged in this order.

The foundation layer 41 includes, for example, Ta/Ru. The thickness (the length in the Z-axis direction) of the Ta layer is, for example, 3 nanometers (nm). The thickness of the Ru layer is, for example, 2 nm. For example, a Cu layer, etc., may be further provided at the lower portion of the Ta layer.

The pinning layer 42 includes, for example, an IrMn layer having a thickness of 7 nm.

The second fixed magnetic layer 43 includes, for example, a $Co_{75}Fe_{25}$ layer having a thickness of 2.5 nm.

The magnetic coupling layer 44 includes, for example, a Ru layer having a thickness of 0.9 nm.

The first fixed magnetic layer (the second magnetic layer 20) includes, for example, a $Co_{40}Fe_{40}B_{20}$ layer having a thickness of 3 nm.

The intermediate layer 30 includes, for example, a MgO layer having a thickness of 2.0 nm.

The free magnetic layer (the first magnetic layer 10) includes, for example, $Co_{40}Fe_{40}B_{20}$ or $Fe_{80}B_{20}$.

The capping layer 45 includes, for example, at least one of Ta, Ru, Cu, or MgO.

The lower electrode 51 and the upper electrode 52 include, for example, at least one of aluminum (Al), an aluminum copper alloy (Al—Cu), copper (Cu), silver (Ag), a copper-silver alloy (Cu—Ag), or gold (Au). A current can be caused to flow in the strain sensor 50 efficiently by using such materials having relatively small electrical resistances as the lower electrode 51 and the upper electrode 52. The lower electrode 51 may include a nonmagnetic material.

The lower electrode 51 may have a structure in which a layer of at least one of Al, Al—Cu, Cu, Ag, or Au is provided between a capping layer (not shown) and a foundation layer (not shown) for the lower electrode. For example, the lower electrode 51 includes tantalum (Ta)/copper (Cu)/tantalum (Ta), etc. For example, the adhesion between the film unit 55 and the lower electrode 51 can be improved by using Ta as the foundation layer for the lower electrode. Titanium (Ti), titanium nitride (TiN), etc., may be used as the foundation layer for the lower electrode. The oxidization of the copper (Cu), etc., under the capping layer can be prevented by using Ta as the capping layer of the lower electrode. Titanium (Ti), titanium nitride (TiN), etc., may be used as the capping layer for the lower electrode.

The foundation layer 41 may have a stacked structure of a buffer layer (not shown) and a seed layer (not shown). For example, the buffer layer relaxes the roughness of the front surfaces of the lower electrode 51 and the film unit 55 and improves the crystallinity of the layers stacked on the buffer layer. The buffer layer also is effective as a stopper when making the element. For example, at least one selected from the group consisting of tantalum (Ta), titanium (Ti), copper (Cu), vanadium (V), tungsten (W), zirconium (Zr), hafnium (Hf), and chrome (Cr) is used as the buffer layer. An alloy including at least one material selected from these materials may be used as the buffer layer.

It is favorable for the thickness of the buffer layer to be not less than 1 nm and not more than 20 nm. In the case where the thickness of the buffer layer is too thin, the buffering effect is lost; and the processes that form the bias layers are difficult. In the case where the thickness of the buffer layer is too thick, the thickness of the strain sensor 50 is excessively thick. A seed layer may be formed on the buffer layer; and the seed layer may have a buffering effect. The buffer layer may be omitted. For example, a Ta layer having a thickness of 10 nm is included in a portion of the buffer layer. For example, a Cu layer, etc., may be further provided at the lower portion of the Ta layer.

The seed layer controls the crystal orientation of the layers stacked on the seed layer. The seed layer controls the crystal grain size of the layers stacked on the seed layer. A metal having a fcc structure (face-centered cubic structure), a hcp structure (hexagonal close-packed structure), a bcc structure (body-centered cubic structure), or the like is used as the seed layer.

For example, the crystal orientation of a spin-valve film on the seed layer can be set to the fcc (111) orientation by using ruthenium (Ru) having a hcp structure, NiFe having a fcc structure, or Cu having a fcc structure as the seed layer. For example, a Cu layer having a thickness of 2 nm or a Ru layer having a thickness of 2 nm is included in the seed layer. It is favorable for the thickness of the seed layer to be not less than 1 nm and not more than 5 nm to improve the crystal orientation of the layers formed on the seed layer. It is more favorable for the thickness of the seed layer to be not less than 1 nm and not more than 3 nm. Thereby, the function as a seed layer that improves the crystal orientation is realized sufficiently. On the other hand, for example, the seed layer may be omitted in the case where the layers formed on the seed layer are not provided with a crystal orientation (e.g., in the case where an amorphous free magnetic layer is formed, etc.). For example, a Cu layer having a thickness of 2 nm is used as the seed layer.

For example, the pinning layer 42 fixes the magnetization of the ferromagnetic layer of the second fixed magnetic layer 43 formed on the pinning layer 42 by providing unidirectional anisotropy. The pinning layer 42 includes, for example, an antiferromagnetic layer. The pinning layer 42 includes, for example, at least one selected from the group consisting of IrMn, PtMn, PdPtMn, and RuRhMn. The thickness of the pinning layer 42 is set appropriately to provide unidirectional anisotropy of sufficient strength.

In the case where PtMn or PdPtMn is used as the pinning layer 42, it is favorable for the thickness of the pinning layer 42 to be not less than 8 nm and not more than 20 nm. It is more favorable for the thickness of the pinning layer 42 to be not less than 10 nm and not more than 15 nm. In the case where IrMn is used as the pinning layer 42, the unidirectional anisotropy can be provided using a pinning layer that is thinner than in the case where PtMn is used as the pinning layer 42. In such a case, it is favorable for the thickness of the pinning layer 42 to be not less than 4 nm and not more than 18 nm. It is more favorable for the thickness of the pinning layer 42 to be not less than 5 nm and not more than 15 nm. The pinning layer 42 includes, for example, an $Ir_{22}Mn_{78}$ layer having a thickness of 7 nm.

A hard magnetic layer may be used as the pinning layer 42. For example, as the hard magnetic layer, CoPt (having a proportion of Co not less than 50% and not more than 85%), $(Co_xPt_{100-x})_{100-y}Cr_y$ (x being not less than 50% and not more than 85%, and y being not less than 0% and not more than 40%), FePt (having a proportion of Pt not less than 40% and not more than 60%), etc., may be used.

The second fixed magnetic layer 43 includes, for example, a $Co_xFe_{100-x}$ alloy (x being not less than 0% and not more than 100%), a $Ni_xFe_{100-x}$ alloy (x being not less than 0% and not more than 100%), or materials in which a nonmagnetic element is added to these alloys. For example, at least one selected from the group consisting of Co, Fe, and Ni is used as the second fixed magnetic layer 43. An alloy including at least one material selected from these materials may be used as the second fixed magnetic layer 43. A $(Co_xFe_{100-x})_{100-y}B_y$ alloy (x being not less than 0% and not more than 100%, and y being not less than 0% and not more than 30%) may be used as the second fixed magnetic layer 43. The fluctuation between the strain sensors 50 can be suppressed even in the case where the size of the element is small by using a $(Co_xFe_{100-x})_{100-y}B_y$ amorphous alloy as the second fixed magnetic layer 43.

For example, it is favorable for the thickness of the second fixed magnetic layer 43 to be not less than 1.5 nm and not more than 5 nm. Thereby, for example, the strength of the unidirectional anisotropic magnetic field due to the pinning layer 42 can be stronger. For example, the strength of the antiferromagnetic coupling magnetic field between the second fixed magnetic layer 43 and the first fixed magnetic layer (the second magnetic layer 20) having the magnetic coupling layer 44 formed on the second fixed magnetic layer 43 between the second fixed magnetic layer 43 and the first fixed magnetic layer (the second magnetic layer 20) can be stronger. It is favorable for the magnetic thickness (the product (Bs·t) of a saturation magnetization Bs and a thickness t) of the second fixed magnetic layer 43 to be substantially equal to the magnetic thickness of the first fixed magnetic layer.

The saturation magnetization of the thin film of $Co_{40}Fe_{40}B_{20}$ is about 1.9 T (teslas). For example, in the case where a $Co_{40}Fe_{40}B_{20}$ layer having a thickness of 3 nm is used as the first fixed magnetic layer (the second magnetic layer 20), the magnetic thickness of the first fixed magnetic layer is 1.9 T×3 nm, i.e., 5.7 Tnm. On the other hand, the saturation magnetization of $Co_{75}Fe_{25}$ is about 2.1 T. The thickness of the second fixed magnetic layer 43 to obtain a magnetic thickness equal to that recited above is 5.7 Tnm/2.1 T, i.e., 2.7 nm. In such a case, it is favorable for $Co_{75}Fe_{25}$ having a thickness about 2.7 nm to be included in the second fixed magnetic layer 43. For example, a $Co_{75}Fe_{25}$ layer having a thickness of 2.5 nm is used as the second fixed magnetic layer 43.

In the strain sensing element 201, a synthetic pinned structure of the second fixed magnetic layer 43, the magnetic coupling layer 44, and the first fixed magnetic layer (the second magnetic layer 20) is used. A single pinned structure made of one fixed magnetic layer may be used instead. In the case where the single pinned structure is used, for example, a $Co_{40}Fe_{40}B_{20}$ layer having a thickness of 3 nm is used as the fixed magnetic layer. The same material as the first fixed magnetic layer described above may be used as the ferromagnetic layer included in the fixed magnetic layer having the single pinned structure.

The magnetic coupling layer 44 causes antiferromagnetic coupling to occur between the second fixed magnetic layer 43 and the first fixed magnetic layer (the second magnetic layer 20). The magnetic coupling layer 44 has a synthetic pinned structure. For example, Ru is used as the magnetic coupling layer 44. It is favorable for the thickness of the magnetic coupling layer 44 to be not less than 0.8 nm and not more than 1 nm. A material other than Ru may be used as the magnetic coupling layer 44 if the material causes sufficient antiferromagnetic coupling to occur between the second fixed magnetic layer 43 and the first fixed magnetic layer. The thickness of the magnetic coupling layer 44 may be set to be a thickness not less than 0.8 nm and not more than 1 nm corresponding to the second peak (2nd peak) of RKKY (Ruderman-Kittel-Kasuya-Yosida) coupling. Further, the thickness of the magnetic coupling layer 44 may be set to be a thickness not less than 0.3 nm and not more than 0.6 nm corresponding to the first peak (1st peak) of RKKY coupling. For example, Ru having a thickness of 0.9 nm is used as the magnetic coupling layer 44. Thereby, highly reliable coupling is obtained more stably.

The magnetic layer that is included in the first fixed magnetic layer (the second magnetic layer 20) contributes directly to the MR effect. For example, a Co—Fe—B alloy is used as the first fixed magnetic layer. Specifically, a $(Co_xFe_{100-x})_{100-y}B_y$ alloy (x being not less than 0% and not more than 100%, and y being not less than 0% and not more than 30%) may be used as the first fixed magnetic layer. For example, the fluctuation between the elements caused by crystal grains can be suppressed even in the case where the size of the sensing element is small by using a $(Co_xFe_{100-x})_{100-y}B_y$ amorphous alloy as the first fixed magnetic layer.

The layer (e.g., a tunneling insulating layer (not shown)) that is formed on the first fixed magnetic layer may be planarized. The defect density of the tunneling insulating layer can be reduced by planarizing the tunneling insulating layer. Thereby, a higher MR ratio is obtained with a lower resistance per area. For example, in the case where MgO is used as the material of the tunneling insulating layer, the (100) orientation of the MgO layer formed on the tunneling insulating layer can be strengthened by using a $(Co_xFe_{100-x})_{100-y}B_y$ amorphous alloy. A higher MR ratio is obtained by increasing the (100) orientation of the MgO layer. The $(Co_xFe_{100-x})_{100-y}B_y$ alloy crystallizes using the (100) plane of the MgO layer as a template when annealing. Therefore, good crystal conformation between the MgO and the $(Co_xFe_{100-x})_{100-y}B_y$ alloy is obtained. A higher MR ratio is obtained by obtaining good crystal conformation.

Other than the Co—Fe—B alloy, for example, an Fe—Co alloy may be used as the first fixed magnetic layer (the second magnetic layer 20).

A higher MR ratio is obtained as the thickness of the first fixed magnetic layer increases. A thinner first fixed magnetic layer is favorable to obtain a larger fixed magnetic field. A trade-off relationship between the MR ratio and the fixed magnetic field exists for the thickness of the first fixed magnetic layer. In the case where the Co—Fe—B alloy is used as the first fixed magnetic layer, it is favorable for the thickness of the first fixed magnetic layer to be not less than 1.5 nm and not more than 5 nm. It is more favorable for the thickness of the first fixed magnetic layer to be not less than 2.0 nm and not more than 4 nm.

Other than the materials described above, the first fixed magnetic layer may include a $Co_{90}Fe_{10}$ alloy having a fcc structure, Co having a hcp structure, or a Co alloy having a hcp structure. At least one selected from the group consisting of Co, Fe, and Ni is used as the first fixed magnetic layer. An alloy including at least one material selected from these materials is used as the first fixed magnetic layer. For example, a higher MR ratio is obtained by using an FeCo alloy material having a bcc structure, a Co alloy having a cobalt composition of 50% or more, or a material having a Ni composition of 50% or more as the first fixed magnetic layer. A Heusler magnetic alloy layer such as $Co_2MnGe$, $Co_2FeGe$, $Co_2MnSi$, $Co_2FeSi$, $Co_2MnAl$, $Co_2FeAl$, $Co_2MnGa_{0.5}Ge_{0.5}$, $Co_2FeGa_{0.5}Ge_{0.5}$, etc., may be used as the first fixed magnetic layer. For example, a $Co_{40}Fe_{40}B_{20}$ layer having a thickness of 3 nm is used as the first fixed magnetic layer.

The intermediate layer 30 divides the magnetic coupling between the first magnetic layer 10 and the second magnetic layer 20. The intermediate layer 30 includes a metal, an insulator, or a semiconductor. For example, Cu, Au, Ag, or the like is used as the metal. In the case where a metal is used as the intermediate layer 30, the thickness of the intermediate layer 30 is, for example, not less than about 1 nm and not more than about 7 nm. For example, magnesium oxide (MgO, etc.), aluminum oxide ($Al_2O_3$, etc.), titanium oxide (TiO, etc.), zinc oxide (ZnO, etc.), gallium oxide (Ga—O), or the like is used as the insulator or the semiconductor. In the case where the insulator or the semiconductor is used as the intermediate layer 30, the thickness of the intermediate layer 30 is, for example, not less than about 0.6 nm and not more than about 2.5 nm. For example, a CCP (Current-Confined-Path) spacer layer may be used as the intermediate layer 30. In the case where a CCP spacer layer is used as the spacer layer, for example, a structure is used in which a copper (Cu) metal path is formed inside an insulating layer of aluminum oxide ($Al_2O_3$). For example, a MgO layer having a thickness of 1.5 nm is used as the intermediate layer 30.

The free magnetic layer (the first magnetic layer 10) includes, for example, a ferromagnet material. For example, an FeCo alloy, a NiFe alloy, or the like is used as the material included in the free magnetic layer. The free magnetic layer includes a Co—Fe—B alloy, an Fe—Co—Si—B alloy, an Fe—Ga alloy having a large $\lambda s$ (magnetostriction constant), an Fe—Co—Ga alloy, a Tb-M-Fe alloy (M being at least one selected from the group consisting of Sm, Eu, Gd, Dy, Ho, and Er), a Tb-M1-Fe-M2 alloy (M1 being at least one selected from the group consisting of Sm, Eu, Gd, Dy, Ho, and Er, and M2 being at least one selected from the group consisting of Ti, Cr, Mn, Co, Cu, Nb, Mo, W, and Ta), an Fe-M3-M4-B alloy (M3 being at least one selected from the group consisting of Ti, Cr, Mn, Co, Cu, Nb, Mo, W, and Ta, and M4 being at least one selected from the group consisting of Ce, Pr, Nd, Sm, Tb, Dy, and Er), Ni, Fe—Al, ferrite ($Fe_3O_4$, $(FeCo)_3O_4$), etc.), and the like. The thickness (the thickness along the Z-axis direction) of the free magnetic layer is, for example, 2 nm or more.

The free magnetic layer (the first magnetic layer 10) may include a magnetic material containing boron (B). The free magnetic layer may include, for example, an alloy including boron (B) and at least one element selected from Fe, Co, and Ni. For example, the free magnetic layer includes a $Co_{40}Fe_{40}B_{20}$ alloy. Ga, Al, Si, W, etc., may be added as an element to promote high magnetostriction in the case where the free magnetic layer includes an alloy including boron (B) and at least one element selected from Fe, Co, and Ni. For example, an Fe—Ga—B alloy, an Fe—Co—Ga—B alloy, or an Fe—Co—Si—B alloy may be used. By using such a magnetic material containing boron, the coercive force (Hc) of the free magnetic layer is low; the change of the direction of the magnetization due to the strain is easy; and high strain sensitivity can be obtained.

From the perspective of obtaining an amorphous structure, it is favorable for the B concentration included in the free magnetic layer to be 5 at. % or more; but on the other hand, it is favorable for the B concentration to be 35 at. % or less because the magnetostriction decreases when the B concentration is too high. That is, it is favorable for the B concentration to be not less than 5 at. % and not more than 35 at. %; and it is more favorable to be not less than 10 at. % and not more than 30 at. %.

The free magnetic layer may have a multilayered structure. In the case where a tunneling insulating layer of MgO is used as the intermediate layer 30, it is favorable to provide a layer of a Co—Fe—B alloy at the interface contacting the intermediate layer 30. Thereby, a high magnetoresistance effect is obtained. In such a case, a layer of a Co—Fe—B alloy may be provided on the intermediate layer 30; and another magnetic material that has a large magnetostriction constant may be provided on the layer of the Co—Fe—B alloy. In the case where the free magnetic layer has the multilayered structure as described above, for example, Co—Fe—B (2 nm)/Fe—Co—Si—B (4 nm), etc., may be used.

The capping layer 45 protects the layers provided under the capping layer 45. The capping layer 45 includes, for example, multiple metal layers. The capping layer 45 includes, for example, a two-layer structure (Ta/Ru) of a Ta layer and a Ru layer. The thickness of the Ta layer is, for example, 1 nm; and the thickness of the Ru layer is, for example, 5 nm. As the capping layer 45, another metal layer may be provided instead of the Ta layer and/or the Ru layer. The configuration of the capping layer 45 is arbitrary. For example, a nonmagnetic material such as Mg oxide, etc., may be used. Another material may be used as the capping layer 45 as long as the material can protect the layers provided under the capping layer 45.

Examples of the bias layers (the first bias applying unit BA1 and the second bias applying unit BA2) will now be described.

FIG. 4A to FIG. 4C are schematic views illustrating a portion of the strain sensing element according to the first embodiment.

FIG. 4A is a schematic plan view showing the bias layers and the strain sensor 50.

FIG. 4B is a schematic cross-sectional view showing a cross section along line A-A' of FIG. 4A.

FIG. 4C is a schematic cross-sectional view showing a cross section along line B-B' of FIG. 4A.

As shown in FIG. 4A, the strain sensor 50 is provided between a stacked unit SB1 that includes the first bias applying unit BA1, and a stacked unit SB2 that includes the second bias applying unit BA2. In the example, the planar configuration of the first bias applying unit BA1 and the planar configuration of the second bias applying unit BA2 are rectangular configurations. However, the planar configuration of the first bias applying unit BA1 and the planar configuration of the second bias applying unit BA2 may be any configuration within the range of design.

As shown in FIG. 4B, the stacked unit SB1 and the stacked unit SB2 each have a stacked structure in the first direction (the Z-axis direction) and a stacked structure in the second direction (the X-axis direction).

The stacked structure in the Z-axis direction of the stacked unit SB1 is as follows.

A first insulating layer 91a, the first bias applying unit BA1, a first protective layer 81, and a first upper insulating layer 91u are stacked in the Z-axis direction in the stacked unit SB1. The first bias applying unit BA1 includes a first intermediate magnetic layer 71a and a first bias magnetic layer 61a (a first magnetic body layer).

The first bias magnetic layer 61a is provided between the film unit 55 and the first upper insulating layer 91u. The first intermediate magnetic layer 71a is provided between the film unit 55 and the first bias magnetic layer 61a. The first insulating layer 91a is provided between the film unit 55 and the first intermediate magnetic layer 71a. The first protective layer 81 is provided between the first upper insulating layer 91u and the first bias magnetic layer 61a.

The stacked structure in the X-axis direction of the stacked unit SB1 is as follows.

A first side insulating layer 91s, the first bias applying unit BA1, the first protective layer 81, and the first upper insulating layer 91u are stacked in the X-axis direction in the stacked unit SB1. The first bias applying unit BA1 further includes a first side intermediate magnetic layer 71s and a first side magnetic layer 61s.

The first side magnetic layer 61s is provided between the first upper insulating layer 91u and at least a portion of the strain sensor 50. The first side intermediate magnetic layer 71s is provided between the first side magnetic layer 61s and at least a portion of the strain sensor 50. The first side insulating layer 91s is provided between the first side intermediate magnetic layer 71s and at least a portion of the strain sensor 50. The first protective layer 81 is provided between the first upper insulating layer 91u and the first side magnetic layer 61s.

At least a portion of the first magnetic layer 10 of the strain sensor 50 and at least a portion of the first bias magnetic layer 61a overlap in the X-axis direction. A portion of the first side intermediate magnetic layer 71s is positioned between the first bias magnetic layer 61a and at least a portion of the strain sensor 50.

The first insulating layer 91a and the first side insulating layer 91s are provided to be continuous. For example, the first insulating layer 91a and the first side insulating layer 91s include the same material and are formed simultaneously. In such a case, there may not be a distinct boundary between the first insulating layer 91a and the first side insulating layer 91s. In the description hereinbelow, there are cases where the first insulating layer 91a and the first side insulating layer 91s together are called the insulating layer 91.

The first intermediate magnetic layer 71a and the first side intermediate magnetic layer 71s are provided to be continuous. For example, the first intermediate magnetic layer 71a and the first side intermediate magnetic layer 71s include the same material and are formed simultaneously. In such a case, there may not be a distinct boundary between the first intermediate magnetic layer 71a and the first side intermediate magnetic layer 71s. In the description hereinbelow, there are cases where the first intermediate magnetic layer 71a and the first side intermediate magnetic layer 71s together are called the intermediate magnetic layer 71.

The first bias magnetic layer 61a and the first side magnetic layer 61s are provided to be continuous. For example, the first bias magnetic layer 61a and the first side magnetic layer 61s include the same material and are formed simultaneously. In such a case, there may not be a distinct boundary between the first bias magnetic layer 61a and the first side magnetic layer 61s. In the description hereinbelow, there are cases where the first bias magnetic layer 61a and the first side magnetic layer 61s together are called a bias magnetic layer 61.

The insulating layer 91 and the first upper insulating layer 91u each include, for example, at least one of Si oxide or Al oxide.

For example, the thickness (the thickness along the X-axis direction) of the first side insulating layer 91s is not more than the thickness (the thickness along the Z-axis direction) of the first insulating layer 91a. The thickness of the first insulating layer 91a is, for example, not less than 2 nm and not more than 20 nm. Thereby, the lower foundation layer 41 and the first bias applying unit BA1 can be electrically insulated from each other; and the lower electrode 51 and the first bias applying unit BA1 can be electrically insulated from each other. The position in the Z-axis direction of the first bias applying unit BA1 formed on the first insulating layer 91a may be adjusted with respect to the position in the Z-axis direction of the first magnetic layer 10. In the case where the first insulating layer 91a is too thin, the electrical insulation is not maintained. In the case where the insulating film that is used to form the first insulating layer 91a is formed to be thick, the position of the first magnetic layer 10 and the position of the first bias applying unit BA1 are aligned by making a deep hole in the insulating film. In such a case, re-deposition (re-adhering) occurs easily when forming the hole. Thereby, this is unfavorable because there is a risk that the current flowing through the strain sensor 50 may be shunted.

The thickness of the first side insulating layer 91s is, for example, not less than 2 nm and not more than 20 nm. The first bias applying unit BA1 and the strain sensor 50 are physically separated from each other and electrically insulated from each other by the first side insulating layer 91s. The first side insulating layer 91s may not always be provided according to the method of the conduction of the strain sensor 50 and the materials of the bias layers. In the case where the first side insulating layer 91s is too thin, the electrical insulation is not maintained. In the case where the first side insulating layer 91s is too thick, the distance between the first bias applying unit BA1 and the first magnetic layer 10 undesirably increases; the magnetic isolation becomes large; and the demagnetizing field suppression effect decreases.

When the leakage portion of the magnetic flux from the first bias applying unit BA1 also is considered, it is favorable for the magnetic thickness (the product of the saturation magnetization and the film thickness) of the first bias applying unit BA1 to be thicker than the magnetic thickness of the first magnetic layer 10. Here, the film thickness of the first bias applying unit BA1 is the total of the thickness of the first bias magnetic layer 61a and the thickness of the first intermediate magnetic layer 71a along the Z-axis direction.

It is desirable for the bias magnetic layer 61 to be a Co-based hard magnetic layer. For example, the bias magnetic layer 61 includes an alloy (CoPt) including cobalt (Co) and platinum (Pt). The magnetization direction of the bias magnetic layer 61 is fixed in one direction by magnetization due to an external magnetic field. A bias magnetic field from the bias magnetic layer 61 having the magnetization fixed in the one direction is applied to the first magnetic layer 10.

For example, the thickness (the thickness along the X-axis direction) of the first side magnetic layer 61s is not more than the thickness (the thickness along the Z-axis direction) of the first bias magnetic layer 61a. For example, the thickness of the first bias magnetic layer 61a is not less than 5 nm and not more than 40 nm. (The thickness of the first side magnetic layer 61s is not less than 2 nm and not more than 20 nm).

It is desirable for the intermediate magnetic layer 71 to be a material that promotes the c-axis in-plane orientation of the Co-based hard magnetic layer. Thereby, a coercive force Hc and the residual magnetization of the Co-based hard magnetic layer included in the bias magnetic layer 61 can be improved. For example, the c-axis in-plane orientation of the Co-based hard magnetic layer can be promoted by using an alloy having a bcc structure as the foundation layer.

In the case where the thickness of the bias magnetic layer 61 is uselessly increased, a bias magnetic field become too strong, and a strong bias magnetic field is applied to suppress the degradation of the characteristics due to the demagnetizing field, the demagnetizing field is not suppressed; and the change of the magnetization direction of the first magnetic layer 10 due to the strain is undesirably impeded. Therefore, the element characteristics degrade when merely increasing the thick of the bias magnetic layer 61.

The problem of the demagnetizing field is related to how much the magnetic domain of the edge portion of the first magnetic layer 10 is suppressed; and the magnetic field from the bias magnetic layer must be transmitted efficiently to the element edge portion. Therefore, it is desirable for the saturation magnetization of the bias applying unit to be high.

On the other hand, to apply a stable bias magnetic field, it is desirable for the coercive force of the first bias magnetic layer 61a to be high. CoPt-based materials are superior in this regard. However, the saturation magnetization of CoPt-based materials is relatively low.

Therefore, to obtain a high saturation magnetization for the bias applying film, the intermediate magnetic layer 71 includes a material having a high saturation magnetization; and the intermediate magnetic layer 71 is stacked with the first bias magnetic layer 61a. Therefore, it is desirable for the saturation magnetization of the intermediate magnetic layer 71 to be higher than the saturation magnetization of the first bias magnetic layer 61a. Further, it is desirable for the intermediate magnetic layer 71 to have a sufficient saturation magnetization for the magnetization of the first magnetic layer 10.

To effectively apply the bias magnetic field from the bias magnetic layer 61 to the first magnetic layer 10, it is desirable for the saturation magnetization of the intermediate magnetic layer 71 to be larger than the saturation magnetization of the bias magnetic layer 61; and it is desirable for the intermediate magnetic layer 71 to have soft magnetic properties for the purpose of the efficient use of the magnetic field from the first bias magnetic layer 61a is not impeded. Therefore, it is desirable for the intermediate magnetic layer 71 to be a soft magnetic body that has a bcc structure and a high saturation magnetization. Thereby, it is desirable for the intermediate magnetic layer 71 to include iron (Fe) having a large saturation magnetization. For example, the intermediate magnetic layer 71 includes an alloy including iron and cobalt.

For example, the thickness (the thickness along the X-axis direction) of the first side intermediate magnetic layer 71s is not more than the thickness (the thickness along the Z-axis direction) of the first intermediate magnetic layer 71a. The thickness of the first intermediate magnetic layer 71a is not less than 3 nm and not more than 10 nm. Thereby, for example, the c-axis in-plane orientation of the first bias magnetic layer 61a formed on the first intermediate magnetic layer 71a can be promoted. The saturation magnetization of the bias applying film can be set to be large by the intermediate magnetic layer 71 having the high saturation magnetization. On the other hand, the coercive force of the first bias applying unit BA1 decreases markedly if the contribution of the intermediate magnetic layer 71 is too large. Thereby, it is desirable for the proportion of the thickness of the first intermediate magnetic layer 71a to the total film thickness (the total of the thickness of the first bias magnetic layer 61a and the thickness of the first intermediate magnetic layer 71a along the Z-axis direction) of the first bias applying unit BA1 to be 30% or less. The thickness of the first side intermediate magnetic layer 71s is not less than 2 nm and not more than 10 nm. Thereby, for example, the bias magnetic field from the bias magnetic layer 61 is applied effectively to the first magnetic layer 10.

The first protective layer 81 protects the first bias applying unit BA1 from the damage in the subsequent element formation processes. The first protective layer 81 may include at least one of Cr or Cu.

The stacked structure in the Z-axis direction of the stacked unit SB2 is as follows.

A second insulating layer 92a, the second bias applying unit BA2, a second protective layer 82, and a second upper insulating layer 92u are stacked in the Z-axis direction in the stacked unit SB2. The second bias applying unit BA2 includes a second intermediate magnetic layer 72a and a second bias magnetic layer 62a (a second magnetic body layer).

The second bias magnetic layer 62a is provided between the film unit 55 and the second upper insulating layer 92u. The second intermediate magnetic layer 72a is provided between the film unit 55 and the second bias magnetic layer 62a. The second insulating layer 92a is provided between the film unit 55 and the second intermediate magnetic layer 72a. The second protective layer 82 is provided between the second upper insulating layer 92u and the second bias magnetic layer 62a.

The stacked structure in the X-axis direction of the stacked unit SB2 is as follows.

A second side insulating layer 92s, the second bias applying unit BA2, the second protective layer 82, and the second upper insulating layer 92u are stacked in the X-axis direction in the stacked unit SB2. The second bias applying unit BA2 further includes a second side intermediate magnetic layer 72s and a second side magnetic layer 62s.

The second side magnetic layer 62s is provided between the second upper insulating layer 92u and at least a portion of the strain sensor 50. The second side intermediate magnetic layer 72s is provided between the second side magnetic layer 62s and at least a portion of the strain sensor 50. The second side insulating layer 92s is provided between the second side intermediate magnetic layer 72s and at least a portion of the strain sensor 50. The second protective layer 82 is provided between the second upper insulating layer 92u and the second side magnetic layer 62s.

At least a portion of the first magnetic layer 10 of the strain sensor 50 and at least a portion of the second bias magnetic layer 62a overlap in the X-axis direction. A portion of the second side intermediate magnetic layer 72s is positioned between the second bias magnetic layer 62a and at least a portion of the strain sensor 50.

The second insulating layer 92a and the second side insulating layer 92s are provided to be continuous. In the description hereinbelow, there are cases where the second insulating layer 92a and the second side insulating layer 92s together are called the insulating layer 92.

The second intermediate magnetic layer 72a and the second side intermediate magnetic layer 72s are provided to be continuous. In the description hereinbelow, there are cases where the second intermediate magnetic layer 72a and the second side intermediate magnetic layer 72s together are called the intermediate magnetic layer 72.

The second intermediate magnetic layer 72a and the second side intermediate magnetic layer 72s are provided to be continuous. In the description hereinbelow, there are cases where the second bias magnetic layer 62a and the second side magnetic layer 62s together are called the bias magnetic layer 62.

Otherwise, descriptions similar to those of the first insulating layer 91a, the first intermediate magnetic layer 71a, the first bias magnetic layer 61a, the first protective layer 81, the first upper insulating layer 91u, the first side insulating layer 91s, the first side intermediate magnetic layer 71s, and the first side magnetic layer 61s are applicable respectively to the second insulating layer 92a, the second intermediate magnetic layer 72a, the second bias magnetic layer 62a, the second protective layer 82, the second upper insulating layer 92u, the second side insulating layer 92s, the second side intermediate magnetic layer 72s, and the second side magnetic layer 62s. For example, the insulating layer 91 and the insulating layer 92 are provided to be continuous. The insulating layer 91 and the insulating layer 92 may include the same material and may be formed simultaneously.

An insulating layer 90 is stacked on the stacked unit SB1 and the stacked unit SB2. For example, the insulating layer 90 is provided to cover the entire area shown in FIG. 4A other than the strain sensor 50 so that the metal portions of the bias layers are not exposed at the front surface.

By providing bias applying units such as those described above, it is possible to apply an appropriate bias magnetic field to the first magnetic layer 10.

Investigation results of the strain sensing element according to the embodiment will now be described.

A first sample S01 was investigated as the strain sensing element 201 according to the embodiment.

The material and thickness of each layer included in the first sample S01 are as follows. The numerical values of the composition ratios and the thicknesses are the design values.

Strain Sensor
  Foundation layer 41: Ta (1 nm)/Cu (3 nm)/Ta (10 nm)/Ru (2 nm)
  Pinning layer 42: $Ir_{22}Mn_{78}$ (7 nm)
  Second fixed magnetic layer 43: $Co_{75}Fe_{25}$ (2.5 nm)
  Magnetic coupling layer 44: Ru (0.9 nm)
  First fixed magnetic layer (second magnetic layer 20): $Co_{40}Fe_{40}B_{20}$ (3 nm)
  Intermediate layer 30: MgO (2 nm)
  Free magnetic layer (first magnetic layer 10): $Co_{40}Fe_{40}B_{20}$ (4 nm)
  Capping layer 45: MgO (2 nm)/Cu (1 nm)/Ta (2 nm)/Ru (22 nm)

Stacked Unit SB1
  Insulating layer 91: $AlO_x$ (10 nm)
  Intermediate magnetic layer 71: $Fe_{85}Co_{15}$ (5 nm)
  Bias magnetic layer 61: $Co_{80}Pt_{20}$ (1.3 nm)
  First protective layer 81: Cr (5 nm)
  First upper insulating layer 91u: $AlO_x$ The thickness of the stacked unit SB1 becomes thinner than the design value at the vicinity of the strain sensor 50 when making the strain sensing element according to the embodiment. The material and thickness of the stacked unit SB2 are similar to those of the stacked unit SB1. The stacked structure of the first sample S01 is similar to the example described in regard to FIG. 3 and FIGS. 4A to 4C. The element size (the size of the strain sensor when viewed along the Z-axis direction) of the first sample S01 is 10 μm by 10 μm.

A second sample S02 and a third sample S03 were investigated as reference examples. The first bias applying unit BA1 and the second bias applying unit BA2 are not provided in the second sample S02. Otherwise, the second sample S02 is similar to the first sample S01. The first bias applying unit BA1 and the second bias applying unit BA2 are not provided in the third sample S03 as well. The element size of the third sample S03 is 20 μm by 20 μm. Otherwise, the third sample S03 is similar to the second sample S02.

The strain sensing elements of the first to third samples S01 to S03 are vertical conduction elements. These samples are formed by patterning using photolithography and milling.

For the first to third samples S01 to S03, after forming the stacked film of the strain sensor, annealing was performed for 1 hour at 320° C. while applying a magnetic field of 6500 oersteds (Oe). Thereby, the magnetizations of the first and second fixed magnetic layers were pinned. In the first sample S01, the magnetizations of the bias magnetic layers 61 and 62 were pinned by applying an external magnetic field of 6500 Oe after forming the bias layers.

Figure 5:
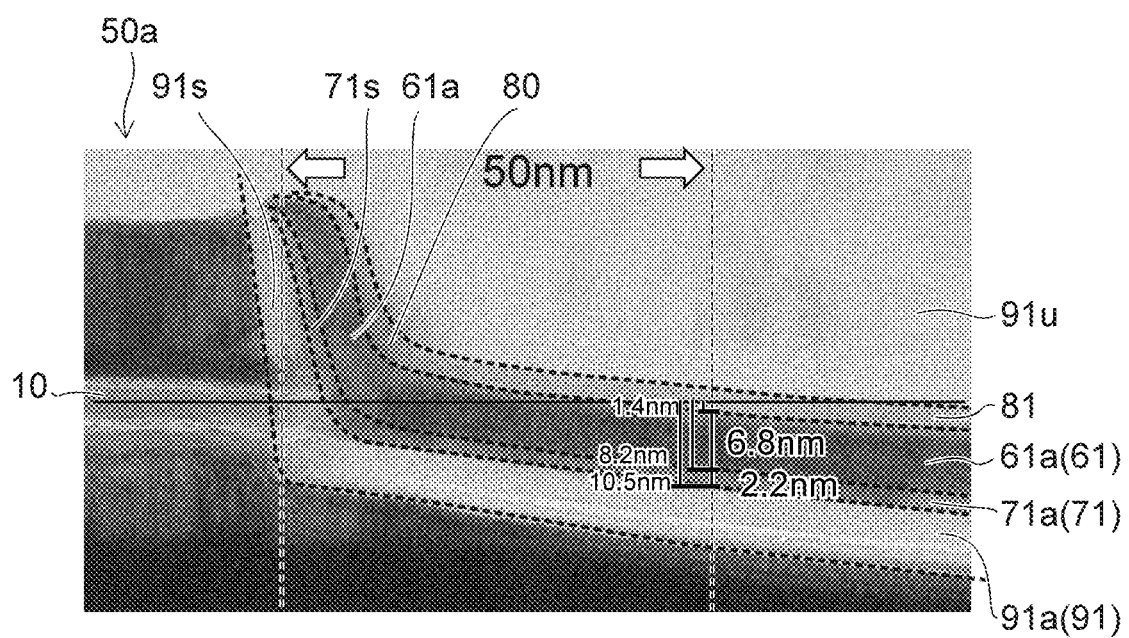
FIG. 5 is a micrograph showing the strain sensing element according to the first embodiment.

FIG. 5 is a micrograph illustrating the strain sensing element according to the first embodiment.

FIG. 5 is a cross section TEM image of a region including the bias layer of the first sample S01. FIG. 5 corresponds to a portion of the schematic cross-sectional view shown in FIG. 4B.

As shown in FIG. 5, the stacked unit SB1 (the first bias applying unit BA1) is provided to be adjacent to the free magnetic layer (the first magnetic layer 10) which is in the amorphous state. In FIG. 5, the stacked structure described in regard to FIG. 4B can be confirmed.

Figure 6A:
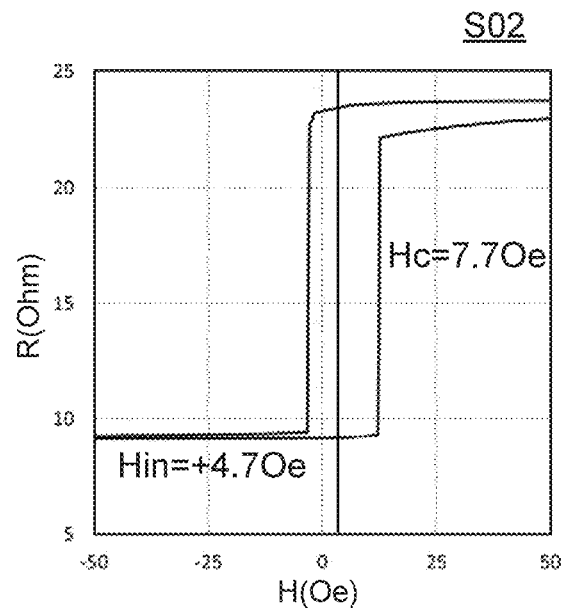
FIG. 6A and FIG. 6B are graphs of characteristics of the strain sensing elements.
Figure 6B:
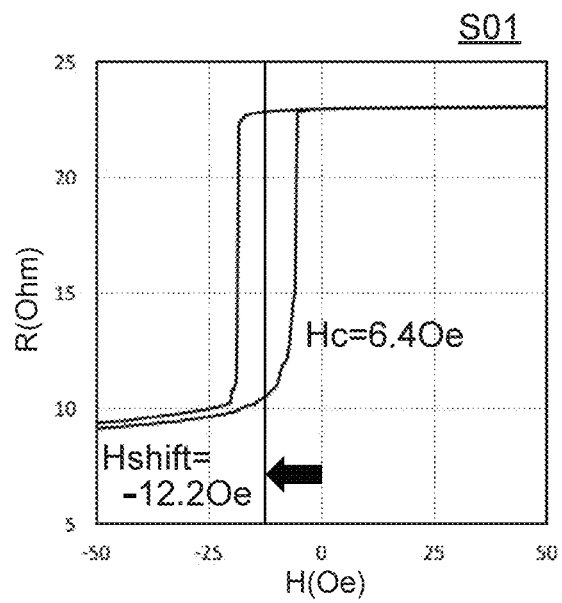

FIG. 6A and FIG. 6B are graphs of characteristics of the strain sensing elements.

FIG. 6A and FIG. 6B show the relationship (the RH loop) of a magnetic field H (Oe) and an electrical resistance R (Ohms) of the strain sensor for the strain sensing elements. The same orientation as the direction of the bias magnetic field is used as the positive direction of the measured magnetic field.

FIG. 6A shows a characteristic of the second sample S02 in which the bias layers are not provided. FIG. 6B shows a characteristic of the first sample S01 in which the bias layers are provided.

In the RH loop of FIG. 6A, the loop shape of the easy magnetization axis has relatively good squareness. However, a portion of the RH loop of FIG. 6A before saturation has step-like behavior; and a magnetic field that is 50 Oe or more is necessary for saturation. This suggests that a magnetic domain occurs in the interior of the strain sensor due to the contribution of the demagnetizing field.

As shown in FIG. 6B, the loop shape of the easy magnetization axis is obtained for the RH loop of the element in which the bias layers are provided; but the characteristic is different from the case of FIG. 6A without the bias layers. A shift (H-shift) of 12.2 Oe in the negative magnetic field direction is confirmed for the RH loop of FIG. 6B. The shift is due to the contribution of the bias layers. A bias magnetic field in the positive direction is applied by the bias layers to the free magnetic layer. The shift described above means that the bias layers apply energy corresponding to the shift amount to the free magnetic layer as a bias magnetic field. In FIG. 6B, the shape of the RH loop has asymmetry. This also indicates that the magnetic field is applied to the free magnetic layer by the bias layers.

The coercive force Hc of the free magnetic layer of the first sample S01 is estimated to be 6.4 Oe from the RH loop. On the other hand, the coercive force Hc of the second sample S02 was 7.7 Oe. The coercive force Hc is a characteristic index of the ease of the magnetization rotation and is applicable to the rotation due to the inverse magnetostrictive effect as well. The coercive force Hc also is an index of the magnitude of the effects of the demagnetizing field. The first sample S01 that obtains a lower coercive force Hc than the second sample S02 is superior for both aspects recited above.

As described above, the free magnetic layer of the first sample S01 is similar to that of the second sample S02. That is, the coercive force and magnetostriction of the free magnetic layer of the first sample S01 are substantially the same as those of the second sample S02. However, from FIGS. 6A and 6B, it was found that by providing the bias layers in the first sample S01, compared to the second sample S02, the characteristics as a strain sensing element improve.

Figure 7:
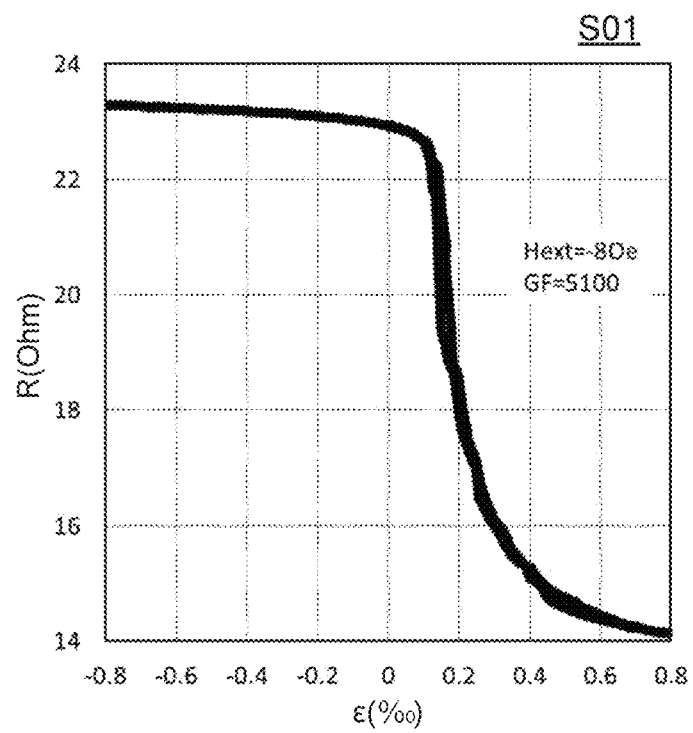
FIG. 7 is a graph of a characteristic of the strain sensing element according to the first embodiment.

FIG. 7 is a graph of a characteristic of the strain sensing element according to the first embodiment.

FIG. 7 shows the relationship (the strain sensor characteristic) between the strain E and the electrical resistance R of the first sample S01. The evaluation of the strain sensor characteristic shown in FIG. 7 is performed by substrate bending.

In the substrate bending, first, a rectangular wafer is prepared by cutting a wafer on which the strain sensor is formed into a rectangular configuration. Strain is applied to the rectangular wafer by four-point bending using knife edges.

Load cells are embedded in the knife edges that bend the rectangular wafer. The strain E that is applied to the strain sensor of the wafer front surface is calculated from the load that is measured by the load cells.

Theoretical formula (1) of a general two-sided simply supported beam is used to calculate the strain ε.

$$\varepsilon = -3(L_1-L_2)G/(2Wt^2 e_s) \quad (1)$$

Here, $e_s$ is the Young's modulus of the wafer, $L_1$ is the edge-to-edge length of the outer knife edges, $L_2$ is the edge-to-edge length of the inner knife edges, W is the width of the rectangular wafer, t is the thickness of the rectangular wafer, and G is the load applied to the knife edges. Here, the loads that are applied to the knife edges are controlled by motors and are modified continuously.

For example, the four points where the loads are applied by the knife edges are positioned in the same plane. The direction of the strain applied to the strain sensing element is perpendicular to the magnetization direction of the second magnetic layer 20. In the specification of the application, strain having a positive value is tensile strain; and strain having a negative value is compressive strain.

FIG. 7 shows the change of the electrical resistance R when the strain ε is swept continuously from −0.8 per mille (‰) to 0.8‰ for the first sample S01. In such a case, the external magnetic field is fixed. After the strains is changed from −0.8‰ to 0.8‰, the strain ε is changed from 0.8‰ to −0.8‰. FIG. 7 shows the strain sensor characteristic of this evaluation.

The external magnetic field was set to −8 Oe in the evaluation of the strain sensor characteristic. In the sensing element of the embodiment, a high gauge factor can be obtained by an appropriate external magnetic field. In the evaluation of the strain sensor characteristic of the first sample S01, the magnetic field at which the highest gauge factor is obtained is applied simply by an external coil.

The gauge factor of the first sample S01 also was estimated from the change of the electrical resistance R for the strain ε of FIG. 7. The gauge factor is expressed by $$GF = (dR/R)/d\varepsilon.$$

From FIG. 7, it was found that the gauge factor of the first sample S01 for an external magnetic field of −8 Oe is 5100.

Figure 8:
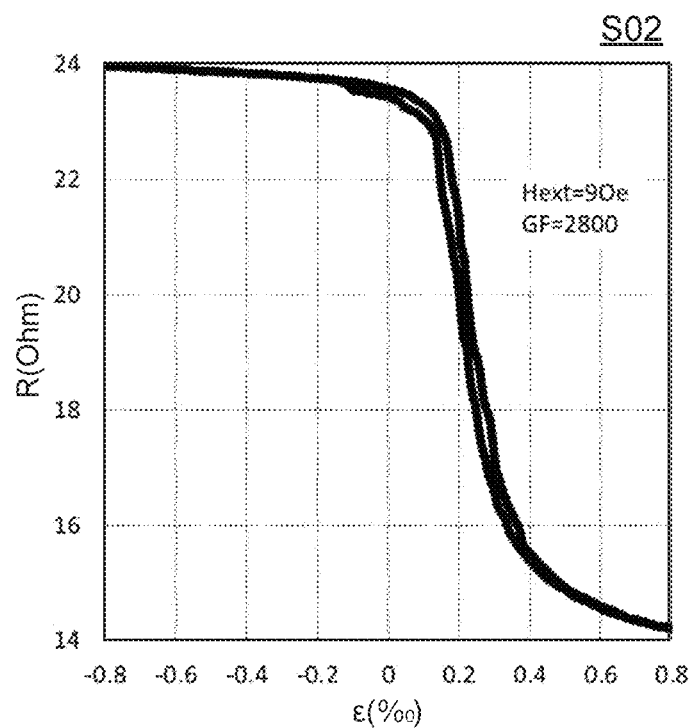
FIG. 8 is a graph of characteristic of the strain sensing element.
Figure 9:
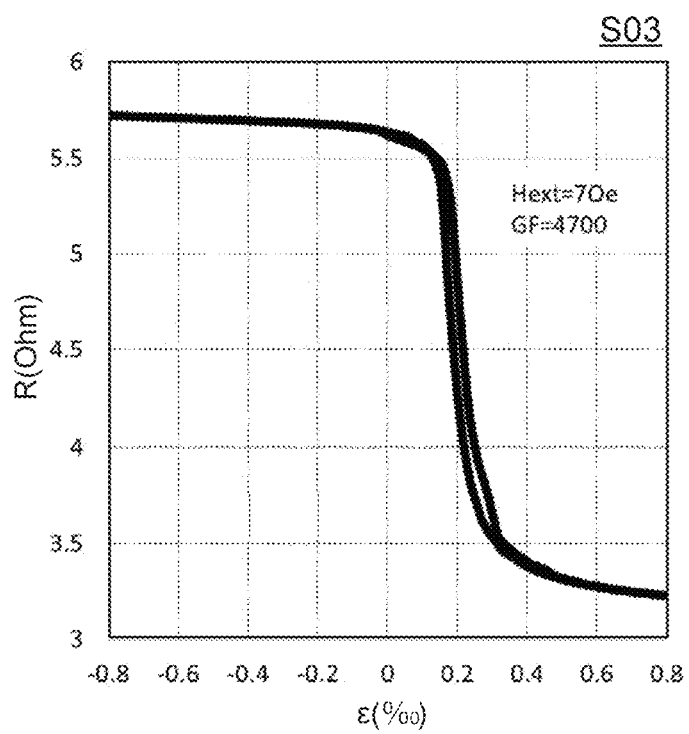
FIG. 9 is a graph of a characteristic of the strain sensing element.

FIG. 8 and FIG. 9 are graphs of characteristics of the strain sensing elements.

FIG. 8 shows the strain sensor characteristic of the second sample S02. FIG. 8 shows the change of the electrical resistance R when the strain ε is swept continuously from −0.8 ‰ to 0.8‰ for the second sample S02. In such a case, the external magnetic field was fixed at 9 Oe where the highest gauge factor was obtained. From FIG. 8, it was found that the gauge factor of the second sample S02 is 2800.

FIG. 9 shows the strain sensor characteristic of the third sample S03. FIG. 9 shows the change of the electrical resistance R when the strain ε is swept continuously from −0.8 ‰ to 0.8‰ for the third sample S03. In such a case, the external magnetic field was fixed at 7 Oe where the highest gauge factor was obtained. From FIG. 9, it was found that the gauge factor of the third sample S03 is 4700.

Although the element size is different between the second sample S02 and the third sample S03, the formation conditions and element formation processes of each layer are the same. However, the gauge factor of the second sample S02 differs greatly from the gauge factor of the third sample S03. For example, the characteristics of the free magnetic layer of the second sample S02 are equal to the characteristics of the free magnetic layer of the third sample S03. However, the gauge factor of the second sample S02 is half of that of the third sample S03. It is considered that this is because the effects of the demagnetizing field are large in the second sample S02 because the element size is reduced from 20 μm to 10 μm.

On the other hand, the element size of the first sample S01 and the element size of the second sample S02 are the same. However, the gauge factor of the first sample S01 in which the bias layers are provided is greatly improved from the gauge factor of the second sample S02 in which the bias layers are not provided. The gauge factor of the first sample S01 is higher than the gauge factor of the third sample for which the element size is large and the effects of the demagnetizing field are considered to be small.

In the first sample S01, it is considered that the effects of the demagnetizing field are suppressed by the bias layers. For example, in the first sample S01, it is considered that the bias magnetic field balances with the rotation of the magnetization due to the strain and an equilibrium state of the magnetization is realized. For example, in the first sample S01, the equilibrium state breaks due to a slight strain. Thereby, high strain sensitivity can be realized.

A fourth sample S04, a fifth sample S05, and a sixth sample S06 that are recited below were investigated as reference examples.

In the fourth sample S04, a nonmagnetic foundation layer of Cr (7 nm) is provided instead of the intermediate magnetic layer 71. In the fourth sample S04, the thickness of the $Co_{80}Pt_{20}$ included in the bias magnetic layer is set to 22 nm. Otherwise, the fourth sample S04 is similar to the first sample S01.

The stacked units provided at the two ends of the strain sensor of the fourth sample S04 have the structure of insulating layer/nonmagnetic foundation layer/bias magnetic layer/protective layer/insulating layer. That is, in the fourth sample S04, the bias magnetic layers are formed on the nonmagnetic foundation layer. The element size of the fourth sample S04 is 10 μm by 10 μm.

The strain sensing element of the fourth sample S04 is a vertical conduction element similar to that of the first sample S01. The fourth sample S04 is formed by patterning using photolithography and milling.

The nonmagnetic foundation layer and the bias magnetic layer are not provided in the fifth sample S05. Otherwise, the fifth sample S05 is similar to the fourth sample S04. The element size of the fifth sample S05 is 10 μm by 10 μm.

The element size of the sixth sample S06 is different from that of the fifth sample S05. The element size of the sixth sample S06 is 20 μm by 20 μm. Otherwise, the sixth sample S06 is similar to the fifth sample S05.

For the fourth to sixth samples S04 to S06, annealing was performed for 1 hour at 320° C. while applying a magnetic field of 6500 Oe after forming the stacked film of the strain sensor. Thereby, the magnetizations of the first and second fixed magnetic layers were pinned. For the fourth sample S04, the magnetizations of the bias magnetic layers were pinned by applying an external magnetic field of 6500 Oe after forming the stacked units including the bias magnetic layers.

Figure 10A:
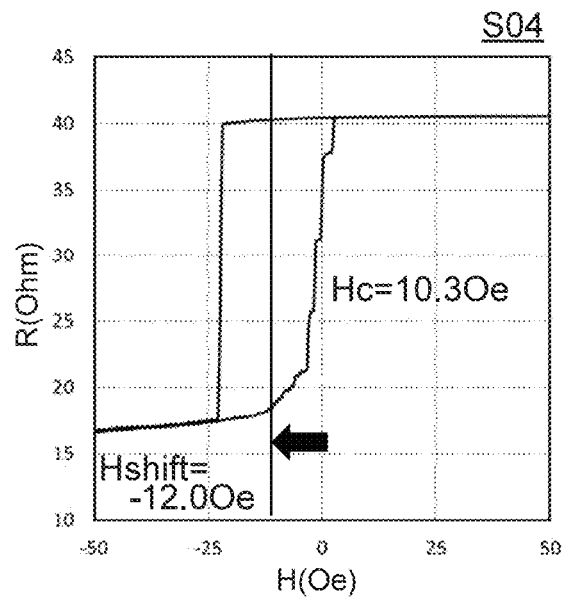
FIG. 10A and FIG. 10B are graphs of characteristics of the strain sensing elements.
Figure 10B:
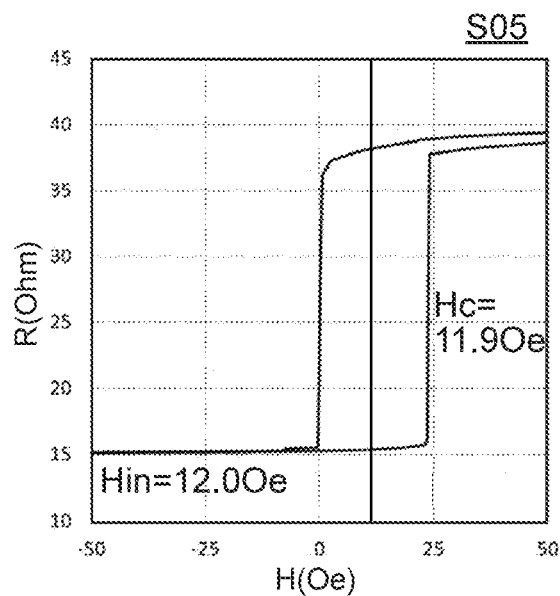

FIG. 10A and FIG. 10B are graphs of characteristics of the strain sensing elements.

FIG. 10A shows the RH loop of the fourth sample S04 including the bias magnetic layers formed on the nonmagnetic foundation layer. FIG. 10B shows the RH loop of the fifth sample S05 in which the bias layers are not provided. In the measurement of the RH loop, the same orientation as the direction of the bias magnetic field is used as the positive direction of the measured magnetic field.

As shown in FIG. 10B, the coercive force of the fifth sample S05 is different from that of the first sample S01. On the other hand, the shape of the RH loop of the fifth sample S05 has a trend similar to the shape of the RH loop of the first sample S01. That is, in the fifth sample S05, the loop shape of the easy magnetization axis has relatively good squareness. However, the shoulder of the RH loop of FIG. 10B is round; there is step-like behavior at a portion of the RH loop before saturation; and a magnetic field that is 50 Oe or more is necessary for saturation. This suggests that a magnetic domain occurs in the interior of the strain sensor due to the contribution of the demagnetizing field.

As shown in FIG. 10A, the loop shape of the easy axis is obtained in the fourth sample S04 in which the bias magnetic layers are provided. A shift (H-shift) of 12.0 Oe in the negative magnetic field direction is confirmed for the RH loop of FIG. 10A. In FIG. 10A, the shape of the RH loop is asymmetric. These indicate that the magnetic fields due to the bias magnetic layers are applied to the free magnetic layer.

The coercive force Hc of the free magnetic layer of the fourth sample S04 is estimated to be 10.3 Oe from the RH loop. On the other hand, the coercive force Hc of the free magnetic layer of the fifth sample S05 was 11.9 Oe. The coercive force Hc is a characteristic index indicating the ease of the magnetization rotation and is applicable to the rotation due to the inverse magnetostrictive effect as well. The coercive force Hc also is an index of the magnitude of the effects of the demagnetizing field. For the aspects recited above, the fourth sample S04 that has a coercive force Hc that is lower than that of the fifth sample S05 is superior. For these aspects, the fourth sample S04 that includes the bias magnetic layers formed on the nonmagnetic foundation layer has a trend similar to that of the first sample S01. However, the fourth sample S04 differs greatly from the first sample S01 in that the RH loop has stairstep configuration behavior. It is estimated that this is caused by the magnetic domain due to the demagnetizing field. It is considered that the effects of the demagnetizing field cannot be suppressed sufficiently by a bias structure such as that of the fourth sample S04.

The configuration of the free magnetic layer of the fourth sample S04 is similar to the configuration of the free magnetic layer of the fifth sample S05. Accordingly, for example, the characteristics of the free magnetic layer of the fourth sample S04 are substantially the same as the characteristics of the free magnetic layer of the fifth sample S05. However, from FIGS. 10A and 10B, it can be seen that by providing the bias magnetic layers in the fourth sample S04, the characteristics as a strain sensing element improve compared to the fifth sample S05. However, the characteristics of the fourth sample S04 as a strain sensing element are insufficient compared to the first sample S01.

Figure 11:
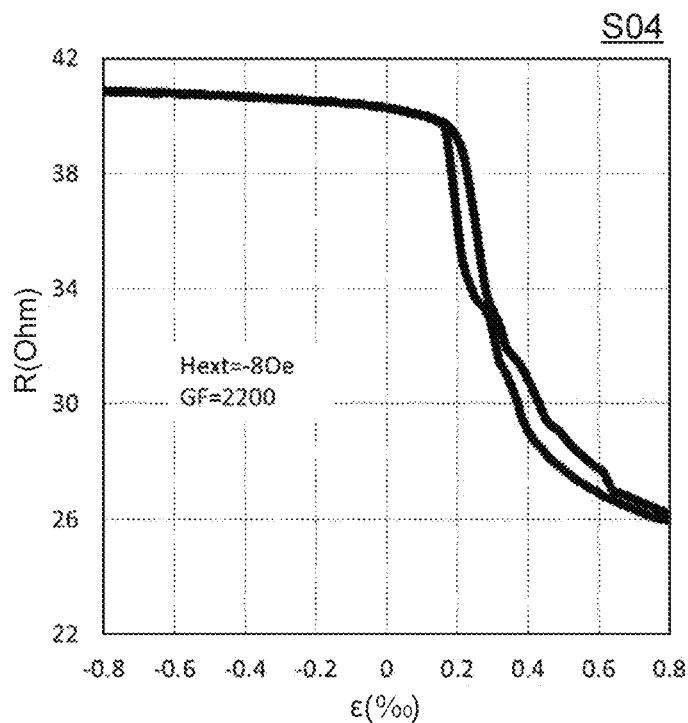
FIG. 11 is a graph of a characteristic of the strain sensing element.

FIG. 11 is a graph of a characteristic of the strain sensing element.

FIG. 11 shows the strain sensor characteristic of the fourth sample S04. The substrate bending described in regard to FIG. 7 is used to evaluate the strain sensor characteristic of the fourth sample S04. The measurement method is similar to that of the first and second samples S01 and S02.

FIG. 11 shows the change of the electrical resistance R when the strain ε is swept continuously from −0.8‰ to 0.8‰ for the fourth sample S04. In such a case, the evaluation was performed in a state in which the external magnetic field was fixed. The strain ε is changed from 0.8‰ to −0.8‰ after changing the strain from −0.8‰ to 0.8‰. FIG. 11 shows the strain sensor characteristic for this evaluation.

In the evaluation of the strain sensor characteristic, the external magnetic field was set to −8 Oe. In the sensing element of the embodiment, a high gauge factor can be obtained by an appropriate external magnetic field. In the evaluation of the strain sensor characteristic of the fourth sample S04, the magnetic field at which the highest gauge factor is obtained is applied simply by an external coil.

From FIG. 11, the gauge factor of the fourth sample S04 was estimated from the change of the electrical resistance R with respect to the strain E. From FIG. 11, it was found that the gauge factor of the fourth sample S04 is 2200 for an external magnetic field of −8 Oe.

Figure 12:
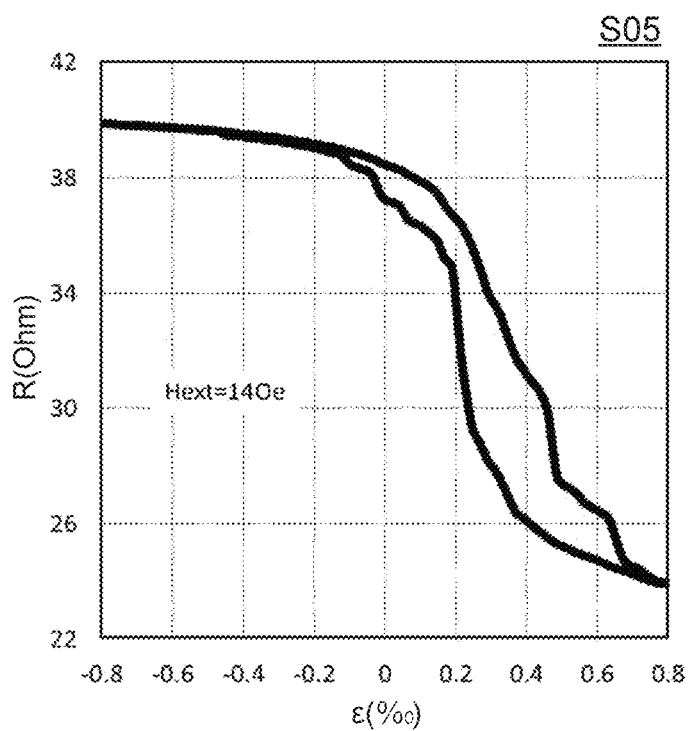
FIG. 12 is a graph of characteristic of the strain sensing element.
Figure 13:
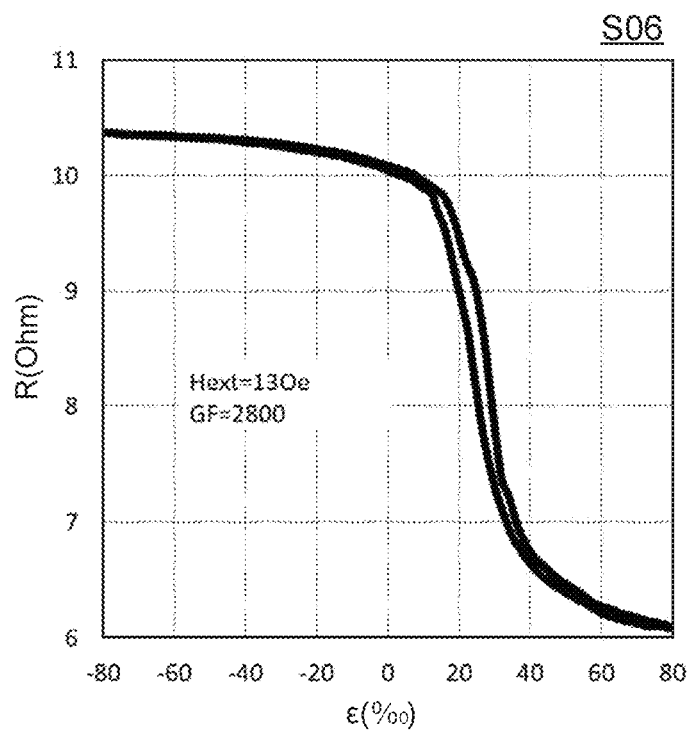
FIG. 13 is a graph of a characteristic of the strain sensing element.

FIG. 12 and FIG. 13 are graphs of characteristics of the strain sensing elements.

FIG. 12 shows the strain sensor characteristic of the fifth sample S05. FIG. 12 shows the change of the electrical resistance R when the strain c is swept continuously from −0.8 ‰ to 0.8‰ for the fifth sample S05. In such a case, the external magnetic field was fixed at 14 Oe. As shown in FIG. 12, the strain sensor characteristic of the fifth sample S05 has hysteresis having wide separation in the RE loop. In the strain sensor characteristic of the fifth sample S05, there is a step similar to Barkhausen noise. Therefore, the calculation of the gauge factor is difficult for the fifth sample S05. The strain sensor characteristic of the fifth sample S05 was irreversible for a magnetic field weaker than the external magnetic field.

FIG. 13 shows the strain sensor characteristic of the sixth sample S06. FIG. 13 shows the change of the electrical resistance R when the strain c is swept continuously from −0.8 ‰ to 0.8‰ for the sixth sample S06. In such a case, the external magnetic field was fixed at 13 Oe where the highest gauge factor was obtained. From FIG. 13, it was found that the gauge factor of the sixth sample S06 is 2800.

Although the element size is different between the fifth sample S05 and the sixth sample S06, the formation conditions and element formation processes of each layer are the same. However, the strain sensor characteristic (the Rε characteristic) of the fifth sample S05 differs greatly from the strain sensor characteristic of the sixth sample S06. This markedly indicates the degradation of the characteristics due to the decrease of the element size.

For example, the free magnetic layer of the fifth sample S05 is equal to the free magnetic layer of the sixth sample S06. However, it is difficult to even calculate the gauge factor of the fifth sample S05. It is considered that this is because the effects of the demagnetizing field are large for the fifth sample S05 because the element size is reduced from 20 μm by 20 μm to 10 μm by 10 μm.

On the other hand, compared to the fifth sample S05 in which the bias layers are not provided, the strain sensor characteristic is greatly improved for the fourth sample S04 that includes the bias magnetic layers. The element size of the fourth sample S04 and the element size of the fifth sample S05 are the same and are 10 μm by 10 μm.

For the fifth sample S05, it is considered that the effects of the demagnetizing field are small because the element size is large and is 20 μm by 20 μm. For the fourth sample S04, it is possible to obtain a gauge factor that is slightly less than that of the fifth sample S05. However, the fourth sample S04 does not obtain a high gauge factor such as that of the first sample S01.

For example, there is a reference example in which a CoPt film formed on a nonmagnetic foundation layer of Cr or the like is used as the bias magnetic layers. Conversely, in the embodiment, a CoPt film that is formed on a foundation layer (the intermediate magnetic layer 71) including FeCo is used as the bias magnetic layers 61. Thereby, as described with reference to the investigation results recited above, the characteristics of the strain sensing element can be improved.

The CoPt film that is used to form the bias magnetic layers 61 is formed on the intermediate magnetic layer 71 which is the foundation layer of the bias magnetic layers 61 when forming the element. Therefore, as shown in FIGS. 4A to 4C, the foundation layer is more proximal to the strain sensor than the CoPt film that is used to form the bias magnetic layers 61. In the case where a nonmagnetic foundation layer of Cr or the like is used as the foundation layer of the bias magnetic layers in such a structure, the foundation layer is used as a nonmagnetic gap. Conversely, in the case where the intermediate magnetic layer 71 including FeCo is used as the foundation layer of the bias magnetic layers, the intermediate magnetic layer 71 functions as a magnetic bias film. Therefore, the magnetic gap between the strain sensor 50 and the bias magnetic layers 61 can be reduced. Thereby, the bias can be applied effectively by the strain sensor 50.

In the embodiment, the intermediate magnetic layer 71 includes a material having a high saturation magnetization such as FeCo. Thereby, a strong magnetic field is generated at the end portion of the strain sensor because the magnetic flux density is high. Thereby, the bias effect can be increased. Therefore, in the embodiment, it is desirable for the saturation magnetization of the intermediate magnetic layer 71 to be larger than the saturation magnetization of the strain sensor (the saturation magnetization of the first magnetic layer 10). In the example (the first sample S01) recited above, the saturation magnetization of the first magnetic layer 10 is about 1.4 T; but the saturation magnetization of the intermediate magnetic layer 71 including FeCo is about 2.0 T. That is, in the first sample S01, the magnitude of the saturation magnetization of the intermediate magnetic layer 71 satisfies the desirable conditions recited above.

The strain sensing element is not same as a HDD (Hard Disk Drive) head or a magnetoresistance effect element in which the magnetization rotates due to a magnetic field, because the magnetization of the strain sensing element rotates due to strain energy. By the bias applying unit of the strain sensing element having a structure such as that recited above, the demagnetizing field suppression effect is realized; and, for example, the strain energy and the bias magnetic field can be caused to compete. For example, the bias magnetic field can suppress the rotation of the magnetization of the first magnetic layer 10 (the free magnetic layer) due to the strain energy and then release the magnetization when a strain not less than a constant strain is applied. Thereby, an instantaneous magnetization rotation can be generated. In such a case, it is possible to obtain a larger gauge factor than when the bias magnetic field is not applied. Accordingly, the characteristics can be greatly improved by the bias applying unit of the strain sensing element having a structure such as that recited above.

Figure 14:
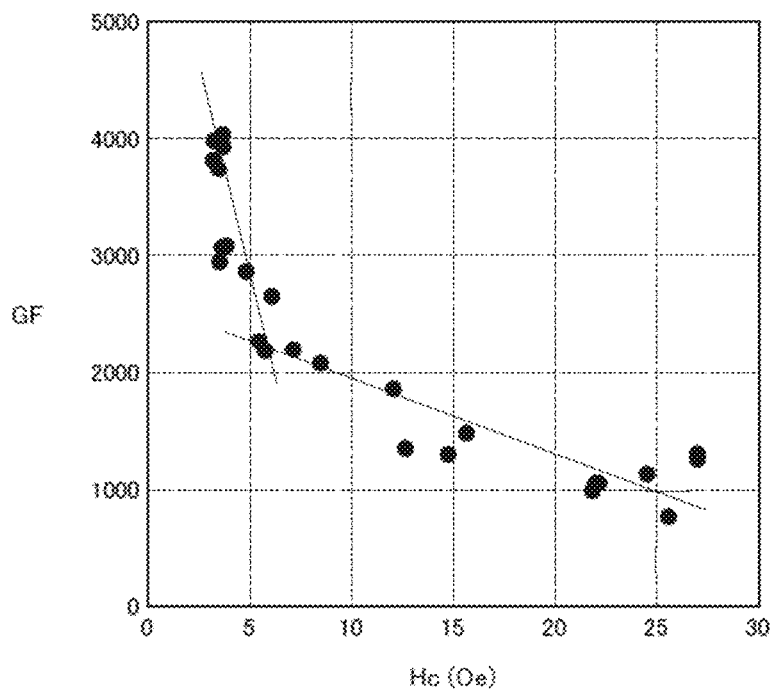
FIG. 14 is a graph of a characteristic of the strain sensing element.

FIG. 14 is a graph of a characteristic of the strain sensing element.

Multiple samples including free magnetic layers having different coercive forces Hc were made; and the relationship between the coercive force Hc and a gauge factor GF was measured for these samples. The horizontal axis of FIG. 14 is the coercive force Hc; and the vertical axis of FIG. 14 is the gauge factor GF. For the evaluation of the coercive force Hc shown in FIG. 14, the M-H measurement of the easy magnetization axis direction was performed by a loop tracer using a magnetic field sweep of 50 Hz. The coercive force Hc was calculated from the measurement results.

As shown in FIG. 14, it can be seen that the gauge factor GF increases as the coercive force Hc decreases. It can be seen that the gauge factor GF increases abruptly when the coercive force Hc is 5 Oe or less. Accordingly, it is favorable for the coercive force Hc of the free magnetic layer to be 5 Oe or less to manufacture the strain sensing element having the high gauge factor GF. The coercive force of the free magnetic layer has different values according to the magnetic field sweep rate of the M-H measurement. For example, the coercive force has lower values as the magnetic field sweep rate decreases. For example, in the case where the coercive force is determined by evaluating using a magnetic field sweep rate of 40 (Oe/min) by a Vibrating Sample Magnetometer (VSM), etc., the gauge factor GF increases abruptly when the coercive force Hc is 4 Oe or less. In the case of the M-H measurement in the range of magnetic field sweep rates of 10 to 100 (Oe/min), in particular, it is more favorable for the coercive force Hc to be 4 Oe or less to set the gauge factor GF to be high.

For such a free magnetic layer having the low coercive force Hc, it is desirable to use a magnetic layer as the foundation layer of the bias magnetic layers. Thereby, a good bias magnetic field can be applied to a free magnetic layer having a thin magnetic thickness without uselessly setting the magnetic thickness of the free magnetic layer to be thick. As in the strain sensing element according to the embodiment, a strain sensing element having a higher sensitivity can be obtained by providing the bias applying unit of FeCo/CoPt.

Second Embodiment

Figure 15A:
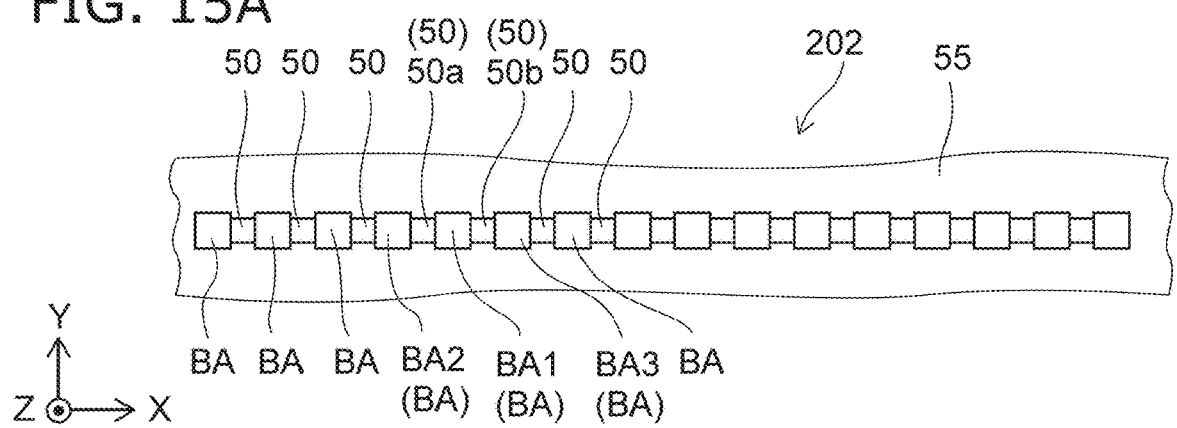
FIG. 15A to FIG. 15C are schematic views showing a strain sensing element according to a second embodiment.
Figure 15B:
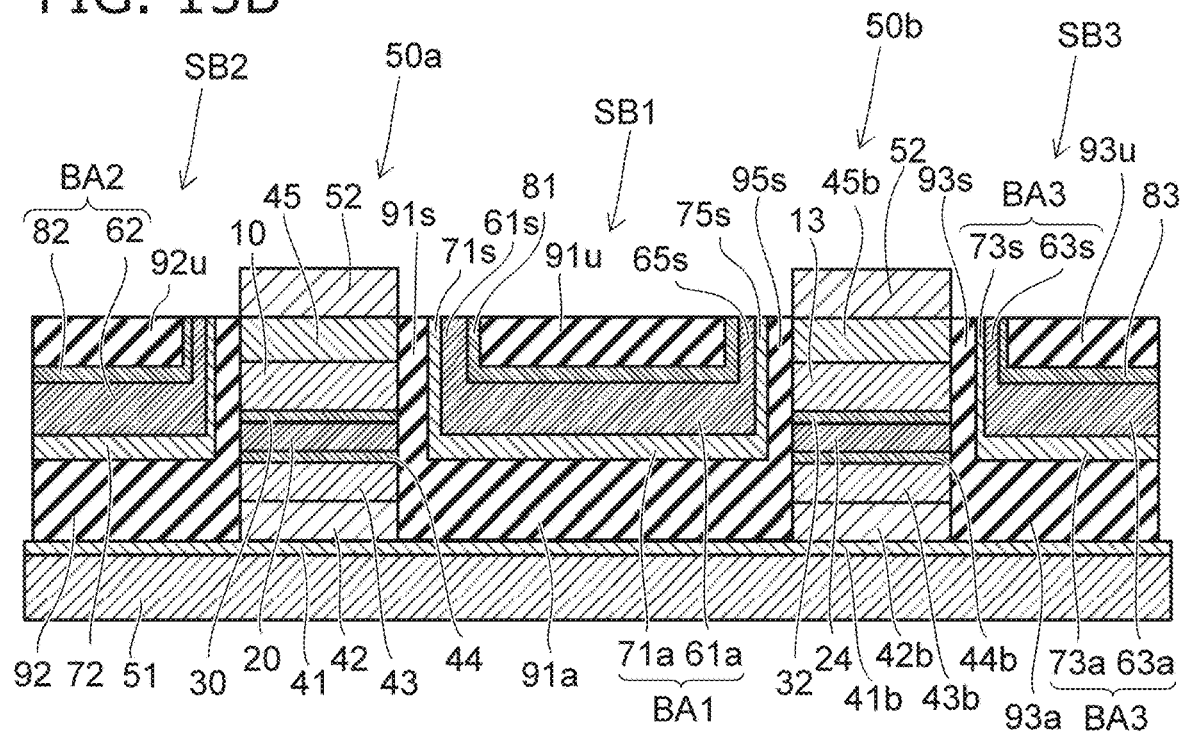
Figure 15C:
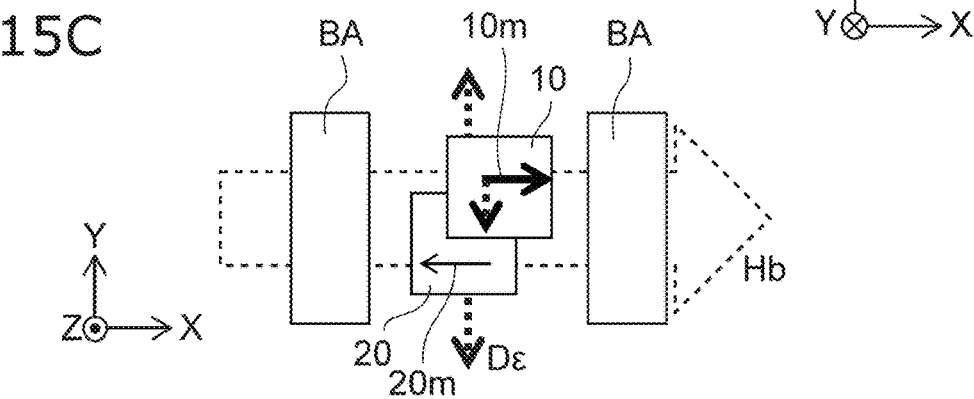

FIG. 15A to FIG. 15C are schematic views illustrating a strain sensing element according to a second embodiment.

FIG. 15A is a schematic plan view showing the strain sensing element 202 according to the second embodiment. As shown in FIG. 15A, the strain sensing element 202 includes the film unit 55, the multiple strain sensors 50, and multiple bias applying units BA.

Each of the multiple bias applying units BA is similar to the first bias applying unit BA1 or the second bias applying unit BA2 described in the first embodiment. Each of the multiple strain sensors 50 is similar to the strain sensor 50 described in the first embodiment.

For example, the multiple strain sensors 50 are provided on the film unit 55 and arranged at a substantially constant spacing in the X-axis direction. The multiple bias applying units BA are provided on the film unit 55 and are disposed between mutually-adjacent strain sensors 50. In other words, in the strain sensing element 202, the strain sensors 50 and the bias applying units BA are arranged alternately along the X-axis direction.

For example, the multiple strain sensors 50 include the first strain sensor 50a and a second strain sensor 50b. The multiple bias applying units BA include the first bias applying unit BA1, the second bias applying unit BA2, and a third bias applying unit BA3 (a third magnetic unit).

The first bias applying unit BA1 is disposed between the second bias applying unit BA2 and the third bias applying unit BA3. The second strain sensor 50b is disposed between the first bias applying unit BA1 and the third bias applying unit BA3. FIG. 15B is a schematic cross-sectional view showing a portion of the strain sensing element 202.

As shown in FIG. 15B, the stacked unit SB2 that includes the second bias applying unit, the first strain sensor 50a, the stacked unit SB1 that includes the first bias applying unit, the second strain sensor 50b, and a stacked unit SB3 that includes the third bias applying unit are arranged in this order in the strain sensing element 202.

A description similar to that of the first embodiment is applicable to the first strain sensor 50a, the stacked unit SB1 (the first bias applying unit BA1), and the stacked unit SB2 (the second bias applying unit BA2).

The second strain sensor 50b includes a third magnetic layer 13, a fourth magnetic layer 24, and a second intermediate layer 32.

The third magnetic layer 13 is, for example, a free magnetic layer. A description similar to that of the first magnetic layer 10 is applicable to the third magnetic layer 13.

The fourth magnetic layer 24 is separated from the third magnetic layer 13 in the Z-axis direction and is provided between the film unit 55 and the third magnetic layer 13. The fourth magnetic layer 24 is, for example, a fixed magnetic layer. A description similar to that of the second magnetic layer 20 is applicable to the fourth magnetic layer 24.

The second intermediate layer 32 is provided between the third magnetic layer 13 and the fourth magnetic layer 24. A description similar to that of the first intermediate layer 30 is applicable to the second intermediate layer 32.

In the example, the second strain sensor 50b includes, arranged in this order, the lower electrode 51, a foundation layer 41b, a pinning layer 42b, a fixed magnetic layer 43b, a magnetic coupling layer 44b, a fixed magnetic layer (the fourth magnetic layer 24), the second intermediate layer 32, a free magnetic layer (the third magnetic layer 13), a capping layer 45b, and the upper electrode 52.

The foundation layer 41b, the pinning layer 42b, the fixed magnetic layer 43b, the magnetic coupling layer 44b, and the capping layer 45b are respectively similar to the lower electrode 51, the foundation layer 41, the pinning layer 42, the second fixed magnetic layer 43, the magnetic coupling layer 44, and the capping layer 45.

The stacked structure in the Z-axis direction of the stacked unit SB3 is as follows.

A third insulating layer 93a, the third bias applying unit BA3, a third protective layer 83, and a third upper insulating layer 93u are stacked in the Z-axis direction in the stacked unit SB3. The third bias applying unit BA3 includes a third intermediate magnetic layer 73a and a third bias magnetic layer 63a (a third magnetic body layer).

The third bias magnetic layer 63a is provided between the film unit 55 and the third upper insulating layer 93u. The third intermediate magnetic layer 73a is provided between the film unit 55 and the third bias magnetic layer 63a. The third insulating layer 93a is provided between the film unit 55 and the third intermediate magnetic layer 73a. The third protective layer 83 is provided between the third upper insulating layer 93u and the third bias magnetic layer 63a.

The stacked structure in the X-axis direction of the stacked unit SB3 is as follows.

A third side insulating layer 93s, the third bias applying unit BA3, the third protective layer 83, and the third upper insulating layer 93u are stacked in the X-axis direction in the stacked unit SB3. The third bias applying unit BA3 further includes a third side intermediate magnetic layer 73s and a third side magnetic layer 63s.

The third side magnetic layer 63s is provided between the third upper insulating layer 93u and at least a portion of the second strain sensor 50b. The third side intermediate magnetic layer 73s is provided between the third side magnetic layer 63s and at least a portion of the second strain sensor 50b. The third side insulating layer 93s is provided between the third side intermediate magnetic layer 73s and at least a portion of the second strain sensor 50b. The third protective layer 83 is provided between the third upper insulating layer 93u and the third side magnetic layer 63s.

At least a portion of the third magnetic layer 13 of the second strain sensor 50b and at least a portion of the third bias magnetic layer 63a overlap in the X-axis direction. A portion of the third side intermediate magnetic layer 73s is positioned between the third bias magnetic layer 63a and at least a portion of the second strain sensor 50b.

The third insulating layer 93a and the third side insulating layer 93s are provided to be continuous. The third intermediate magnetic layer 73a and the third side intermediate magnetic layer 73s are provided to be continuous. The third intermediate magnetic layer 73a and the third side intermediate magnetic layer 73s are provided to be continuous.

Otherwise, descriptions similar to those of the first insulating layer 91a, the first intermediate magnetic layer 71a, the first bias magnetic layer 61a, the first protective layer 81, the first upper insulating layer 91u, the first side insulating layer 91s, the first side intermediate magnetic layer 71s, and the first side magnetic layer 61s are applicable respectively to the third insulating layer 93a, the third intermediate magnetic layer 73a, the third bias magnetic layer 63a, the third protective layer 83, the third upper insulating layer 93u, the third side insulating layer 93s, the third side intermediate magnetic layer 73s, and the third side magnetic layer 63s. Similarly to the insulating layer 90 described in regard to FIGS. 4A to 4C, an insulating layer that covers the stacked units SB1 to SB3 may be provided in the embodiment as well.

In the strain sensing element 202, the stacked unit SB1 further includes a side insulating layer 95s, a side intermediate magnetic layer 75s, and a side magnetic layer 65s.

In the example, the side magnetic layer 65s is provided between the first upper insulating layer 91u and at least a portion of the second strain sensor 50b; the side intermediate magnetic layer 75s is provided between the side magnetic layer 65s and at least a portion of the second strain sensor 50b; and the side insulating layer 95s is provided between the side intermediate magnetic layer 75s and at least a portion of the second strain sensor 50b.

In the embodiment, at least a portion of the third magnetic layer 13 of the second strain sensor 50b and at least a portion of the first bias magnetic layer 61a overlap in the X-axis direction. For example, a portion of the side intermediate magnetic layer 75s is positioned between the first bias magnetic layer 61a and at least a portion of the second strain sensor 50b.

FIG. 15C is a schematic view showing the direction of a bias magnetic field Hb, the direction of the strain (a strain application direction Dε), the magnetization direction 10m of the free magnetic layer, and the magnetization direction 20m of the fixed magnetic layer.

As shown in FIG. 15C, the bias magnetic field Hb is applied to the strain sensor along the X-axis direction. The strain application direction Dε is a direction intersecting (e.g., a direction perpendicular to) the X-axis direction. The magnetization direction 20m of the fixed magnetic layer is, for example, a direction along the X-axis direction (a direction parallel or antiparallel to the X-axis direction). When the strain is not applied to the strain sensor, the magnetization direction 10m of the free magnetic layer is, for example, antiparallel to the magnetization direction 20m of the fixed magnetic layer and, for example, perpendicular to the strain application direction Dc.

The sensitivity of the strain sensing element can be increased by arranging the multiple strain sensors 50 and the multiple bias applying units BA as in FIG. 15A to FIG. 15C.

Third Embodiment

Figure 16A:
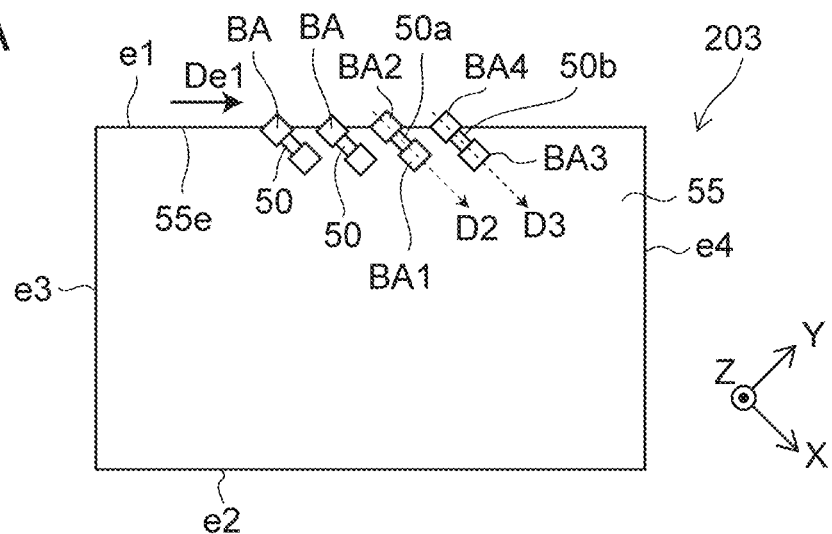
FIG. 16A to FIG. 16C are schematic views showing a strain sensing element according to a third embodiment.
Figure 16B:
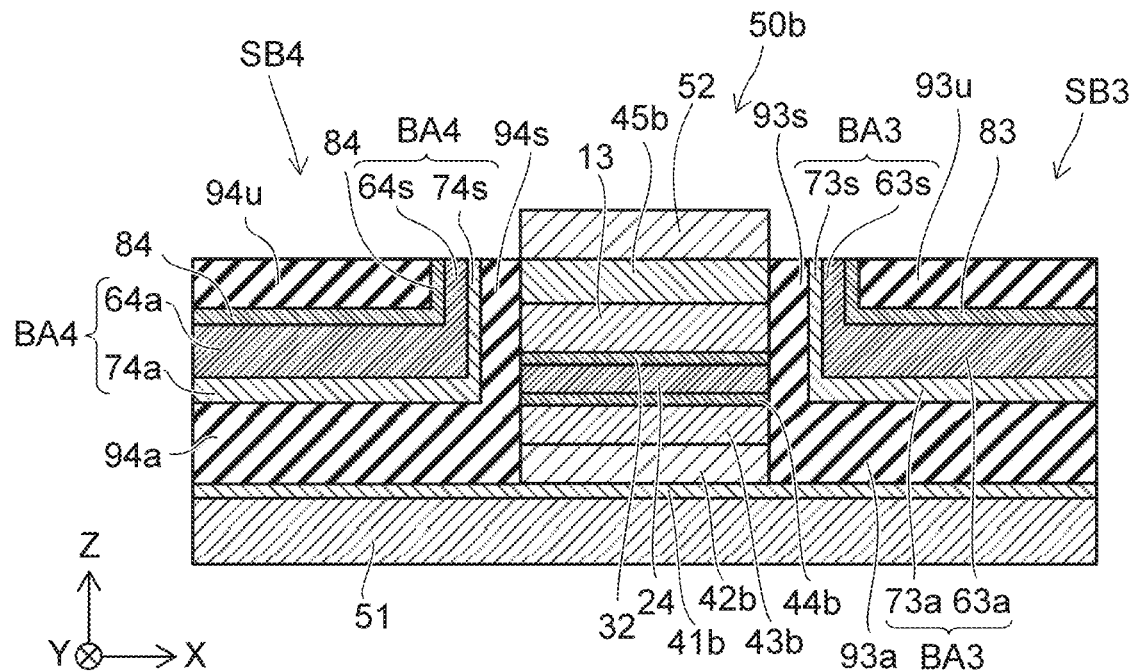
Figure 16C:
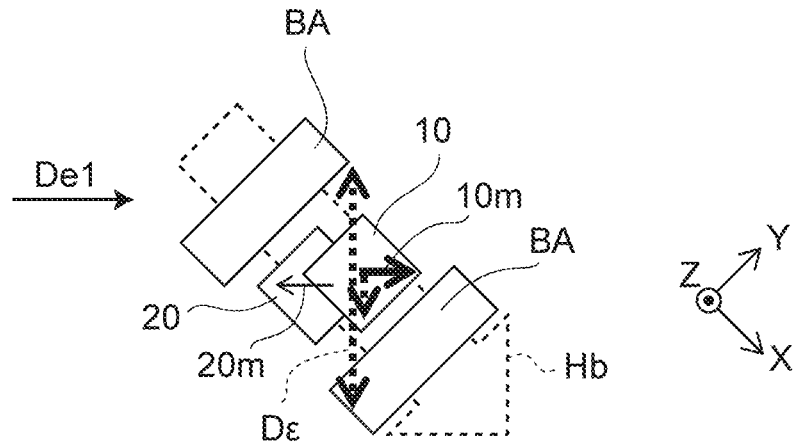

FIG. 16A to FIG. 16C are schematic views illustrating a strain sensing element according to a third embodiment.

FIG. 16A is a schematic plan view showing the strain sensing element 203 according to the third embodiment. As shown in FIG. 16A, the strain sensing element 203 includes the film unit 55, the multiple strain sensors 50, and the multiple bias applying units BA. The film unit 55 has an outer edge 55e. The multiple strain sensors 50 are provided along the outer edge 55e.

In the example, the planar configuration of the film unit 55 (the configuration when viewed along the Z-axis direction) is a rectangle. For example, the outer edge 55e has first to fourth portions e1 to e4 (first to fourth sides). The first portion e1 of the outer edge 55e extends in a direction De1.

The multiple strain sensors 50 include the first strain sensor 50a and the second strain sensor 50b. The first strain sensor 50a and the second strain sensor 50b are arranged along the direction De1. The first strain sensor 50a and the second strain sensor 50b are similar to the first and second embodiments.

The multiple bias applying units BA include the first to fourth bias applying units BA1 to BA4. The second bias applying unit BA2 is arranged with the first bias applying unit BA1 in a second direction D2. The first strain sensor 50a is provided between the first bias applying unit BA1 and the second bias applying unit BA2. The angle between the second direction D2 and the direction in which the outer edge 55e extends (the direction De1) is not less than 40 degrees (°) and not more than 50°, e.g., 45°. In other words, the angle between the second direction D2 and the shortest straight line connecting the outer edge 55e to the centroid of the first strain sensor 50a is not less than 40° and not more than 50°.

The fourth bias applying unit BA4 (the fourth magnetic unit) is arranged with the third bias applying unit BA3 (the third magnetic unit) in a third direction D3. The second strain sensor 50b is provided between the third bias applying unit BA3 and the fourth bias applying unit BA4. For example, the third direction D3 is parallel to the second direction D2.

Other than the configuration recited above, the first strain sensor 50a, the second strain sensor 50b, the first bias applying unit BA1, the second bias applying unit BA2, and the third bias applying unit BA3 are similar to those of the first and second embodiments.

FIG. 16B is a schematic cross-sectional view showing the second strain sensor 50b, the third bias applying unit BA3, and the fourth bias applying unit BA4.

As shown in FIG. 16B, the second strain sensor 50b is provided between the stacked unit SB3 that includes the third bias applying unit BA3, and a stacked unit SB4 that includes the fourth bias applying unit BA4. The description of the second strain sensor 50b and the stacked unit SB3 is similar to that of the second embodiment and is therefore omitted.

The stacked structure in the Z-axis direction of the stacked unit SB4 is as follows.

A fourth insulating layer 94a, the fourth bias applying unit BA4, a fourth protective layer 84, and a fourth upper insulating layer 94u are stacked in the Z-axis direction in the stacked unit SB4. The fourth bias applying unit BA4 includes a fourth intermediate magnetic layer 74a and a fourth bias magnetic layer 64a (a fourth magnetic body layer).

The fourth bias magnetic layer 64a is provided between the film unit 55 and the fourth upper insulating layer 94u. The fourth intermediate magnetic layer 74a is provided between the film unit 55 and the fourth bias magnetic layer 64a. The fourth insulating layer 94a is provided between the film unit 55 and the fourth intermediate magnetic layer 74a. The fourth protective layer 84 is provided between the fourth upper insulating layer 94u and the fourth bias magnetic layer 64a.

The stacked structure in the X-axis direction of the stacked unit SB4 is as follows.

A fourth side insulating layer 94s, the fourth bias applying unit BA4, the fourth protective layer 84, and the fourth upper insulating layer 94u are stacked in the X-axis direction in the stacked unit SB4. The fourth bias applying unit BA4 further includes a fourth side intermediate magnetic layer 74s and a fourth side magnetic layer 64s.

The fourth side magnetic layer 64s is provided between the fourth upper insulating layer 94u and at least a portion of the second strain sensor 50b. The fourth side intermediate magnetic layer 74s is provided between the fourth side magnetic layer 64s and at least a portion of the second strain sensor 50b. The fourth side insulating layer 94s is provided between the fourth side intermediate magnetic layer 74s and at least a portion of the second strain sensor 50b. The fourth protective layer 84 is provided between the fourth upper insulating layer 94u and the fourth side magnetic layer 64s.

At least a portion of the third magnetic layer 13 of the second strain sensor 50b and at least a portion of the fourth bias magnetic layer 64a overlap in the X-axis direction. A portion of the fourth side intermediate magnetic layer 74s is positioned between the fourth bias magnetic layer 64a and at least a portion of the second strain sensor 50b.

The fourth insulating layer 94a and the fourth side insulating layer 94s are provided to be continuous. The fourth intermediate magnetic layer 74a and the fourth side intermediate magnetic layer 74s are provided to be continuous. The fourth intermediate magnetic layer 74a and the fourth side intermediate magnetic layer 74s are provided to be continuous.

Otherwise, descriptions similar to those of the first insulating layer 91a, the first intermediate magnetic layer 71a, the first bias magnetic layer 61a, the first protective layer 81, the first upper insulating layer 91u, the first side insulating layer 91s, the first side intermediate magnetic layer 71s, and the first side magnetic layer 61s are applicable respectively to the fourth insulating layer 94a, the fourth intermediate magnetic layer 74a, the fourth bias magnetic layer 64a, the fourth protective layer 84, the fourth upper insulating layer 94u, the fourth side insulating layer 94s, the fourth side intermediate magnetic layer 74s, and the fourth side magnetic layer 64s. Similarly to the insulating layer 90 described in regard to FIGS. 4A to 4C, an insulating layer that covers the stacked unit SB3 and the stacked unit SB4 may be provided in the embodiment as well.

FIG. 16C is a schematic view showing the direction of the bias magnetic field Hb, the strain application direction Dε, the magnetization direction 10m of the free magnetic layer, and the magnetization direction 20m of the fixed magnetic layer.

As shown in FIG. 16C, the bias magnetic field Hb is applied to the strain sensor along the X-axis direction. The strain application direction Dε is, for example, a direction intersecting (e.g., a direction perpendicular to) the direction (the direction De1) in which the outer edge 55e extends. The magnetization direction 20m of the fixed magnetic layer is, for example, aligned with the direction in which the outer edge 55e extends. When the strain is not applied to the strain sensor, the magnetization direction 10m of the free magnetic layer is, for example, parallel to the bias magnetic field Hb. Thus, by setting the bias applying unit and the strain sensor, the magnetization direction 10m of the free magnetic layer when the strain is not applied can be set to be non-parallel and non-perpendicular to the strain application direction DE. Thereby, the change of the electrical resistance can be obtained for a positive strain and a negative strain.

FIG. 17A to FIG. 17D are schematic plan views illustrating other strain sensing elements according to the embodiment.

FIG. 17A to FIG. 17D respectively show strain sensing elements 203a, 203b, 203c, and 203d. For these strain sensing elements as well, the multiple strain sensors 50 and the multiple bias applying units BA are provided along the outer edge 55e of the film unit 55.

Figure 17A:
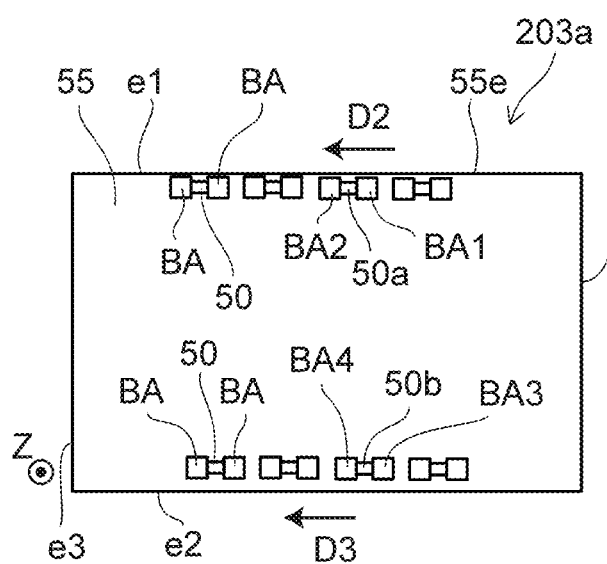
FIG. 17A to FIG. 17D are schematic plan views showing other strain sensing elements according to the embodiment.

In the strain sensing element 203a as shown in FIG. 17A, the strain sensors 50 and the bias applying units BA are provided along the first portion e1 and the second portion e2. The second portion e2 is separated from the first portion e1. For example, the first portion e1 corresponds to one long side of the outer edge 55e; and the second portion e2 corresponds to the other long side of the outer edge 55e.

In the example, the first strain sensor 50a, the first bias applying unit BA1, and the second bias applying unit BA2 are provided along the direction in which the first portion e1 extends. The angle between the direction in which the first portion e1 extends and the second direction D2 from the first bias applying unit BA1 toward the second bias applying unit BA2 is not less than −5° and not more than 5°, e.g., 0°. In other words, the angle between the second direction D2 and the shortest straight line connecting the outer edge 55e to the centroid of the first strain sensor 50a is not less than 85° and not more than 95°.

The second strain sensor 50b, the third bias applying unit BA3, and the fourth bias applying unit BA4 are provided along the direction in which the second portion e2 extends. The angle between the direction in which the second portion e2 extends and the third direction from the third bias applying unit BA3 toward the fourth bias applying unit BA4 is not less than −5° and not more than 5°, e.g., 0°.

Figure 17C:
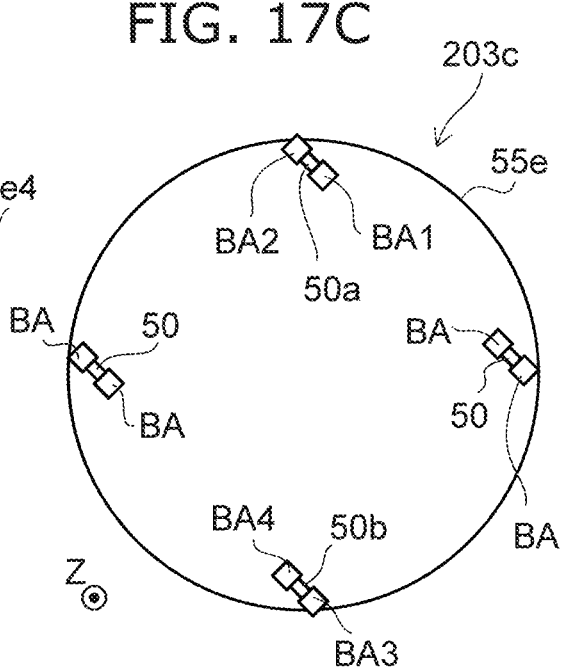
Figure 17B:
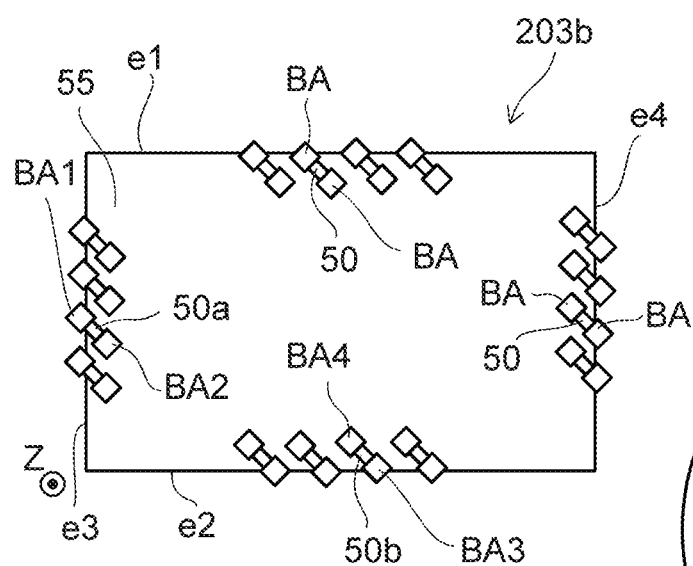

In the strain sensing element 203b as shown in FIG. 17B, the strain sensors 50 and the bias applying units BA are provided along the third portion e3 and the fourth portion e4. The third portion e3 corresponds to one short side of the outer edge 55e; and the fourth portion e4 corresponds to the other short side of the outer edge 55e. Thus, the strain sensors 50 and the bias applying units BA may be provided along the short sides of the film unit 55.

In the strain sensing element 203c shown in FIG. 17C, the planar configuration of the film unit 55 is a circle. In such a case as well, the strain sensors 50 and the bias applying units BA are provided along the outer edge 55e of the film unit 55. In the case where the outer edge 55e of the film unit 55 is not linear, a design that is similar to that of FIG. 16C is possible by considering the strain application direction Dε to be a direction perpendicular to the tangent of the outer edge 55e.

Figure 17D:
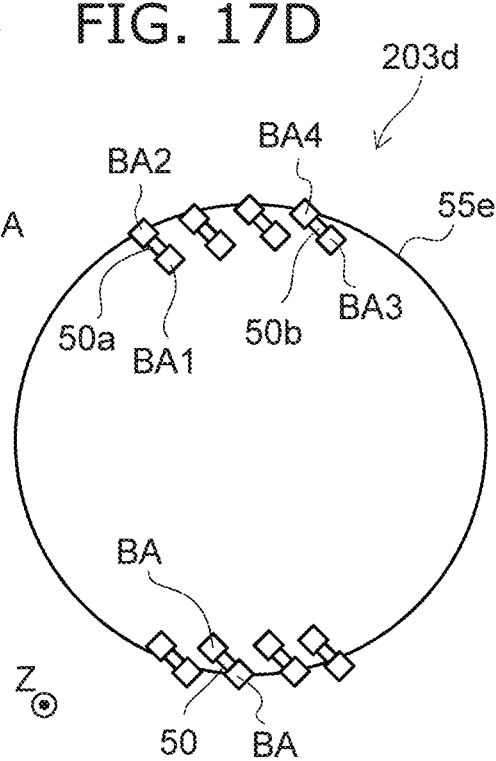

In the strain sensing element 203d shown in FIG. 17D as well, the planar configuration of the film unit 55 is a circle. For example, in the case where the planar configuration of the outer edge 55e includes a curve, the multiple strain sensors 50 may be provided along a portion of the outer edge that can be considered to be a straight line in a micro range. In such a case, the strain application direction Dε may be considered to be a direction perpendicular to the portion considered to be the straight line.

The planar configuration of the film unit 55 is not limited to the examples recited above and may be, for example, an ellipse, a square, a regular polygon, etc. The numbers of strain sensors 50 and bias applying units BA on the film unit 55 are arbitrary. Arbitrarily combined arrangements of the examples recited above may be used as the arrangement of the strain sensors 50, etc., on the film unit 55.

Fourth Embodiment

Figure 18:
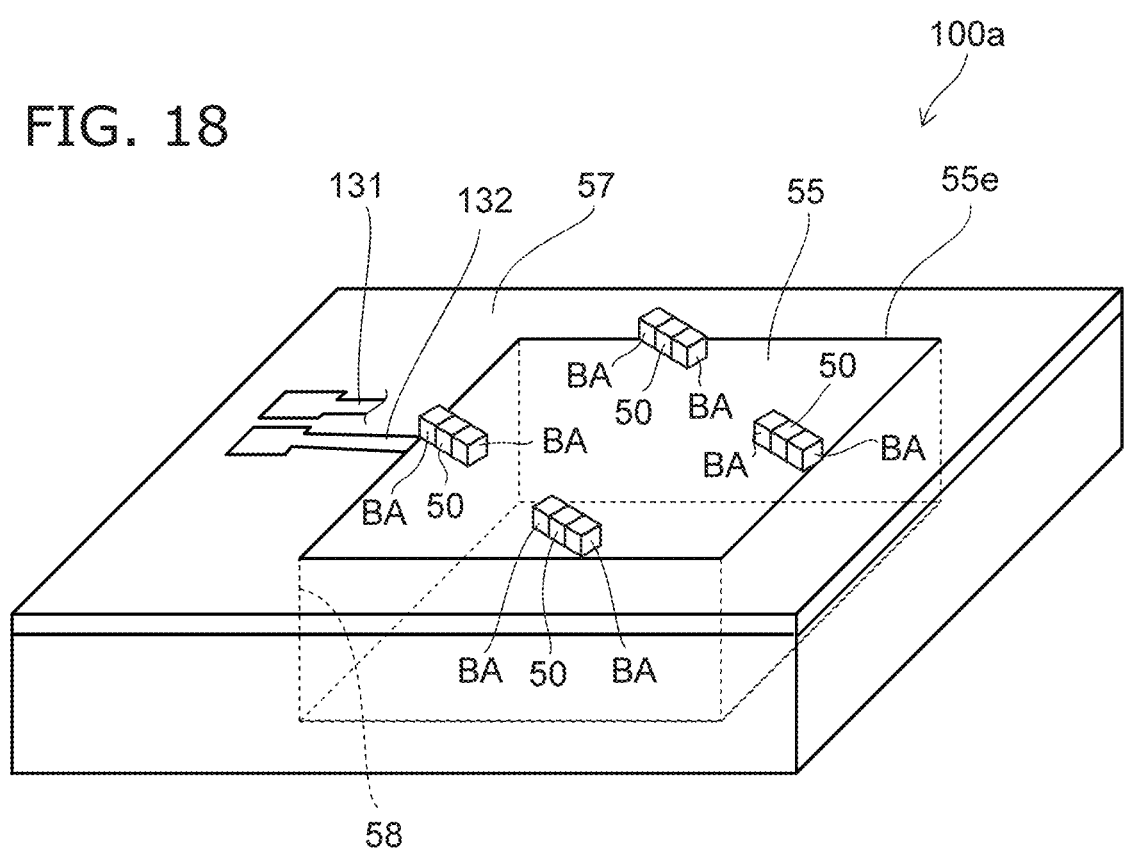
FIG. 18 is a schematic view showing a pressure sensor according to a fourth embodiment.

FIG. 18 is a schematic view illustrating a pressure sensor according to a fourth embodiment.

As shown in FIG. 18, the pressure sensor 100a according to the embodiment includes a supporter 57, the film unit 55, and a strain sensing element (e.g., the strain sensing element 201).

The supporter 57 is, for example, a substrate. The film unit 55 is supported by the supporter. The film unit 55 is, for example, a diaphragm. The film unit 55 and the supporter 57 may be one body or separate bodies. The film unit 55 may include the same material as the supporter 57 or a material different from that of the supporter 57. A portion of the substrate used to form the supporter 57 may be removed; and the thin portion of the substrate may be used to form the film unit 55.

The thickness of the film unit 55 is thinner than the thickness of the supporter 57. In the case where the same material is formed as one body and used as the film unit 55 and the supporter 57, the thin portion is used to form the film unit 55; and the thick portion is used to form the supporter 57.

The supporter 57 may have a through-hole piercing the supporter 57 in the thickness direction; and the film unit 55 may be provided to cover the through-hole. In such a case, for example, the film of the material used to form the film unit 55 may extend also onto the portion of the supporter 57 other than the through-hole. In such a case, the portion of the film of the material used to form the film unit 55 that overlaps the through-hole is used to form the film unit 55.

The film unit 55 has the outer edge 55e. In the case where the same material is formed as one body and used as the film unit 55 and the supporter 57, the thin portion of the outer edge is used to form the outer edge 55e of the film unit 55. In the case where the supporter 57 has a through-hole piercing the supporter 57 in the thickness direction and the film unit 55 is provided to cover the through-hole, the portion of the outer edge of the film of the material used to form the film unit 55 that overlaps the through-hole is used to form the outer edge 55e of the film unit 55.

The supporter 57 may provide a continuous support for the outer edge 55e of the film unit 55 or may support a portion of the outer edge 55e of the film unit 55.

The strain sensors 50 and the bias applying units BA are provided on the film unit 55.

In the example, the multiple strain sensors 50 are provided on the film unit 55. The number of strain sensors 50 provided on the film unit 55 may be 1. Similarly to the strain sensing elements described in the first to third embodiments, the bias applying units BA are provided at two ends of each of the strain sensors 50.

A first interconnect 131 and a second interconnect 132 are provided in the pressure sensor 100a. The first interconnect 131 is connected to the strain sensors 50. The second interconnect 132 is connected to the strain sensors 50. For example, an inter-layer insulating film is provided between the first interconnect 131 and the second interconnect 132 to electrically insulate the first interconnect 131 and the second interconnect 132 from each other. A voltage is applied between the first interconnect 131 and the second interconnect 132; and the voltage is applied to the strain sensors 50 via the first interconnect 131 and the second interconnect 132. The film unit 55 deforms when pressure is applied to the pressure sensor 100a. The electrical resistance of the strain sensors 50 changes according to the deformation of the film unit 55. The pressure can be sensed by sensing the change of the electrical resistance via the first interconnect 131 and the second interconnect 132.

The supporter 57 may include, for example, a substrate having a plate configuration. For example, a hollow portion 58 is provided in the interior of the substrate.

The supporter 57 may include, for example, a semiconductor material such as silicon, etc., a conductive material such as a metal, etc., or an insulating material. The supporter 57 may include, for example, silicon oxide, silicon nitride, etc. For example, the interior of the hollow portion 58 is in a reduced-pressure state (a vacuum state). A gas such as air, etc., or a liquid may be filled into the interior of the hollow portion 58. The interior of the hollow portion 58 is designed so that the film unit 55 can deflect. The interior of the hollow portion 58 may communicate with the external ambient air.

The film unit 55 is provided on the hollow portion 58. For example, a portion of the substrate used to form the supporter 57 that is patterned to be thin is used as the film unit 55. The thickness (the length in the Z-axis direction) of the film unit 55 is thinner than the thickness (the length in the Z-axis direction) of the substrate.

The film unit 55 deflects when pressure is applied to the film unit 55. The pressure corresponds to the pressure to be sensed by the pressure sensor 100a. The pressure that is applied includes pressure due to a sound wave, an ultrasonic wave, etc. When the pressure due to the sound wave, the ultrasonic wave, etc., is sensed, the pressure sensor 100a functions as a microphone.

The film unit 55 includes, for example, an insulating material. The film unit 55 includes, for example, at least one of silicon oxide, silicon nitride, or silicon oxynitride. The film unit 55 may include, for example, a semiconductor material such as silicon, etc. The film unit 55 may include, for example, a metal material.

The thickness of the film unit 55 is, for example, not less than 0.1 micrometers (μm) and not more than 3 μm. It is favorable for the thickness to be not less than 0.2 μm and not more than 1.5 μm. The film unit 55 may include, for example, a stacked body made of a silicon oxide film having a thickness of 0.2 μm and a silicon film having a thickness of 0.4 μm.

As described above, the strain sensors 50 may be multiply arranged on the film unit 55. For example, the change of the electrical resistance that is obtained for the pressure can be equivalent between the multiple strain sensors 50. As described below, the SN ratio can be increased by connecting the multiple strain sensors 50 in series and in parallel.

The size of the strain sensors 50 can be extremely small. Therefore, the surface area of the strain sensors 50 can be set to be sufficiently less than the surface area of the film unit 55 deflecting due to the pressure. For example, the surface area of the strain sensors 50 can be set to be not more than ⅕ of the surface area of the film unit 55.

For example, in the case where the diametrical dimension of the film unit 55 is about 60 μm, the dimension of the strain sensors 50 can be set to be 12 μm or less. For example, in the case where the diametrical dimension of the film unit 55 is about 600 μm, the dimension of the strain sensors 50 can be set to be 120 μm or less.

In such a case, considering the patterning precision of the strain sensors 50, etc., it is unnecessary to set the dimension of each of the strain sensors 50 to be excessively small. Therefore, the dimension of the strain sensors 50 can be, for example, not less than 0.05 μm and not more than 30 μm.

The multiple strain sensors 50 that are provided on the film unit 55 may be connected in series. The electrical signal that is obtained when the number of strain sensors 50 connected in series is N is N times the electrical signal when the number of strain sensors 50 is 1. On the other hand, the thermal noise and the Schottky noise are $N^{1/2}$ times. In other words, the SN ratio (the signal-noise ratio (SNR)) is $N^{1/2}$ times. The SN ratio can be improved without increasing the size of the film unit 55 by increasing the number N of strain sensors 50 connected in series.

For example, the bias voltage that is applied to one strain sensor 50 is not less than 50 millivolts (mV) and not more than 150 mV. In the case where N strain sensors 50 are connected in series, the bias voltage is not less than 50 mV×N and not more than 150 mV×N. For example, in the case where the number N of strain sensors 50 connected in series is 25, the bias voltage is not less than 1 V and not more than 3.75 V.

It is practically favorable for the value of the bias voltage to be 1 V or more because the design of the electronic circuit that processes the electrical signal obtained from the strain sensors 50 is easy.

For the electronic circuit that processes the electrical signal obtained from the strain sensors 50, it is undesirable for the bias voltage (the voltage across terminals) to exceed 10 V. In the embodiment, the bias voltage and the number N of strain sensors 50 connected in series are set so that the voltage is in the appropriate voltage range.

For example, it is favorable for the voltage to be not less than 1 V and not more than 10 V in the case where the multiple strain sensors 50 are electrically connected in series. For example, the voltage that is applied between the terminals (the terminal at one end and the terminal at the other end) of the multiple strain sensors 50 electrically connected in series is not less than 1 V and not more than 10 V.

To generate the voltage in the case where the bias voltage that is applied to one strain sensor 50 is 50 mV, it is favorable for the number N of strain sensors 50 connected in series to be not less than 20 and not more than 200. In the case where the bias voltage that is applied to one strain sensor 50 is 150 mV, it is favorable for the number N of strain sensors 50 connected in series to be not less than 7 and not more than 66.

At least some of the multiple strain sensors 50 may be electrically connected in parallel.

Figure 19:
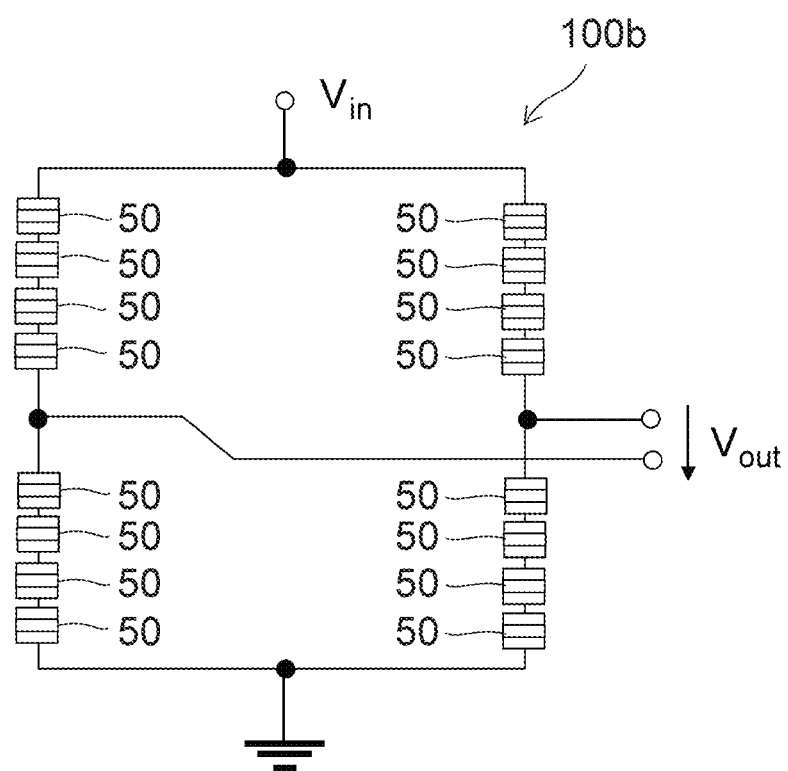
FIG. 19 is a schematic circuit diagram showing another pressure sensor according to the fourth embodiment.

FIG. 19 is a schematic circuit diagram illustrating another pressure sensor according to the fourth embodiment.

As in the pressure sensor 100b shown in FIG. 19, the multiple strain sensors 50 may be connected so that the multiple strain sensors 50 form a Wheatstone bridge circuit. Thereby, for example, temperature compensation of the sensing characteristics can be performed.

Figure 20A:
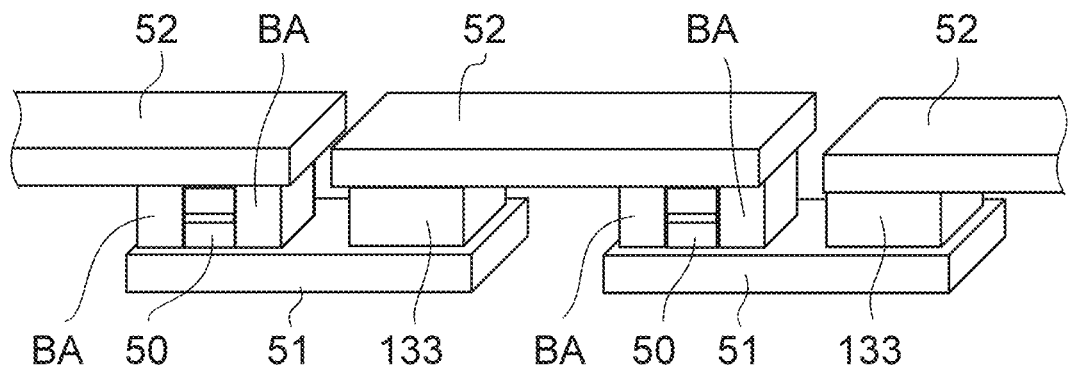
FIG. 20A to FIG. 20C are schematic perspective views showing the pressure sensor according to the fourth embodiment.
Figure 20B:
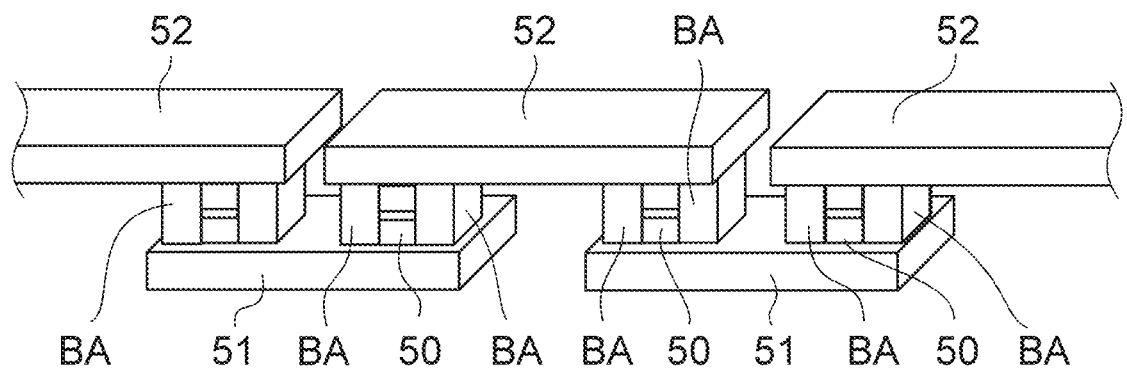
Figure 20C:
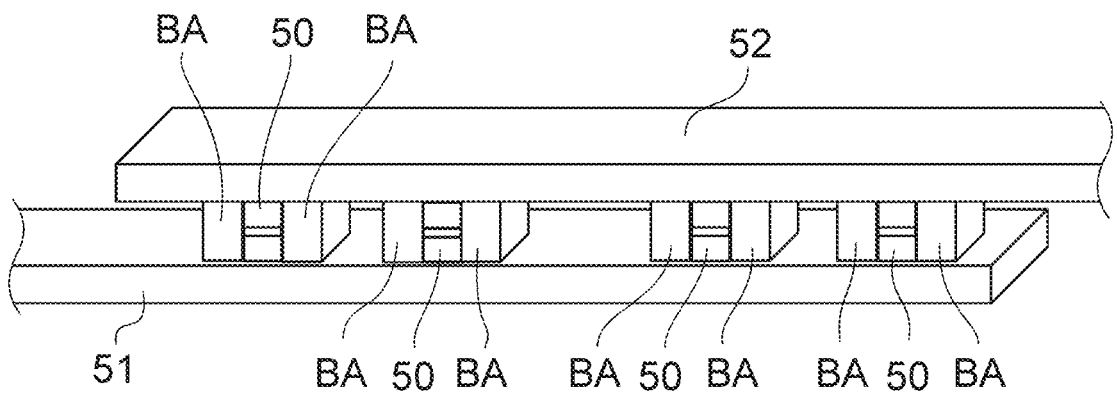

FIG. 20A to FIG. 20C are schematic perspective views illustrating the pressure sensor according to the fourth embodiment.

These drawings show examples of the connections of the multiple strain sensors 50.

In the case where the multiple strain sensors 50 are electrically connected in series as shown in FIG. 20A, the strain sensor 50 and a via contact 133 are provided between the lower electrode 51 (e.g., the first interconnect 131) and the upper electrode 52 (e.g., the second interconnect 132). Thereby, the conduction direction is in one direction. The current that is conducted in the multiple strain sensors 50 is downward or upward. By such a connection, the signal-noise characteristics of each of the multiple strain sensors 50 can be similar to each other.

In the example shown in FIG. 20B, the strain sensor 50 is disposed between the lower electrode 51 and the upper electrode 52 without providing the via contact 133. In the example, the directions of the current conducted in two mutually-adjacent strain sensors 50 are the reverse of each other. The density of the arrangement of the multiple strain sensors 50 is high for this connection.

As shown in FIG. 20C, the multiple strain sensors 50 are provided between one lower electrode 51 and one upper electrode 52. The multiple strain sensors 50 are connected in parallel.

An example of a method for manufacturing the pressure sensor according to the embodiment will now be described. The following is an example of the method for manufacturing the pressure sensor 100a.

FIGS. 21A to 21E are schematic cross-sectional views in order of the processes, illustrating the method for manufacturing the pressure sensor according to the embodiment.

Figure 21A:
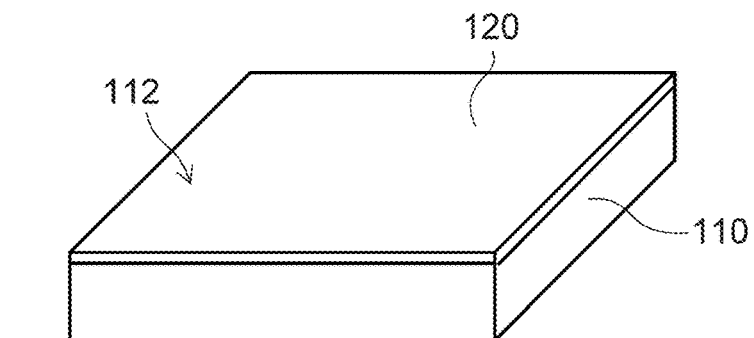
FIGS. 21A to 21E are schematic cross-sectional views in order of the processes, showing the method for manufacturing the pressure sensor according to the embodiment.

As shown in FIG. 21A, a thin film 120 is formed on a substrate 110 (e.g., a Si substrate). The substrate 110 is used to form the supporter 57. The thin film 120 is used to form the film unit 55.

For example, the thin film 120 of $SiO_x/Si$ is formed on the Si substrate by sputtering. A $SiO_x$ single layer, a SiN single layer, or a metal layer such as Al, etc., may be used as the thin film 120. A flexible plastic material such as polyimide, a paraxylene polymer, etc., may be used as the thin film 120. SOI (Silicon On Insulator) substrates may be used as the substrate 110 and the thin film 120. The SOI may be, for example, a stacked film of $SiO_2/Si$ formed on a Si substrate by bonding the substrates.

Figure 21B:
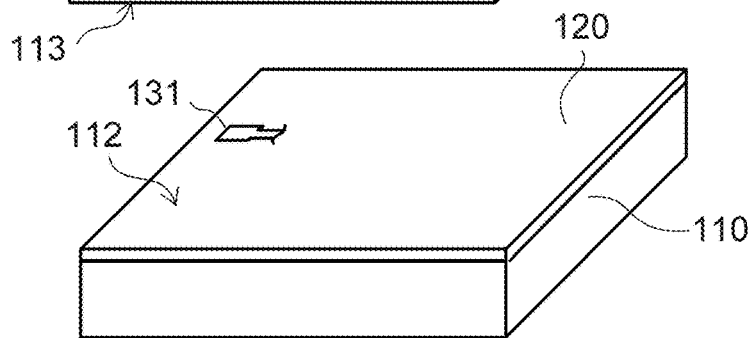

The first interconnect 131 is formed as shown in FIG. 21B. In this process, a conductive film that is used to form the first interconnect 131 is formed; and the conductive film is patterned by photolithography and etching. Lift-off is applicable in the case where an insulating film is filled around the first interconnect 131. In lift-off, for example, an insulating film is formed on the entire surface after etching the pattern of the first interconnect 131 and prior to peeling the resist; and the resist is removed subsequently.

Figure 21C:
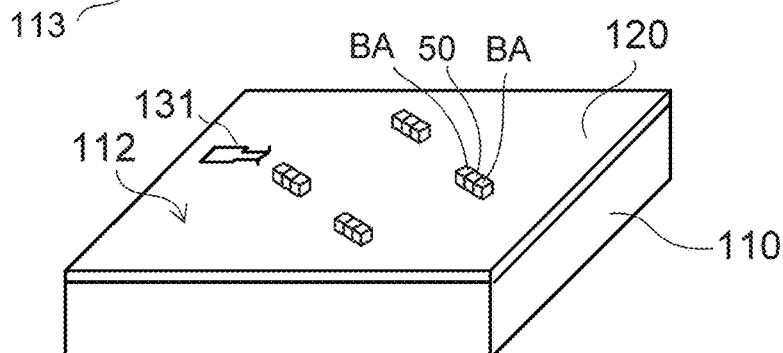

The strain sensors 50 and the bias applying units BA are formed as shown in FIG. 21C. In this process, a stacked film that is used to form the strain sensors 50 is formed; and the stacked film is patterned by photolithography and etching. Subsequently, the stacked film that is used to form the bias applying units BA is formed; and the stacked film is patterned by photolithography and etching. Lift-off is applicable to the patterning of these stacked films.

Figure 21D:
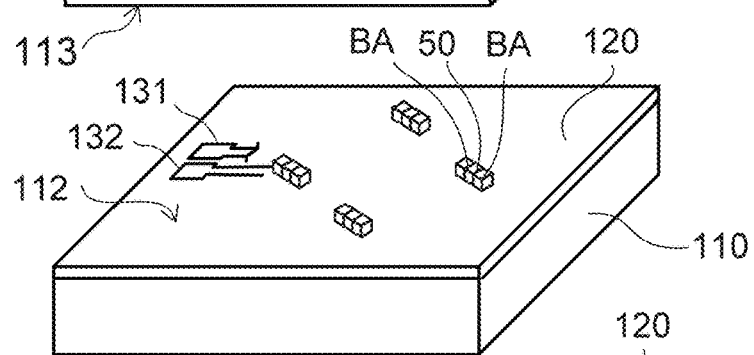

The second interconnect 132 is formed as shown in FIG. 21D. In this process, a conductive film that is used to form the second interconnect 132 is formed; and the conductive film is patterned by photolithography and etching. Lift-off is applicable in the case where an insulating film is filled around the second interconnect 132. In lift-off, an insulating film is formed on the entire surface after patterning the second interconnect 132 and prior to peeling the resist; and the resist is removed subsequently.

Figure 21E:
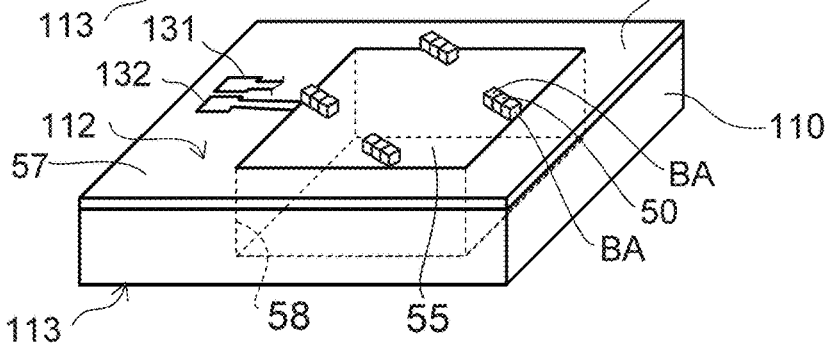

As shown in FIG. 21E, the hollow portion 58 is made by etching from a back surface 113 of the substrate 110. Thereby, the film unit 55 and the supporter 57 are formed. For example, in the case where a stacked film of $SiO_x/Si$ is used as the thin film 120 used to form the film unit 55, deep patterning of the substrate 110 is performed from the back surface 113 (the lower surface) of the thin film 120 toward a front surface 112 (the upper surface). Thereby, the hollow portion 58 is made. For example, a double-sided aligner exposure apparatus may be used to make the hollow portion 58. Thereby, the hole pattern of the resist is patterned in the back surface to match the positions of the strain sensors 50 on the front surface.

For example, a Bosch process using RIE may be used to etch the Si substrate. In the Bosch process, for example, an etching process using $SF_6$ gas and a deposition process using $C_4F_8$ gas are repeated. Thereby, the substrate 110 is selectively etched in the depth direction (the Z-axis direction) while suppressing the etching of the side wall of the substrate 110. For example, a $SiO_x$ layer is used as the end point of the etching. In other words, the etching is caused to end by using a $SiO_x$ layer having selectivity for the etching that is different from that of Si. The $SiO_x$ layer that functions as the etching stopper layer may be used as a portion of the film unit 55. For example, the $SiO_x$ layer may be removed after the etching by processing using anhydrous hydrogen fluoride, alcohol, etc.

Thus, the pressure sensor 100a according to the embodiment is formed. The other pressure sensors according to the embodiments may be manufactured by similar methods.

Fifth Embodiment

A configuration example (a pressure sensor 440) of the pressure sensor according to the fifth embodiment will now be described with reference to FIG. 22 to FIG. 24.

Figure 22:
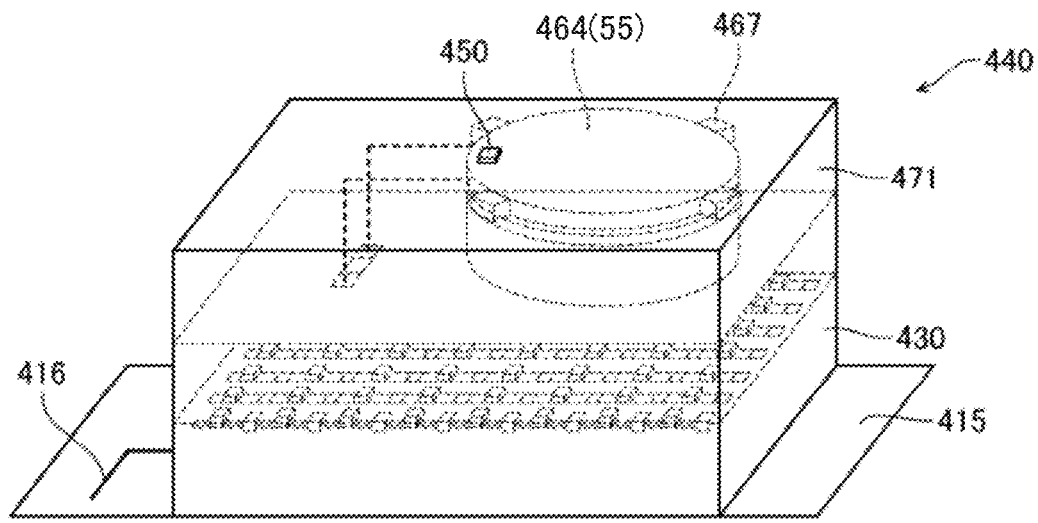
FIG. 22 is a schematic perspective view showing the pressure sensor according to the fifth embodiment.

FIG. 22 is a schematic perspective view illustrating the pressure sensor according to the fifth embodiment. FIG. 23 and FIG. 24 are block diagrams illustrating the pressure sensor according to the fifth embodiment.

Figure 23:
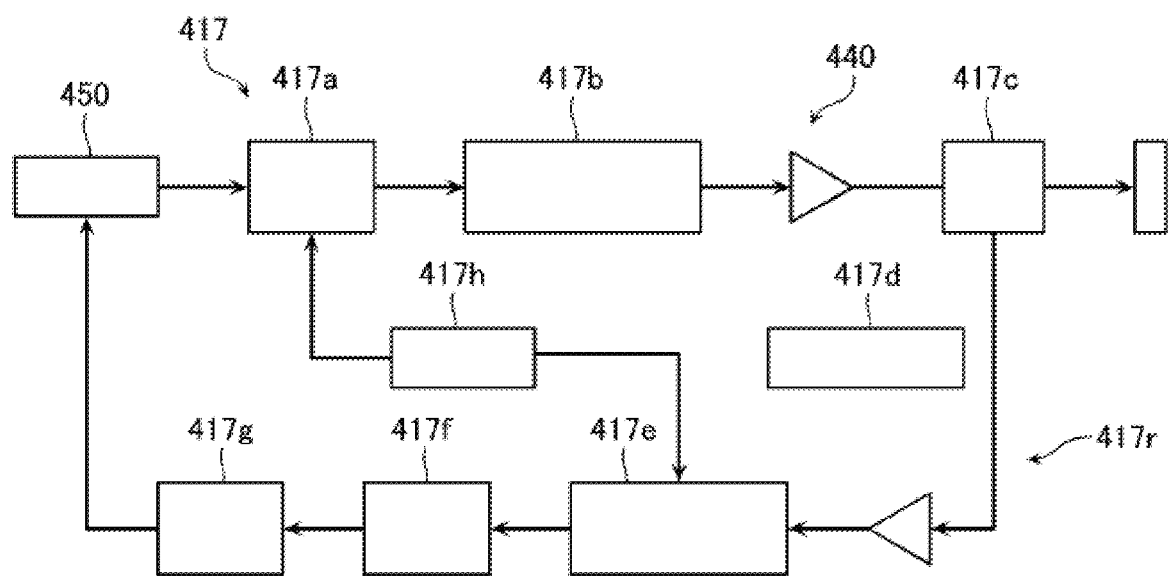
FIG. 23 is a block diagram showing the pressure sensor according to the fifth embodiment.

As shown in FIG. 22 and FIG. 23, a base unit 471, a sensor 450, a semiconductor circuit unit 430, an antenna 415, an electrical interconnect 416, a transmitting circuit 417, and a receiving circuit 417r are provided in the pressure sensor 440. For example, the sensor 450 according to the embodiment includes the bias applying units BA and the strain sensors 50 according to the first to third embodiments.

The antenna 415 is electrically connected to the semiconductor circuit unit 430 via the electrical interconnect 416.

The transmitting circuit 417 wirelessly transmits data based on the electrical signal flowing in the sensor 450. At least a portion of the transmitting circuit 417 may be provided in the semiconductor circuit unit 430.

The receiving circuit 417r receives a control signal from an electronic device 418d. At least a portion of the receiving circuit 417r may be provided in the semiconductor circuit unit 430. If the receiving circuit 417r is provided, for example, the operation of the pressure sensor 440 can be controlled by operating the electronic device 418d.

As shown in FIG. 23, for example, a Manchester encoding unit 417b and an AD converter 417a connected to the sensor 450 may be provided in the transmitting circuit 417. The transmitting and receiving may be switched by providing a switching unit 417c. In such a case, a timing controller 417d may be provided; and the switching of the switching unit 417c may be controlled by the timing controller 417d. A data correcting unit 417e, a synchronizing unit 417f, a determination unit 417g, and a voltage-controlled oscillator 417h (VCO) may be further provided.

As shown in FIG. 24, a receiver 418 is provided in the electronic device 418d used in combination with the pressure sensor 440. For example, an electronic device such as a portable terminal, etc., may be used as the electronic device 418d.

In such a case, the pressure sensor 440 that includes the transmitting circuit 417 may be used in combination with the electronic device 418d that includes the receiver 418.

The Manchester encoding unit 417b, the switching unit 417c, the timing controller 417d, the data correcting unit 417e, the synchronizing unit 417f, the determination unit 417g, the voltage-controlled oscillator 417h, memory 418a, and a central processing unit 418b (CPU) may be provided in the electronic device 418d.

In the example, the pressure sensor 440 further includes a fixing unit 467. The fixing unit 467 fixes a film unit 464 (55) to the base unit 471. The thickness dimension of the fixing unit 467 may be set to be thicker than the film unit 464 so that the fixing unit 467 does not deflect easily when external pressure is applied.

For example, the fixing unit 467 may be provided at uniform spacing at the circumferential edge of the film unit 464. The fixing unit 467 may be provided to continuously surround the entire periphery of the film unit 464. For example, the fixing unit 467 may be formed from the same material as the base unit 471. In such a case, for example, the fixing unit 467 may be formed from silicon, etc. For example, the fixing unit 467 may be formed from the same material as the film unit 464.

A method for manufacturing the pressure sensor 440 will now be described with reference to FIG. 25A to FIG. 36B.

FIG. 25A to FIG. 36B are schematic plan views and schematic cross-sectional views illustrating the method for manufacturing the pressure sensor according to the fifth embodiment.

As shown in FIG. 25A and FIG. 25B, a semiconductor layer 512M is formed at the front surface portion of a semiconductor substrate 531. Continuing, an element-separating insulation layer 5121 is formed on the upper surface of the semiconductor layer 512M. Then, a gate 512G is formed on the semiconductor layer 512M with a not-shown insulating layer interposed. Continuing, a transistor 532 is formed by forming a source 512S and a drain 512D at two sides of the gate 512G. Then, an inter-layer insulating film 514a is formed on the transistor 532; and an inter-layer insulating film 514b is formed.

Continuing, trenches and holes are made in a portion of the inter-layer insulating films 514a and 514b in the region where the non-hollow portion is to be formed. Then, connecting pillars 514c to 514e are formed by filling a conductive material into the holes. In such a case, for example, the connecting pillar 514c is electrically connected to the source 512S of one transistor 532; and the connecting pillar 514d is electrically connected to the drain 512D of the one transistor 532. For example, the connecting pillar 514e is electrically connected to the source 512S of one other transistor 532. Then, interconnect units 514f and 514g are formed by filling a conductive material into the trenches. The interconnect unit 514f is electrically connected to the connecting pillar 514c and the connecting pillar 514d. The interconnect unit 514g is electrically connected to the connecting pillar 514e. Continuing, an inter-layer insulating film 514h is formed on the inter-layer insulating film 514b.

Figure 26A:
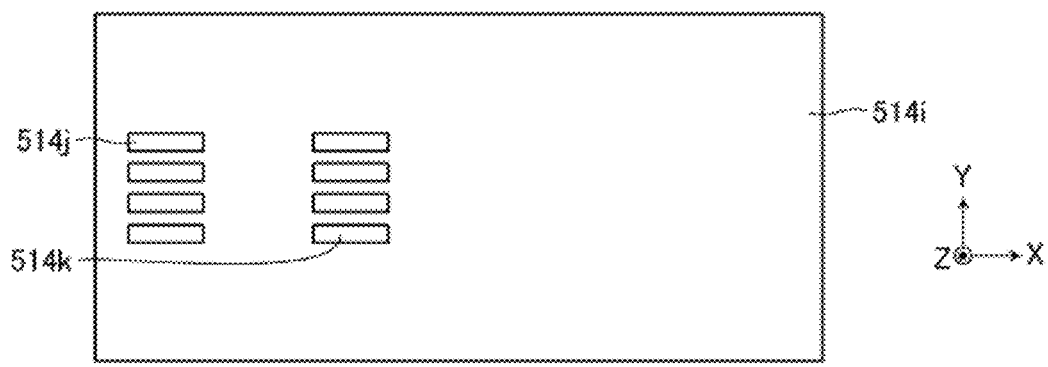
FIG. 26A and FIG. 26B are schematic views showing the method for manufacturing the pressure sensor according to the fifth embodiment.
Figure 26B:
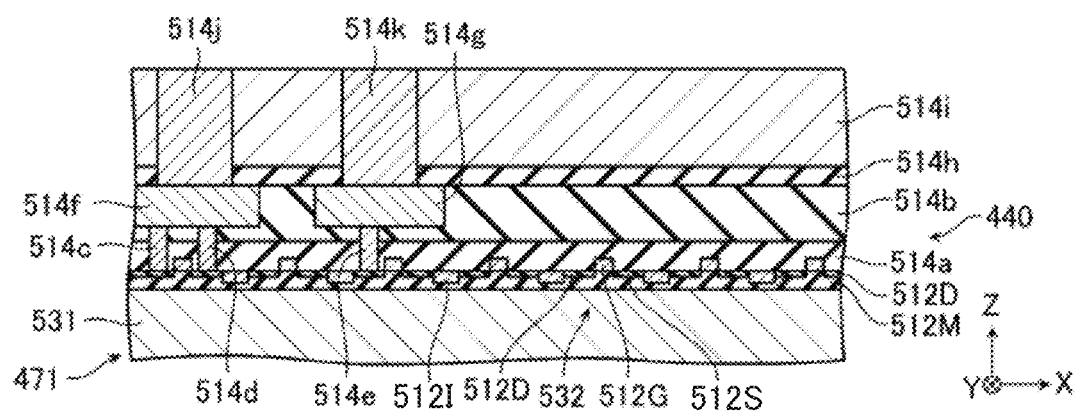

As shown in FIG. 26A and FIG. 26B, an inter-layer insulating film 514i that is made of silicon oxide ($SiO_2$) is formed on the inter-layer insulating film 514h using, for example, CVD (Chemical Vapor Deposition). Continuing, holes are made at prescribed positions of the inter-layer insulating film 514i; a conductive material (e.g., a metal material) is filled; and the upper surface is planarized using CMP (Chemical Mechanical Polishing). Thereby, a connecting pillar 514j that is connected to the interconnect unit 514f is formed; and a connecting pillar 514k that is connected to the interconnect unit 514g is formed.

Figure 27A:
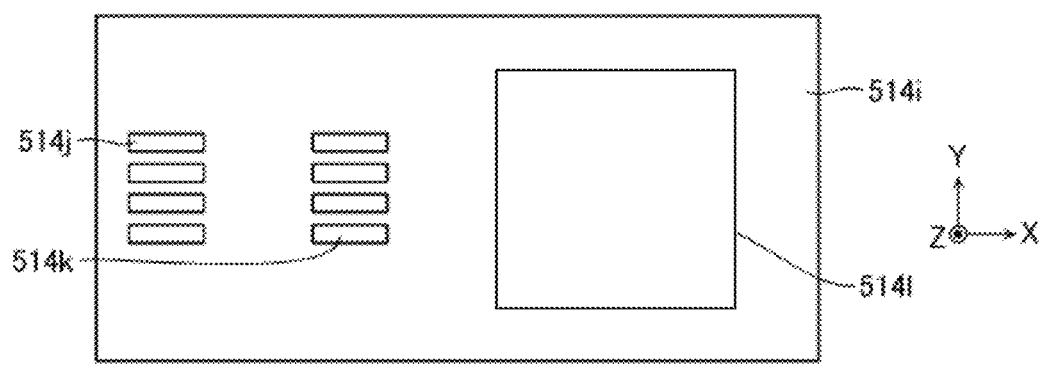
FIG. 27A and FIG. 27B are schematic views showing the method for manufacturing the pressure sensor according to the fifth embodiment.
Figure 27B:
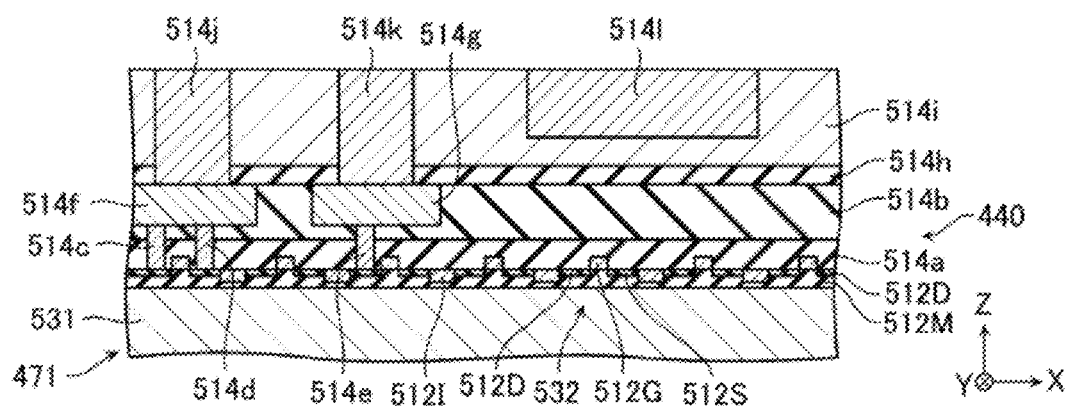

As shown in FIG. 27A and FIG. 27B, a recess is made in the region of the inter-layer insulating film 514i where a hollow portion 570 is to be made; and a sacrificial layer 514l is filled into the recess. For example, the sacrificial layer 514l may be formed using a material that can be formed at a low temperature. The material that can be formed at the low temperature is, for example, silicon-germanium (SiGe), etc.

Figure 28A:
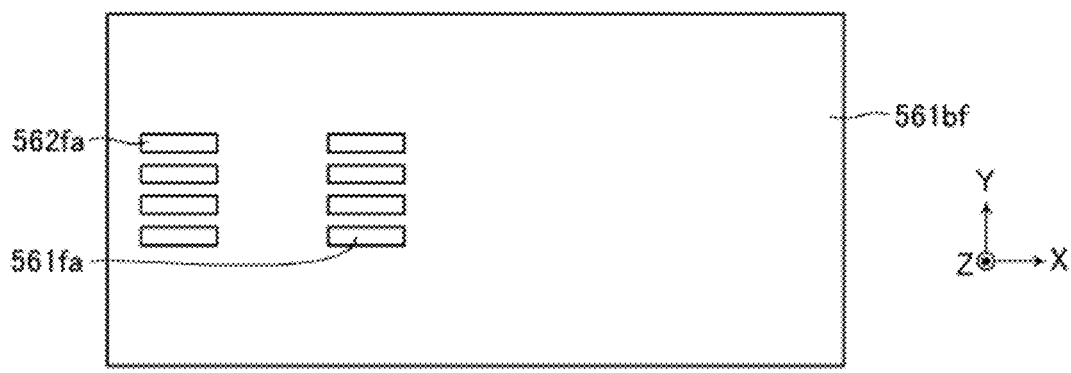
FIG. 28A and FIG. 28B are schematic views showing the method for manufacturing the pressure sensor according to the fifth embodiment.
Figure 28B:
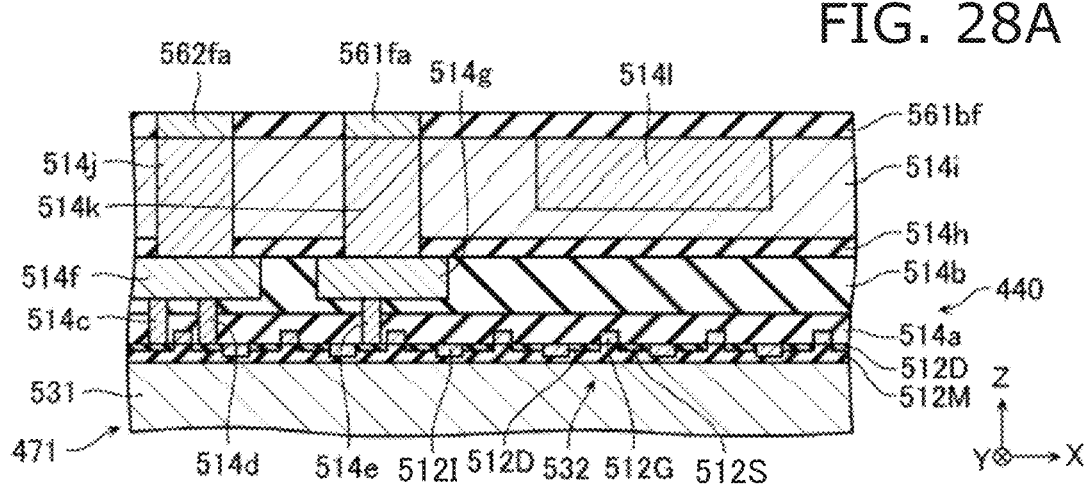

As shown in FIG. 28A and FIG. 28B, an insulating film 561bf that is used to form a film unit 564 (55) is formed on the inter-layer insulating film 514i and the sacrificial layer 514l. For example, the insulating film 561bf may be formed using silicon oxide ($SiO_2$), etc. A connecting pillar 561fa and a connecting pillar 562fa are formed by providing multiple holes in the insulating film 561bf and by filling a conductive material (e.g., a metal material) into the multiple holes. The connecting pillar 561fa is electrically connected to the connecting pillar 514k; and the connecting pillar 562fa is electrically connected to the connecting pillar 514j.

Figure 29A:
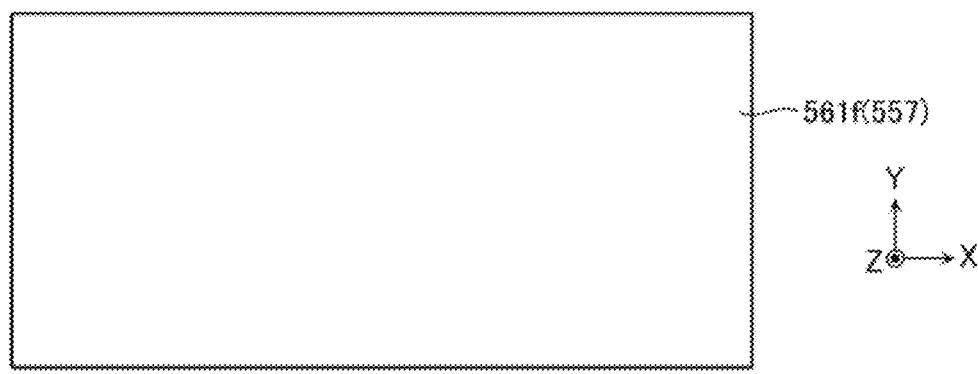
FIG. 29A and FIG. 29B are schematic views showing the method for manufacturing the pressure sensor according to the fifth embodiment.
Figure 29B:
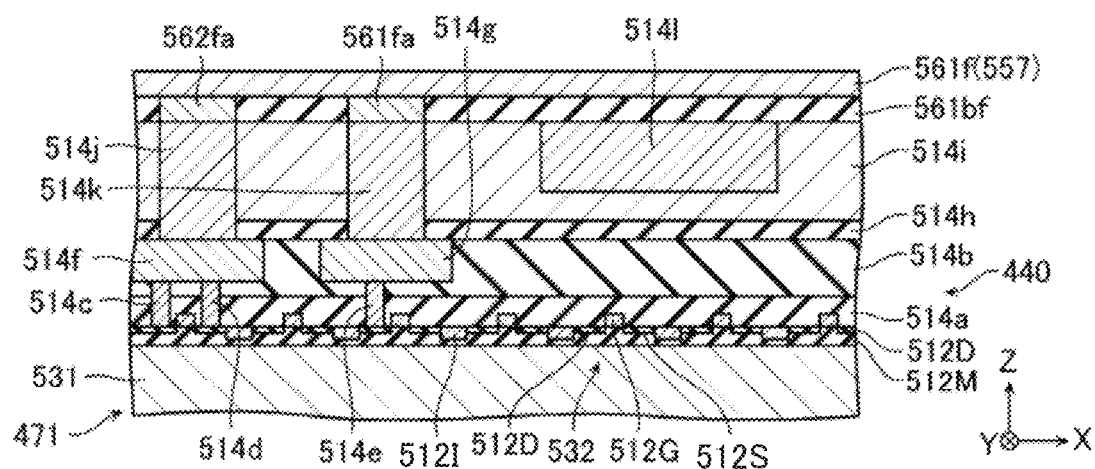

As shown in FIG. 29A and FIG. 29B, a conductive layer 561f that is used to form an interconnect 557 is formed on the insulating film 561bf, the connecting pillar 561fa, and the connecting pillar 562fa.

Figure 30A:
FIG. 30A and FIG. 30B are schematic views showing the method for manufacturing the pressure sensor according to the fifth embodiment.
Figure 30B:
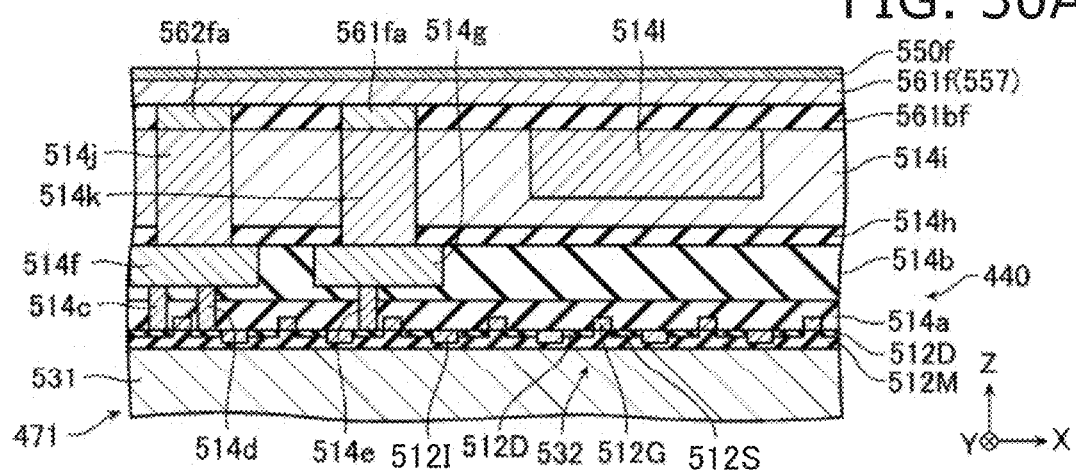

As shown in FIG. 30A and FIG. 30B, a stacked film 550f is formed on the conductive layer 561f.

Figure 31A:
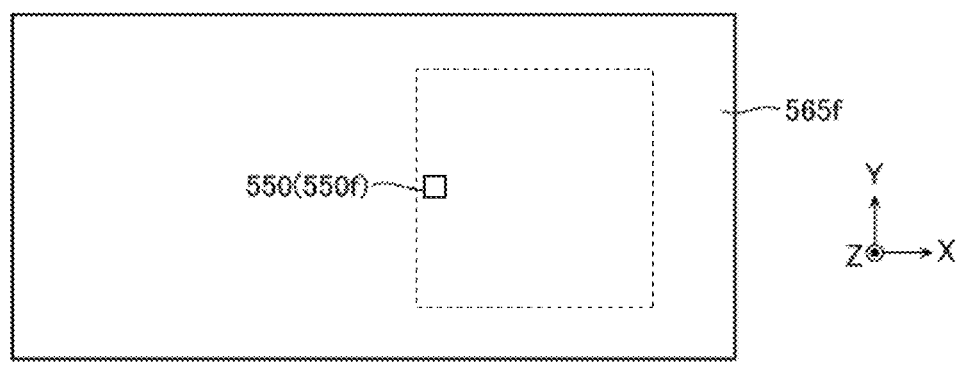
FIG. 31A and FIG. 31B are schematic views showing the method for manufacturing the pressure sensor according to the fifth embodiment.
Figure 31B:
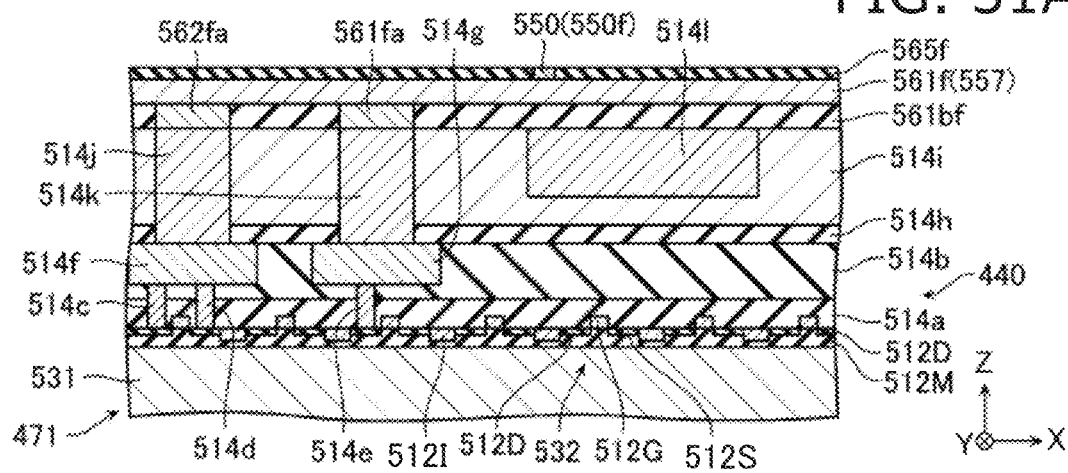

As shown in FIG. 31A and FIG. 31B, the stacked film 550f is patterned into a prescribed configuration; and an insulating film 565f that is used to form an insulating layer 565 is formed on the patterned stacked film 550f. For example, the insulating film 565f may be formed using silicon oxide ($SiO_2$), etc.

Figure 32A:
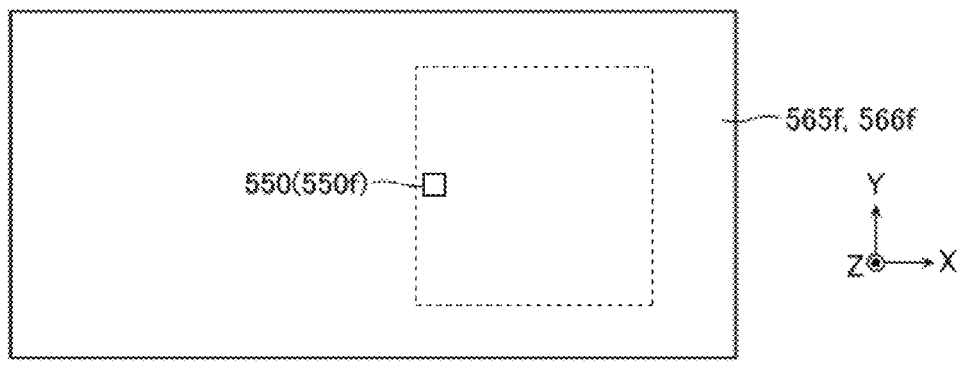
FIG. 32A and FIG. 32B are schematic views showing the method for manufacturing the pressure sensor according to the fifth embodiment.
Figure 32B:
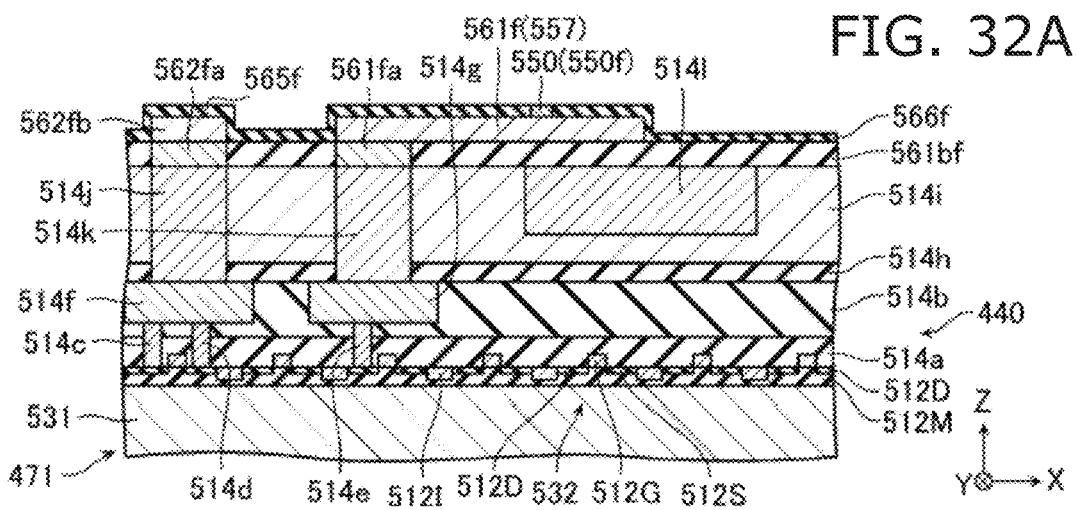

As shown in FIG. 32A and FIG. 32B, the conductive layer 561f is patterned into a prescribed configuration by removing a portion of the insulating film 565f. Thereby, the interconnect 557 is formed. At this time, a portion of the conductive layer 561f is used to form a connecting pillar 562fb that is electrically connected to the connecting pillar 562fa. An insulating film 566f that is used to form an insulating layer 566 is formed on the surface.

Figure 33A:
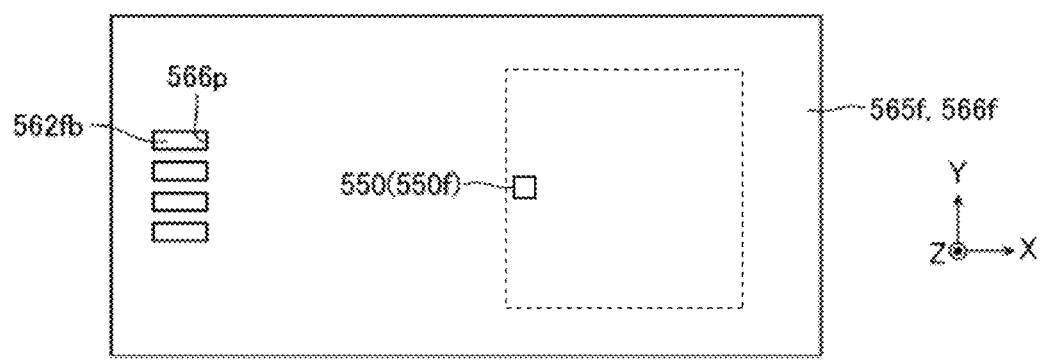
FIG. 33A and FIG. 33B are schematic views showing the method for manufacturing the pressure sensor according to the fifth embodiment.
Figure 33B:
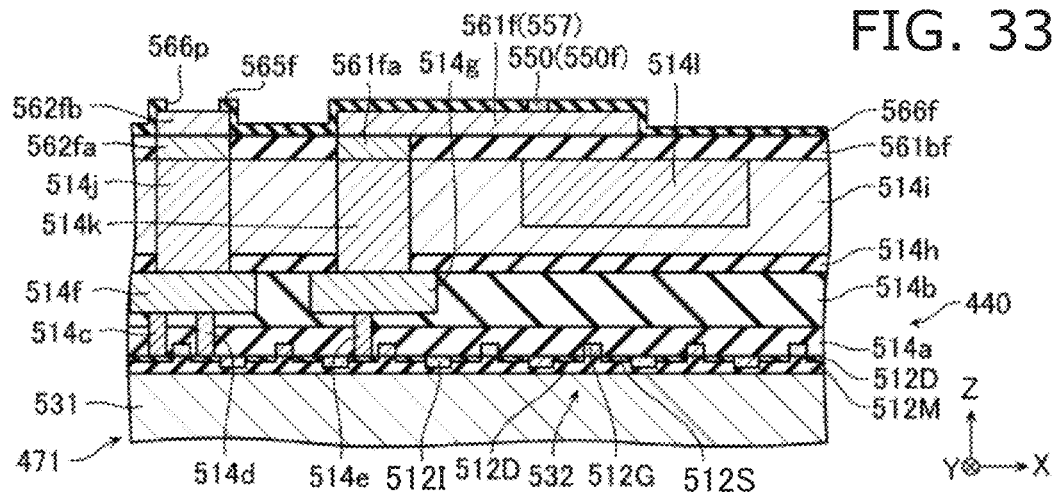

As shown in FIG. 33A and FIG. 33B, an opening 566p is made in the insulating film 565f. Thereby, the connecting pillar 562fb is exposed.

Figure 34A:
FIG. 34A and FIG. 34B are schematic views showing the method for manufacturing the pressure sensor according to the fifth embodiment.
Figure 34B:
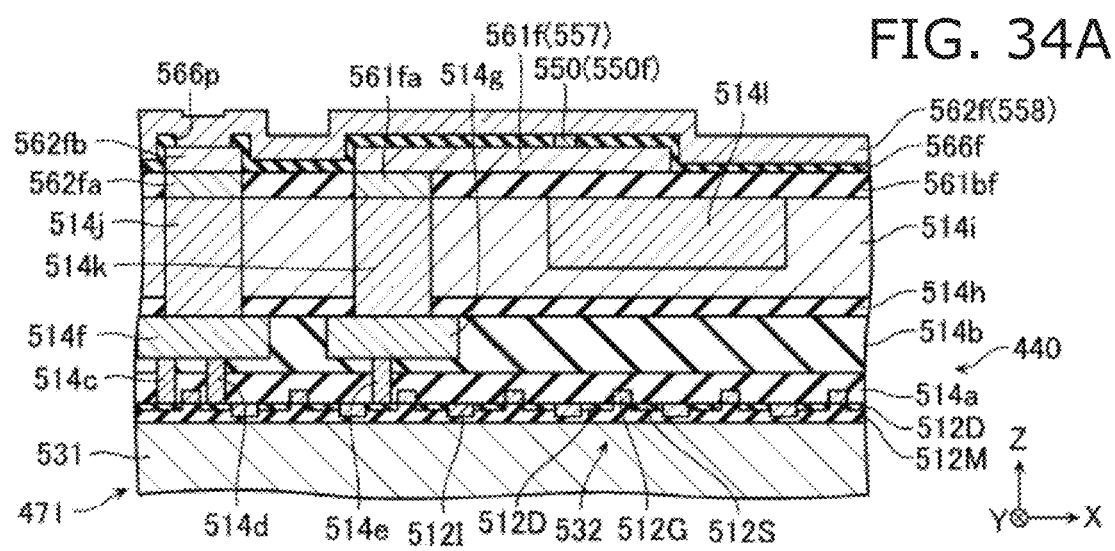

As shown in FIG. 34A and FIG. 34B, a conductive layer 562f that is used to form an interconnect 558 is formed on the upper surface. A portion of the conductive layer 562f is electrically connected to the connecting pillar 562fb.

Figure 35A:
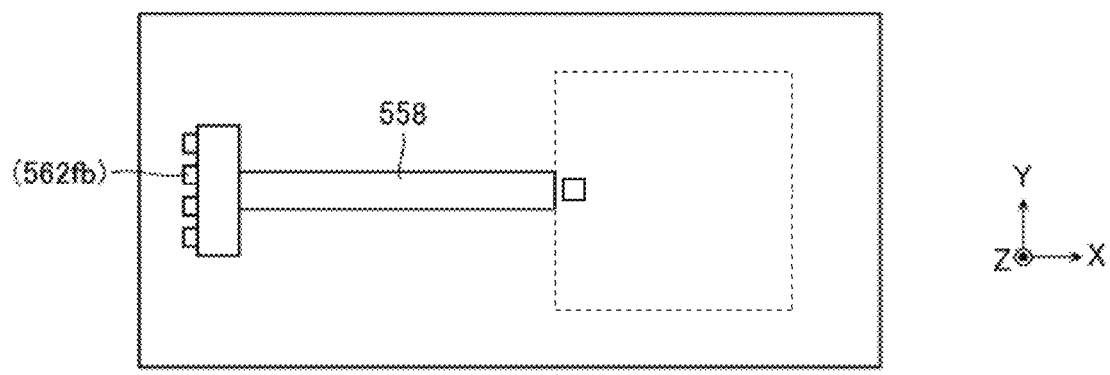
FIG. 35A and FIG. 35B are schematic views showing the method for manufacturing the pressure sensor according to the fifth embodiment.
Figure 35B:
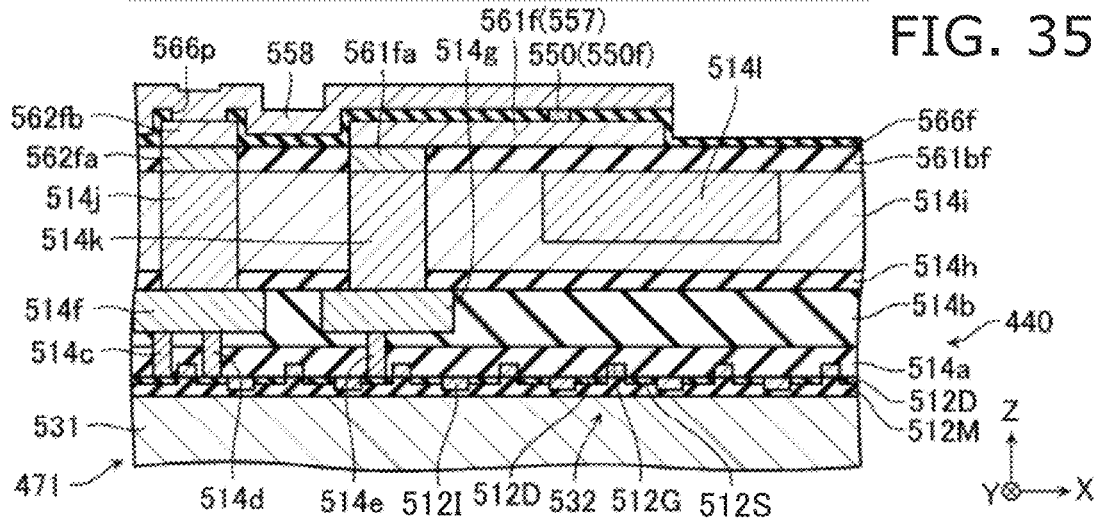

As shown in FIG. 35A and FIG. 35B, the conductive layer 562f is patterned into a prescribed configuration. Thereby, the interconnect 558 is formed. The interconnect 558 is electrically connected to the connecting pillar 562fb.

Figure 36A:
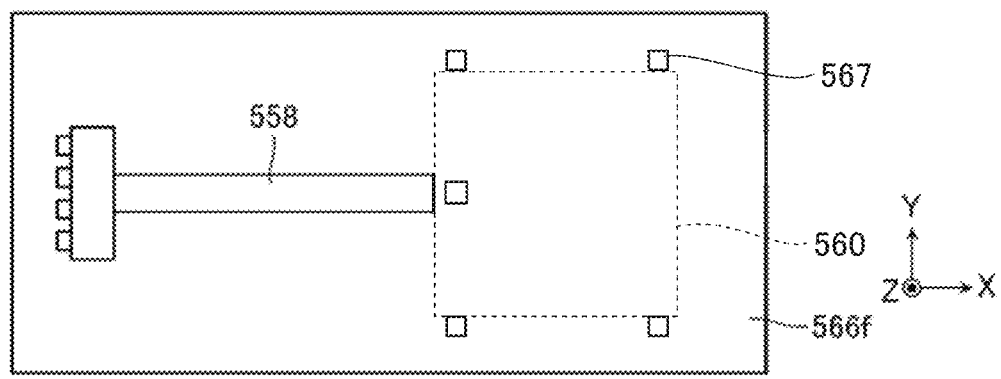
FIG. 36A and FIG. 36B are schematic views showing the method for manufacturing the pressure sensor according to the fifth embodiment.
Figure 36B:
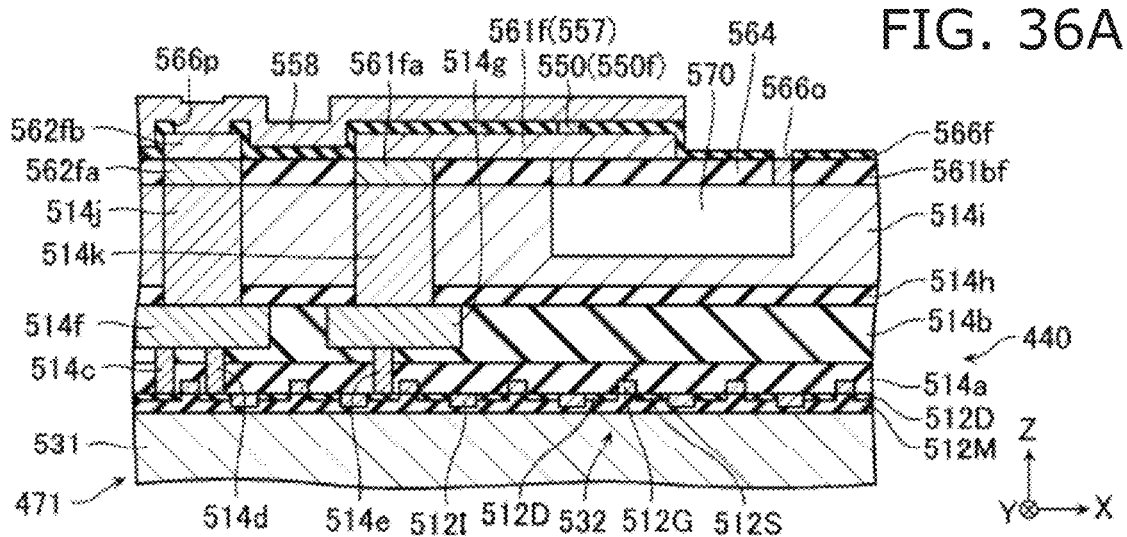

As shown in FIG. 36A and FIG. 36B, an opening 566o that has a prescribed configuration is made in the insulating film 566f. The insulating film 561bf is patterned via the opening 566o; and the sacrificial layer 514l is removed via the opening 566o. Thereby, the hollow portion 570 is made. For example, wet etching may be used to remove the sacrificial layer 514l.

In the case where a fixing unit 567 has a ring configuration, for example, an insulating film fills between the film unit 564 and the edge of the non-hollow portion above the hollow portion 570.

Thus, the pressure sensor 440 is formed.

Sixth Embodiment

A sixth embodiment will now be described with reference to FIG. 37.

Figure 37:
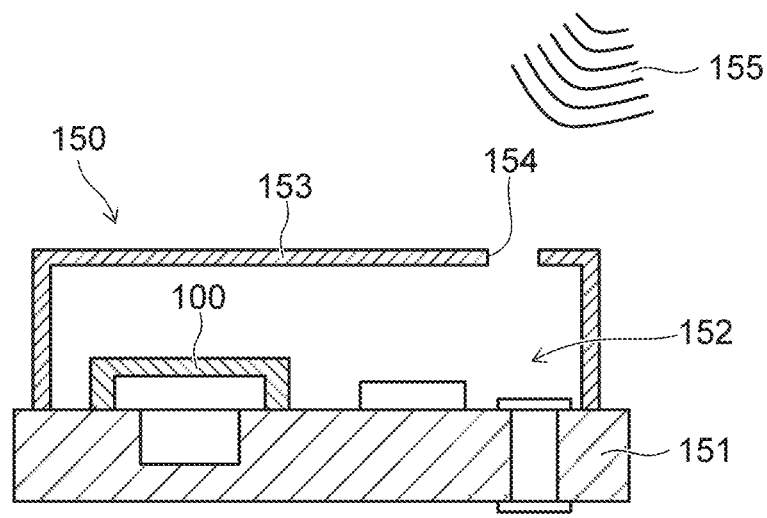
FIG. 37 is a schematic cross-sectional view showing a microphone according to the embodiment.

FIG. 37 is a schematic cross-sectional view illustrating a microphone 150 according to the embodiment. A pressure sensor 100 in which the strain sensing elements according to the first to third embodiments are mounted may be mounted in, for example, a microphone.

The microphone 150 according to the embodiment includes a printed circuit board 151 in which the pressure sensor 100 is mounted, an electronic circuit 152 in which the printed circuit board 151 is mounted, and a cover 153 that covers the printed circuit board 151, the pressure sensor 100, and the electronic circuit 152. The pressure sensor 100 is a pressure sensor in which the strain sensing elements according to the first to third embodiments are mounted.

An acoustic hole 154 is provided in the cover 153; and sound waves 155 enter through the acoustic hole 154. When the sound waves 155 enter the interior of the cover 153, the sound waves 155 are sensed by the pressure sensor 100. For example, the electronic circuit 152 causes a current to flow through the strain sensing elements mounted in the pressure sensor 100 and senses the change of the resistance value of the pressure sensor 100. Also, the electronic circuit 152 may amplify the current value by an amplifier circuit, etc.

The microphone 150 in which the pressure sensor is mounted can sense the sound waves 155 with high sensitivity because the pressure sensor, in which the strain sensing elements according to the first to third embodiments are mounted, has high sensitivity.

Seventh Embodiment

A seventh embodiment will now be described with reference to FIG. 38 and FIG. 39.

Figure 38:
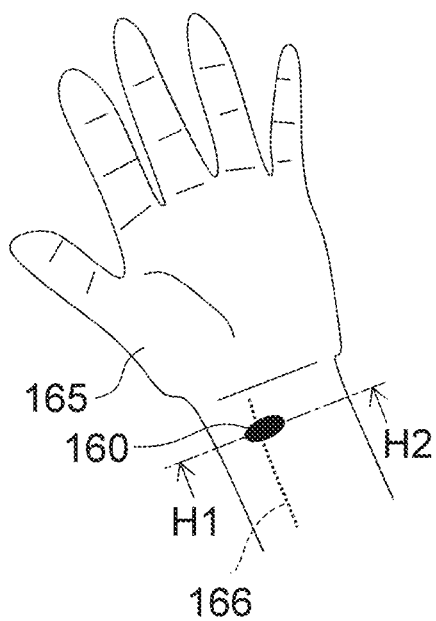
FIG. 38 is a schematic view showing a blood pressure sensor according to the seventh embodiment.
Figure 39:
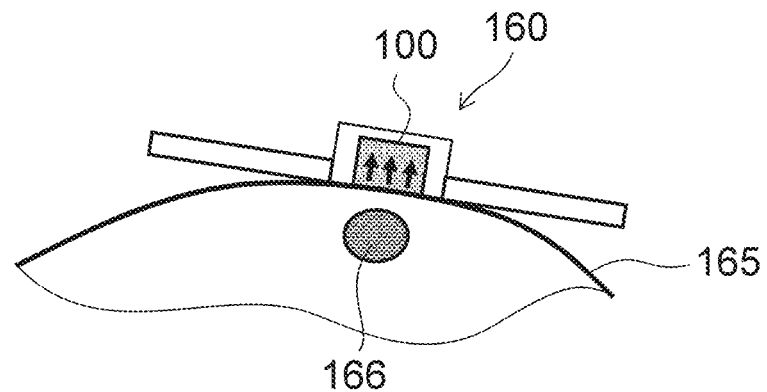
FIG. 39 is a schematic cross-sectional view showing the blood pressure sensor according to the seventh embodiment.

FIG. 38 is a schematic view illustrating a blood pressure sensor 160 according to the seventh embodiment. FIG. 39 is a schematic cross-sectional view as viewed from H1-H2 of the blood pressure sensor 160. For example, the pressure sensor 100 in which the strain sensing elements according to the first to third embodiments are mounted may be mounted in the blood pressure sensor 160.

As shown in FIG. 38, for example, the blood pressure sensor 160 is adhered on an artery 166 of an arm 165 of a human. As shown in FIG. 39, the pressure sensor 100, in which the strain sensing elements according to the first to third embodiments are mounted, is mounted in the blood pressure sensor 160; and the pressure sensor 100 can measure the blood pressure.

The blood pressure sensor 160 in which the pressure sensor 100 is mounted can continuously sense the blood pressure with high sensitivity because the pressure sensor 100, in which the strain sensing elements according to the first to third embodiments are mounted, has high sensitivity.

Eighth Embodiment

An eighth embodiment will now be described with reference to FIG. 40.

Figure 40:
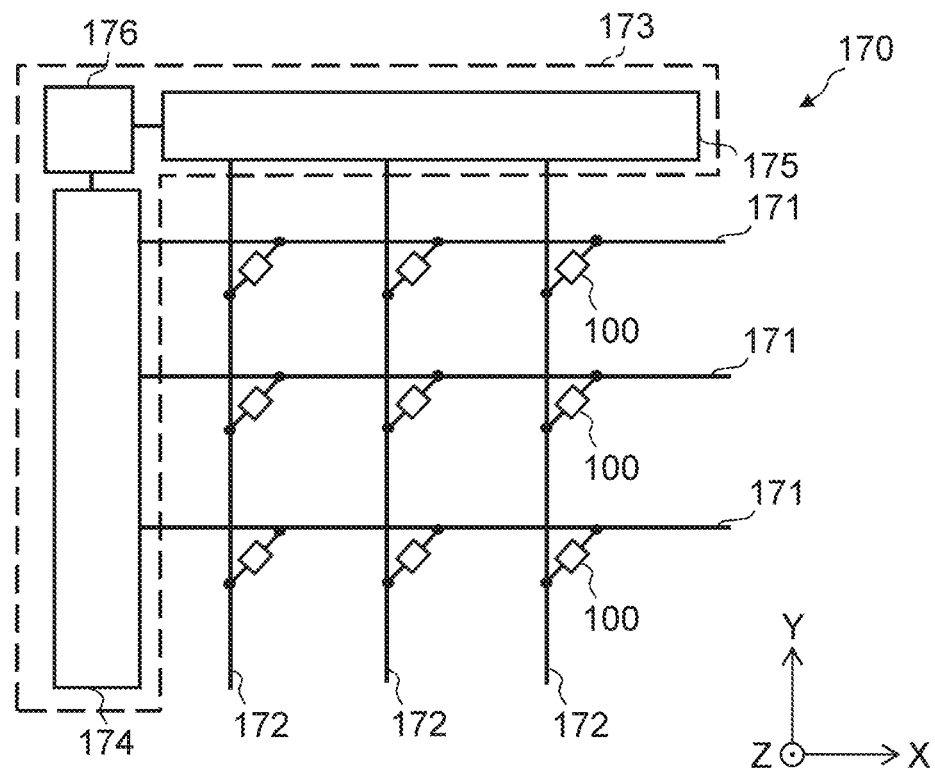
FIG. 40 is a schematic circuit diagram showing a touch panel according to the eighth embodiment.

FIG. 40 is a schematic circuit diagram illustrating a touch panel 170 according to the eighth embodiment. The touch panel 170 is mounted in at least one of the interior of a not-shown display or outside the display.

The touch panel 170 includes multiple pressure sensors 100 that are arranged in a matrix configuration, multiple first interconnects 171 that are multiply arranged in the Y-direction and connected respectively to one end of each of the multiple pressure sensors 100 arranged in the X-direction, multiple second interconnects 172 that are multiply arranged in the X-direction and connected respectively to the other end of each of the multiple pressure sensors 100 arranged in the Y-direction, and a controller 173 that controls the multiple first interconnects 171 and the multiple second interconnects 172. The pressure sensors 100 are the pressure sensors according to the first to third embodiments.

The controller 173 includes a first control circuit 174 that controls the first interconnects 171, a second control circuit 175 that controls the second interconnects 172, and a third control circuit 176 that controls the first control circuit 174 and the second control circuit 175.

For example, the controller 173 causes a current to flow in the pressure sensors 100 via the multiple first interconnects 171 and the multiple second interconnects 172. Here, in the pressure sensors 100, the resistance value of the strain sensing element changes according to the pressure when a not-shown touch surface is pressed. The controller 173 designates the position of the pressure sensor 100 where the pressure due to the pressing is sensed by sensing the change of the resistance value.

The touch panel 170 in which the pressure sensors 100 are mounted can sense the pressure due to the pressing with high sensitivity because the pressure sensors 100, in which the strain sensing elements according to the first to third embodiments are mounted, have high sensitivity. Also, because the pressure sensors 100 are small, it is possible to manufacture a touch panel 170 having high resolution.

The touch panel 170 may include sensing components for sensing the touch other than the pressure sensors 100.

Other than the fourth to eighth embodiments, the pressure sensor 100 is applicable to various pressure sensor devices such as an atmospheric pressure sensor, an air pressure sensor of a tire, etc.

According to the embodiments, a strain sensing element, a pressure sensor, a microphone, a blood pressure sensor, and a touch panel that have high sensitivity can be provided.

According to the embodiments, a strain sensing element and a pressure sensor that have high sensitivity can be provided.

In the specification of the application, being "electrically connected" includes not only the case of being connected in direct contact but also the case of being connected via another conductive member, etc.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components such as the film unit, the bias applying unit, the strain sensor, the supporter, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all strain sensing elements and pressure sensors practicable by an appropriate design modification by one skilled in the art based on the strain sensing elements and pressure sensors described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
   a supporter;
   a film unit, the supporter supporting the film unit, the film unit being deformable;
   a first strain sensor provided at the film unit, an electrical characteristic of the first strain sensor changing according to a deformation of the film unit; and
   a first magnetic unit, a direction from the supporter toward the first magnetic unit being along a first direction from the film unit toward the first strain sensor.

2. The sensor according to claim 1, wherein
   the film unit includes an outer edge supported by the supporter,
   the outer edge is along a second direction crossing the first direction, and
   a third direction from the first magnetic unit toward the first strain sensor is inclined with the second direction.

3. The sensor according to claim 2, wherein an angle between the second direction and the third direction is not less than 40 degrees and not more than 50 degrees.

4. The sensor according to claim 1, wherein the first strain sensor includes:

a first magnetic layer;
a second magnetic layer separated from the first magnetic layer in the first direction; and
a first intermediate layer provided between the first magnetic layer and the second magnetic layer.

* * * * *